(12) United States Patent
Bretschger et al.

(10) Patent No.: US 11,117,819 B2
(45) Date of Patent: *Sep. 14, 2021

(54) SCALABLE CONTINUOUS FLOW MICROBIAL FUEL CELLS

(71) Applicant: Aquacycl LLC, San Diego, CA (US)

(72) Inventors: Orianna Bretschger, San Diego, CA (US); Sofia Malinova Babanova, San Diego, CA (US); Carlo Abraham Angulo Rodriguez, Lakeside, CA (US); Jaime Octavio García Cornejo, La Mesa, CA (US); Pedro Izarael Huerta Virgen, San Ysidro, CA (US); Ryoji Naito, San Diego, CA (US)

(73) Assignee: AQUACYCL LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,021

(22) Filed: Dec. 23, 2019

(65) Prior Publication Data

US 2020/0270152 A1 Aug. 27, 2020

Related U.S. Application Data

(63) Continuation of application No. 16/457,455, filed on Jun. 28, 2019, now Pat. No. 10,570,039.
(Continued)

(51) Int. Cl.
*C02F 3/00* (2006.01)
*H01M 8/16* (2006.01)

(52) U.S. Cl.
CPC ............. *C02F 3/005* (2013.01); *H01M 8/16* (2013.01); *C02F 2201/007* (2013.01)

(58) Field of Classification Search
CPC ......... H01M 8/16; C02F 3/005; C02F 11/006; C02F 1/46; C02F 2001/46166
(Continued)

(56) References Cited

U.S. PATENT DOCUMENTS

| 3,235,234 A | 2/1966 | Beaudoin |
| 5,449,460 A | 9/1995 | Buisman |

(Continued)

FOREIGN PATENT DOCUMENTS

| JP | 2014008461 A | 1/2014 |
| WO | 2014144705 A2 | 9/2014 |

OTHER PUBLICATIONS

International Search Report and Written Opinion dated Sep. 30, 2019 of PCT/US2019/039899 (14 pages).
(Continued)

*Primary Examiner* — Claire A Norris
(74) *Attorney, Agent, or Firm* — Perkins Coie LLP

(57) ABSTRACT

Disclosed are modular microbial fuel cell (MFC) devices, systems and methods for treating wastewater and generating electrical energy through a bioelectrochemical waste-to-energy conversion process. In some aspects, a modular MFC system includes a wastewater pretreatment system to receive and pre-treat raw wastewater for feeding pre-treated wastewater for bioelectrochemical processing; one or more modular MFC devices to bioelectrochemically process the pre-treated wastewater by concurrently generating electrical energy and digesting organic contaminants and particulates in the wastewater to yield treated, cleaner water; and a water collection module to receive the treated water from the one or more modular MFC devices and store the treated water and/or route the treated water from the system.

20 Claims, 58 Drawing Sheets

Related U.S. Application Data

(60) Provisional application No. 62/691,426, filed on Jun. 28, 2018, provisional application No. 62/745,896, filed on Oct. 15, 2018.

(58) Field of Classification Search
USPC .......................................................... 429/401
See application file for complete search history.

(56) References Cited

U.S. PATENT DOCUMENTS

| | | |
|---|---|---|
| 5,736,049 A | 4/1998 | Bundy |
| 7,922,907 B2 | 4/2011 | Hassan et al. |
| 8,366,932 B1 | 2/2013 | Sung et al. |
| 8,415,037 B2 | 4/2013 | Nealson et al. |
| 8,524,402 B2 | 9/2013 | He et al. |
| 8,597,513 B2 | 12/2013 | Borole et al. |
| 9,505,636 B2 | 11/2016 | Bretschger |
| D875,207 S | 2/2020 | Babanova et al. |
| D875,208 S | 2/2020 | Babanova et al. |
| D899,561 S | 10/2020 | Babanova et al. |
| D902,842 S | 11/2020 | Babanova et al. |
| 2003/0190742 A1 | 10/2003 | Whiteman |
| 2004/0188334 A1 | 9/2004 | McWhirter |
| 2005/0244957 A1 | 11/2005 | Stock |
| 2005/0269262 A1 | 12/2005 | Mcbride |
| 2007/0200262 A1 | 8/2007 | Hills |
| 2008/0292912 A1 | 11/2008 | Logan et al. |
| 2009/0218299 A1 | 9/2009 | Cote et al. |
| 2009/0226772 A1* | 9/2009 | Stark ................ H01M 8/04201 429/431 |
| 2010/0003543 A1* | 1/2010 | Zhou ...................... H01M 8/16 429/2 |
| 2011/0042309 A1 | 2/2011 | Keeton |
| 2012/0152835 A1 | 6/2012 | Cardenas et al. |
| 2013/0266876 A1* | 10/2013 | Shechter ............. H01M 8/0206 429/401 |
| 2013/0302703 A1* | 11/2013 | Bretschger .......... H01M 4/8673 429/401 |
| 2014/0110323 A1 | 4/2014 | Al-Anzi |
| 2014/0141286 A1 | 5/2014 | Bretschger et al. |
| 2015/0251934 A1 | 9/2015 | Bretschger |
| 2015/0349350 A1* | 12/2015 | Liu ..................... H01M 4/8668 429/2 |
| 2020/0002200 A1 | 1/2020 | Bretschger et al. |

OTHER PUBLICATIONS

Biffinger, Justin C., et al., "Engineering Microbial Fuels Cells: Recent Patents and New Directions", US Naval Research Laboratory, Paper 22—http://digitalcommons.unl.edu/usnavyresearch/22 (2008), 7 pages.
Chung, Kyungmi, et al., "Continuous Power Generation and Microbial Community Structure of the Anode Biofilms in a Three-Stage Microbial Fuel Cell System", Appl Microbiol Biotechnol (2009) 83:965-977.
Egbadon, Emmanuel, et al., "Simultaneous Generation of Bioelectricity and Treatment of Swine Wastewater in a Microbial Fuel Cell", International Letters of Natural Sciences—SSN: 2300-9675, vol. 54, pp. 100-107.
Eppinger, Mark, et al., "Comparative Analysis of Four Campylobacterales", Nature Reviews—Microbiology—vol. 2, Nov. 2004 | pp. 1-16.
Ginige, Maneesha P., et al., "Investigation of an Acetate-Fed Denitrifying Microbial Community by Stable Isotope Probing, Full-Cycle rRNA Analysis, and Fluorescent In Situ Hybridization-Microautoradiography", Applied and Environmental Microbiology, vol. 71, No. 12—Dec. 2005, p. 8683-8691.
He, Weihua, et al., "The Effect of Fow Modes and Electrode Combinations on the Performance of a Multiple Module Microbial Fuel Cell Installed at Wastewater Treatment Plant", Water Research 105 (2016) 351-360.
Hutchinson, Adam J., et al., "Analysis of Carbon Fiber Brush Loading in Anodes on Startup and Performance of Microbial Fuel Cells", Journal of Power Sources 196 (2011) 9213-9219.
Ichihashi, O., et al., "Removal and Recovery of Phosphorus as Struvite From Swine Wastewater Using Microbial Fuel Cell", Bioresource Technology 114 (2012) 303-307.
Ishii, Shun'ichi, et al., "A Novel Metatranscriptomic Approach to Identify Gene Expression Dynamics During Extracellular Electron Transfer", Nature Communications, | 4:1601 | DOI: 10.1038/ncomms2615 | www.nature.com/naturecommunications—Received Nov. 26, 2012 | Accepted Feb. 19, 2013 | Published Mar. 19, 2013—pp. 1-10.
Ishii, Shun'ichi, et al., "Identifying the Microbial Communities and Operational Conditions for Optimized Wastewater Treatment in Microbial Fuel Cells", Water Research 47 ( 2013) 7120-7130.
Jimenez, Jose I., et al., "Genomic Insights in the Metabolism of Aromatic Compounds in Pseudomonas", Pseudomonas, vol. 3—Kluwer Academic / Plenum Publishers, New York, 2004—pp. 425-462.
Kelly, Patrick T., et al., "Nutrients Removal and Recovery in Bioelectrochemical Systems: A review", Bioresource Technology 153 (2014) 351-360.
Kim, Jung R., et al., "Analysis of Ammonia Loss Mechanisms in Microbial Fuel Cells Treating Animal Wastewater", Biotechnology and Bioengineering, vol. 99, No. 5, Apr. 1, 2008—pp. 1120-1127.
Kim, Jung R., et al., "Removal of Odors from Swine Wastewater by Using Microbial Fuel Cells", Applied and Environmental Microbiology, Apr. 2008, p. 2540-2543—vol. 74, No. 8.
Kim, Kyoung-Yeol, et al., "Continuous Treatment of High Strength Wastewaters Using Air-Cathode Microbial Fuel Cells", Bioresource Technology 221 (2016) 96-101.
Lim, Seung J., et al., "Swine Wastewater Treatment Using a Unique Sequence of Ion Exchange Membranes and Bioelectrochemical System", Bioresource Technology 118 (2012) 163-169.
Lu, Mengqian, et al., "Long-term Performance of a 20-L Continuous Fow Microbial Fuel Cell for Treatment of Brewery Wastewater", Journal of Power Sources xxx (2017) 1-14.
Mann, Ethan E., et al., "Pseudomonas Biofilm Matrix Composition and Niche Biology", FEMS Microbiol Rev 36 (2012) 893-916.
Matlock, Marty, et al., "A Life Cycle Analysis of Water Use in U.S. Pork Production", University of Arkansas | Division of Agriculture | 78 pages (2011).
Mcilroy, Simon J., et al., "Identification of Active Denitrifiers in Full-scale Nutrient Removal Wastewater Treatment Systems", Environmental Microbiology (2016) 18(1), 50-64.
Min, Booki, et al., "Electricity Generation From Swine Wastewater Using Microbial Fuel Cells", Water Research 39 (2005) 4961-4968.
Molognoni, Daniele, et al., "Multiparametric Control for Enhanced Biofilm Selection in Microbial Fuel Cells", J Chem Technol Biotechnol 2016; 91: 1720-1727.
Sander, Elisa M., et al., "Dissimilatory Nitrate Reduction to Ammonium as an Electron Sink During Cathodic Denitrification", RSC Adv.,2015,5,86572-86577.
Tharali, Akshay D., et al., "Microbial Fuel Cells in Bioelectricity Production", Frontiers in Life Science, 2016—vol. 9, No. 4, 252-266SSN: 2155-3769 (Print) 2155-3777 (Online) Journal homepage: http://www.tandfonline.com/loi/tfls20.
Van Den Berg, Eveline M., et al., "DNRA and Denitri!cation Coexist over a Broad Range of Acetate/N-NO3- Ratios, in a Chemostat Enrichment Culture", Frontiers in Microbiology | www.frontiersin.org—Nov. 2016 | vol. 7 | Article 1842—13 pages.
Van Lier, Jules B., et al., "Anaerobic Wastewater Treatment", Biological Wastewater Treatment: Principles Modeling and Design—2008—ISBN: 9781843391883.
Vilajeliu-Pons, Anna, et al., "Microbiome Characterization of MFCs Used for the Treatment of Swine Manure", Journal of Hazardous Materials 288 (2015) 60-68.
Virdis, Bernardino, et al., "Microbial Fuel Cells for Simultaneous Carbon and Nitrogen Removal", Water Research 42 (20 08 ) 3013-3024.
WINfiELD, Jonathan, et al., "Investigating the Effects of Fuidic Connection Between Microbial Fuel Cells", Bioprocess Biosyst Eng (2011) 34:477-484.

(56) References Cited

OTHER PUBLICATIONS

Zhuang, Li, et al., "Scalable microbial Fuel Cell (MFC) Stack for Continuous Real Wastewater Treatment", Bioresource Technology 106 (2012) 82-88.
Zhuang, Li, et al., "Substrate Cross-Conduction Effect on the Performance of Serially Connected Microbial Fuel Cell Stack", Electrochemistry Communications 11 (2009) 937-940.
Lebrecht et al. Treating Sulfur in Wastewater. Feb. 2015 [Retrieved May 3, 2020) Retrieved from Internet URL: <http://www.airproducts.com/-/media/downloads/w/wastewater-treatmenVdata-sheets/en-treating-sulfur-in-wastewater.pdf>.

* cited by examiner

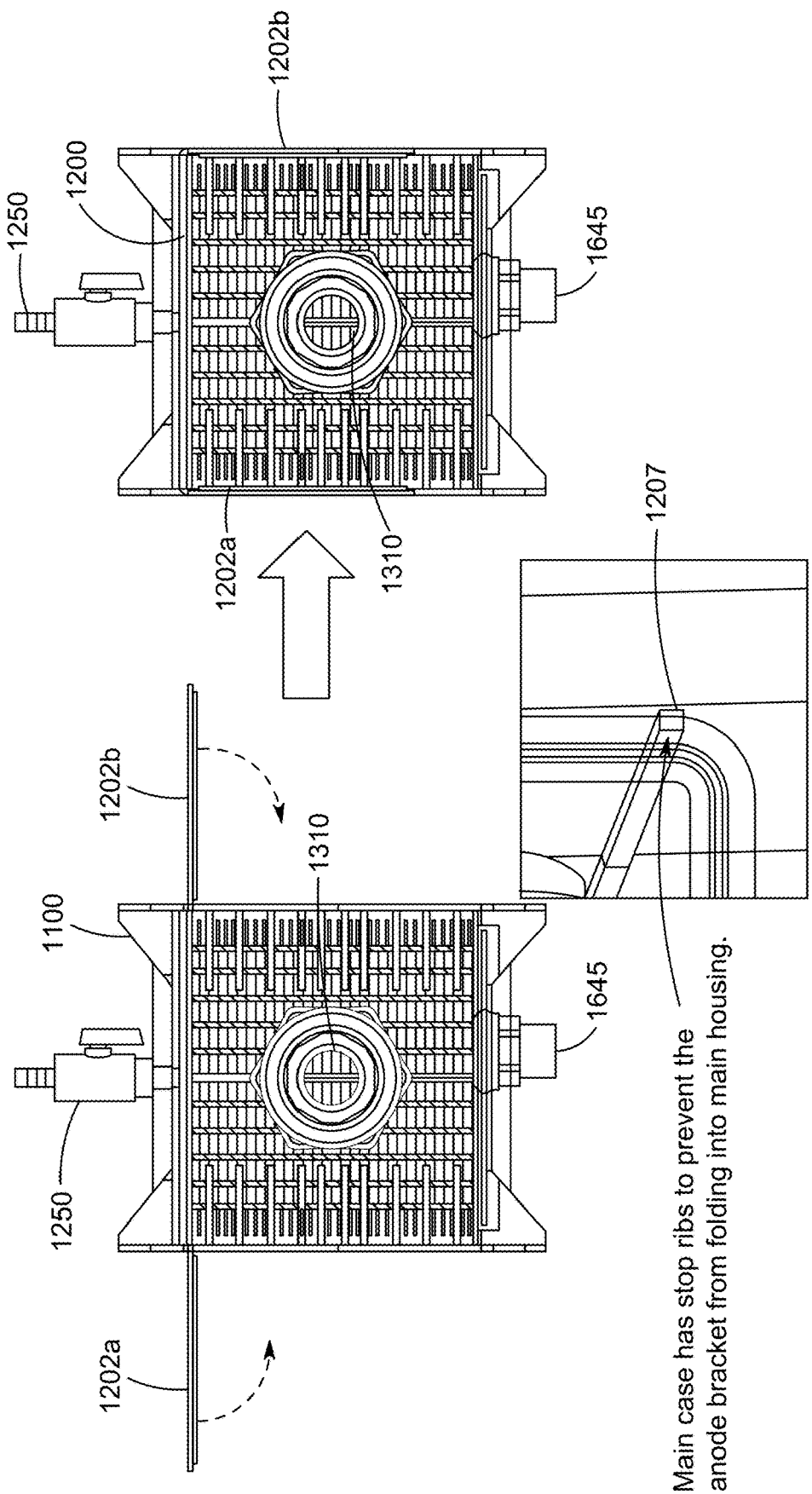

SCALABLE CONTINUOUS FLOW MICROBIAL FUEL CELLS

CROSS-REFERENCE TO RELATED APPLICATIONS

This application is a continuation of U.S. patent application Ser. No. 16/457,455, entitled "SCALABLE CONTINUOUS FLOW MICROBIAL FUEL CELLS" filed Jun. 28, 2019, which claims priorities to and benefits of U.S. Provisional Patent Application No. 62/691,426 entitled "SCALABLE CONTINUOUS FLOW MICROBIAL FUEL CELL SYSTEMS, DEVICES AND METHODS" filed on Jun. 28, 2018, and of U.S. Provisional Patent Application No. 62/745,896 entitled "SCALABLE CONTINUOUS FLOW MICROBIAL FUEL CELLS" filed on Oct. 15, 2018. The entire content of the aforementioned patent applications is incorporated by reference as part of the disclosure of this patent document.

TECHNICAL FIELD

This patent document relates to microbial fuel cell technology.

BACKGROUND

A microbial fuel cell (MFC) is a bioelectrochemical system that uses living cells, such as bacteria, and mimics and/or promotes their natural interactions to produce electric current. Some example MFC systems include mediated MFCs, which use a mediator for transferring electrons from the bacteria cell to the anode. Other MFC systems include unmediated MFCs, which utilize types of bacteria that typically have electrochemically active redox proteins (e.g., cytochromes) on their outer membrane that can transfer electrons directly to the anode.

SUMMARY

Disclosed are modular microbial fuel cell (MFC) devices, systems and methods for treating wastewater and generating electrical energy through a bioelectrochemical waste-to-energy conversion process.

In some aspects, a system for energy generation and wastewater treatment includes a wastewater headworks system to pre-treat raw wastewater by removing solid particles and produce a pre-treated wastewater that that is outputted from the wastewater headworks system; one or more modular microbial fuel cell (MFC) devices to bioelectrochemically process the pre-treated wastewater by concurrently generating electrical energy and digesting organic contaminants and particulates in the pre-treated wastewater to yield a treated water, the one or more modular MFC devices comprising a housing and a bioelectrochemical reactor that is encased within the housing, wherein the bioelectrochemical reactor includes a plurality of anodes arranged between a cathode assembly; and a water collection system to receive the treated water from the one or more modular MFC devices and store the treated water and/or route the treated water from the system.

In some aspects, a method for energy generation and wastewater treatment includes pretreating a raw wastewater by removing at least some solid particles from a wastewater fluid that produces a pre-treated wastewater; processing the pre-treated wastewater by a bioelectrochemical conversion process that generates electrical energy and concurrently cleans the pre-treated wastewater to produce treated water by digesting matter in the wastewater fluid; extracting the generated electrical energy for storage or transfer to an external electrical device; and outputting the treated water.

In some aspects, a device for energy generation and wastewater treatment includes a modular microbial fuel cell (MFC) device operable to bioelectrochemically process wastewater that includes organic matter in a fluid that concurrently generates electrical energy and digests the organic matter to yield a treated water, the modular MFC device comprises: a housing, and a bioelectrochemical reactor encased within the housing, the bioelectrochemical reactor including a plurality of anodes arranged between a cathode assembly, wherein the cathode assembly includes two gas-diffusion cathodes separated on two sides of the plurality of anodes and arranged longitudinally along a flow direction of the fluid through the bioelectrochemical reactor, the gas-diffusion cathodes able to allow oxygen to permeate into the fluid within the bioelectrochemical reactor.

In some aspects, a device for energy generation and wastewater treatment includes a first modular microbial fuel cell (MFC) device and a second modular MFC device. The first modular MFC device is operable to bioelectrochemically process wastewater that includes organic matter in a fluid that concurrently generates electrical energy and digests the organic matter to produce a treated water, and the first modular MFC device comprises: a first housing, and a first bioelectrochemical reactor encased within the first housing, the first bioelectrochemical reactor including a plurality of anodes arranged between a cathode assembly, wherein the cathode assembly includes two gas-diffusion cathodes separated on two sides of the plurality of anodes and arranged longitudinally along a flow direction of the fluid through the first bioelectrochemical reactor, the gas-diffusion cathodes able to allow oxygen to permeate into the fluid within the first bioelectrochemical reactor. The second modular MFC device is fluidically coupled to the first modular MFC device and operable to bioelectrochemically process the treated water produced by the first modular MFC device to concurrently generate electrical energy and digest organic matter in fluid of the treated water to produce a further treated water, and the second modular MFC device comprises: a second housing, and a second bioelectrochemical reactor encased within the second housing, the second bioelectrochemical reactor including a plurality of anodes arranged between a cathode assembly, wherein the cathode assembly includes two gas-diffusion cathodes separated on two sides of the plurality of anodes and arranged longitudinally along a flow direction of the fluid through the second bioelectrochemical reactor, the gas-diffusion cathodes able to allow oxygen to permeate into the fluid within the second bioelectrochemical reactor.

The subject matter described in this patent document can be implemented to provide one or more of the following features.

BRIEF DESCRIPTION OF THE DRAWINGS

FIG. 6D shows additional examples of fitment of an anode assembly into a housing of the single bioelectrochemical reactor of FIG. 6A.

Like reference numerals refer to the same or similar features.

DETAILED DESCRIPTION

Microbial fuel cells (MFCs) use microbes as catalysts to oxidize organic matter at the anode and generate electricity via extracellular electron transfer (EET) mechanisms. MFC technology development has benefited from major discoveries related to EET mechanisms of model organisms and critical design evaluations, but have lacked progress in the transformation from lab scale fundamental experiments to large scale industrial implementations.

While MFC technology has shown promise in the research phase, further advancements are needed before MFC systems can be applied to real wastewater treatment applications. For example, early MFC research has been primarily conducted in small lab-scale systems using liquid volumes less than 1 L, operated in fed-batch mode for short-term tests, or fed synthetic or well-defined wastewater as a test solution. Yet, to demonstrate practical wastewater treatment, large-scale MFC systems are needed to treat real wastewater under continuous flow operation over longer time scales outside of a laboratory setting. Further, commercially viable MFC systems should have a low cost of fabrication, distribution and installment, as well as long-term operational reliability and durability.

Disclosed are modular microbial fuel cell (MFC) devices, systems and methods for treating wastewater and generating electrical energy through a bioelectrochemical waste-to-energy conversion process. The disclosed MFC devices, systems and methods can be used for a wide variety of environmental and clean-energy applications on a large, medium or small scale.

Implementations of the disclosed modular MFC technology can include one or more of the following features and advantages. Example embodiments of the MFC devices include modular components that can be integrated into a single, transportable casing for onsite 'plug-and-play' installation for a variety of end-use implementations, including wastewater treatment, sludge elimination, and electricity generation. The disclosed modular MFC technology can be used to save end-users up to 95% on wastewater treatment operation costs based on net-zero energy operation of the device, remote monitoring capability, and 80% solids reduction.

Example embodiments and implementations of systems, devices and methods in accordance with the disclosed modular MFC technology are described herein. While some of the examples described below are primarily based on treating domesticated animal wastewater or brewing wastewater using certain example configurations of the modular MFC systems, devices and methods to facilitate understanding of the underlying concepts, it is understood that the disclosed embodiments can also include treatment of other wastewater at high treatment rates from other sources in addition to farms or breweries.

Figure 1:
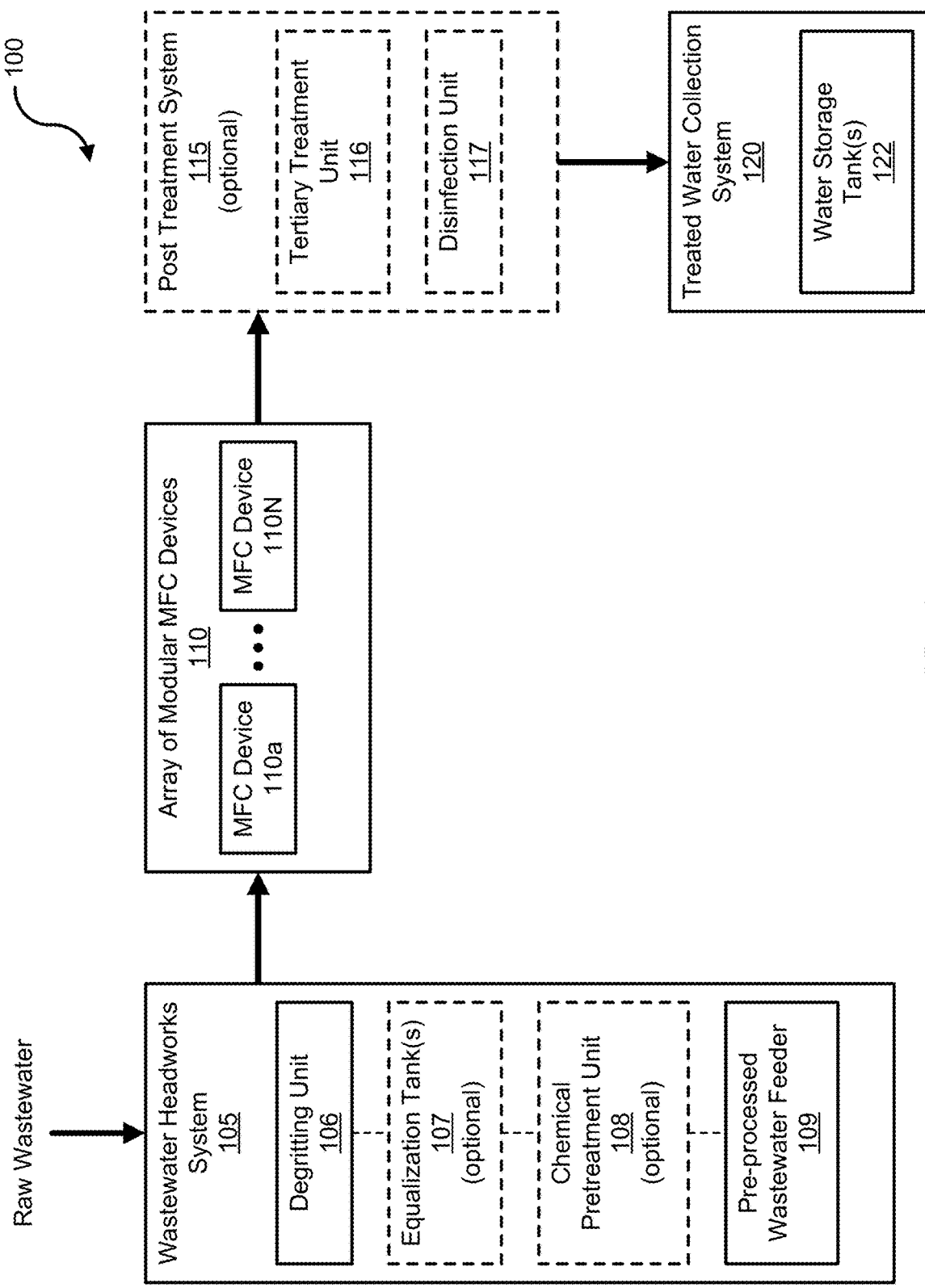
FIG. 1 shows a diagram of an example embodiment of a modular microbial fuel cell (MFC) system in accordance with the present technology for net-zero energy consuming wastewater treatment.

FIG. 1 shows a diagram of an example embodiment of a modular MFC system 100 in accordance with the present technology for net-zero energy consuming wastewater treatment of diverse types of wastewater, including sewage from domestic infrastructure systems, agricultural and industrial systems. The system 100 includes a wastewater headworks system 105 to receive raw wastewater for treatment, e.g., from a facility such as a farm, an urban sewage wastewater grid, industrial processing facility, or other, and to pre-process the raw wastewater to be provided to one or more modular MFC devices 110, discussed further below. For example, the wastewater headworks system 105 can pre-process the raw wastewater by removing solid or solid-like matter in the raw wastewater, e.g., of a relatively large size or mass. For example, the wastewater headworks system 105 can remove particles of 1 cm or greater and/or 50 g or greater. In the example embodiment shown in FIG. 1, the wastewater headworks system 105 includes a degritting unit 106 (also referred to as degritting module, degritting sub-system, or degritter) that filters out matter of large size and/or large mass in the raw wastewater, e.g., like stones, sand, etc. In some embodiments, for example, the degritting unit 106 can include a spinning device that uses centrifugal force to separate out sand, grit and gravel, e.g., via spin filters, which can be collected and disposed as solid waste from the degritting unit 106. In some implementations, the degritting unit 106 can include a mesh sheet to separate the solid matter from the wastewater stream. In some embodiments, the wastewater headworks system 105 includes one or more equalization tanks 107 configured to receive and collect the degritted wastewater and provide a steady organic load and flow of the received wastewater out of the wastewater headworks system 105 via a pre-processed wastewater feeder box 109, e.g., to the modular MFC devices 110. In some embodiments, the wastewater headworks system 105 includes one or more chemical/physical or biological pre-treatment units 108 configured to receive the degritted wastewater, e.g., from the degritting unit 106 or the equalization tank(s) 107, and process the degritted wastewater to remove any unwanted chemical species, such as sulfur species or grease and oil for example. In some embodiments, the wastewater headworks system 105 includes a feeder unit 109 to provide the pre-processed wastewater to the next stage of the modular MFC system 100. For example, the pre-processed wastewater feeder 109 can be configured as a feeder box. In some embodiments, the example feeder box 109 is arranged at a greater height than the modular MFC devices 110.

The system 100 includes one or more modular MFC devices 110. In the example show in FIG. 1, the system 100 includes an array of modular MFC devices 110 that treat the pre-processed wastewater through a net-zero energy consumption and bioelectrochemical waste-to-energy conversion process generating electrical energy and digesting organic contaminants and particulates (e.g., sludge) in the pre-processed wastewater to yield treated water. The bioelectrochemical conversion process implemented by the modular MFC devices 110 includes biological oxidation accompanied with an extracellular transfer of electrons released during the oxidation to a conductive electrode surface/anode. The electrons are then transferred through an external electrical circuit to a cathode where a reduction process occurs. The overall conversion process is spatially separated into an oxidation process via bacteria at the anode and a reduction process at the cathode.

The example array of modular MFC devices 110 can be arranged in a series of 1 to N MFC devices 110, which can be referred to as a treatment train. In some embodiments, the treatment train is an array of hydraulically connected MFC devices 110 (arranged in a series of 1 to N MFC devices), of which a first MFC device 110a receives the pre-processed wastewater from the wastewater headworks system 105, processes the pre-processed wastewater by the bioelectrochemical conversion process and outputs the partially treated wastewater to a second MFC device 110b, which receives the processed output water from the first MFC device 110a and processes the first MFC device 110a's output water by the bioelectrochemical conversion process to output from the array (if N=2 MFC devices) or to another MFC device, e.g., a third MFC device 110c, and so forth, until the final MFC device 110N. In some embodiments of the system 100, the pre-processed wastewater is gravity-fed from the feeder 109 of the wastewater headworks system 105 to the array of modular MFC devices 110. For example, in various implementations, the pre-processed wastewater is gravity-fed through the utilization of a feeder box and a peristaltic pump is used at the end of the MFC array to control the flow rate through the MFC device(s) 110.

In some embodiments, the system 100 includes multiple treatment trains (e.g., two or more arrays of modular MFC devices 110 in series, e.g., a hydraulic series), which can treat the pre-processed wastewater in parallel to increase treatment volume. In some embodiments, the modular MFC devices 110 of a single treatment train can be arranged in one plain or in multiple vertical plains to create multiple levels. In various embodiments, a treatment train can include the same number or a different number of modular MFC devices 110 as another treatment train, e.g., where treatment train 1 has N modular MFC devices 110 and treatment train 2 has N or M modular MFC devices 110. For example, in instances where the system 100 includes the same number of modular MFC devices 110 among multiple treatment trains configured in parallel (from a common wastewater intake point), this can advantageously allow the system to distribute the wastewater processing volume load to the individual MFC devices among each treatment train group when the treatment trains produce similar treatment water outputs of similar qualities or level of cleanliness. Also, for example, in instances where the system 100 includes different numbers of modular MFC devices 110 among treatment trains configured in parallel (from a common wastewater intake point), this can advantageously allow the system to produce different treatment water outputs of different qualities or levels of cleanliness.

The system 100 includes a water collection system 120 to receive the treated water from the array of the modular MFC devices 110, which can store the treated water and/or route the treated water to an external device or system for use of the water treated by the system 100. In some embodiments, the water collection system 120 includes one or more water tanks to store the treated water, which can later be routed to the external device or system. In some embodiments, the system 100 includes a post-treatment system 115 arranged between the array of the modular MFC devices 110 and the water collection system 120 to post-treat the treated water, such as disinfect the treated water or implement other tertiary treatment processes. In some embodiments, for example, the post-treatment system 115 can include one or more membranes to post-treat the treated water using reverse or forward osmosis, advanced oxidation, denitrification, and/or disinfection, e.g., using ozone, UV light, chlorine or other disinfection approaches.

In some example embodiments, like the system shown later in FIG. 3, the modular MFC system 100 can include twelve MFC reactors with a total volume of 90 L, collectively, that can be utilized to treat wastewater, e.g., such as swine wastewater at a farm, brewery wastewater at a brewery, or other types of wastewater from other types of sources. In some example embodiments, the modular MFC system 100 can be contained in a portable container or placed on a mobile rack structure that can be easily transported to and installed at the designated installation site for treatment of domestic, agricultural or industrial wastewater.

Figure 2A:
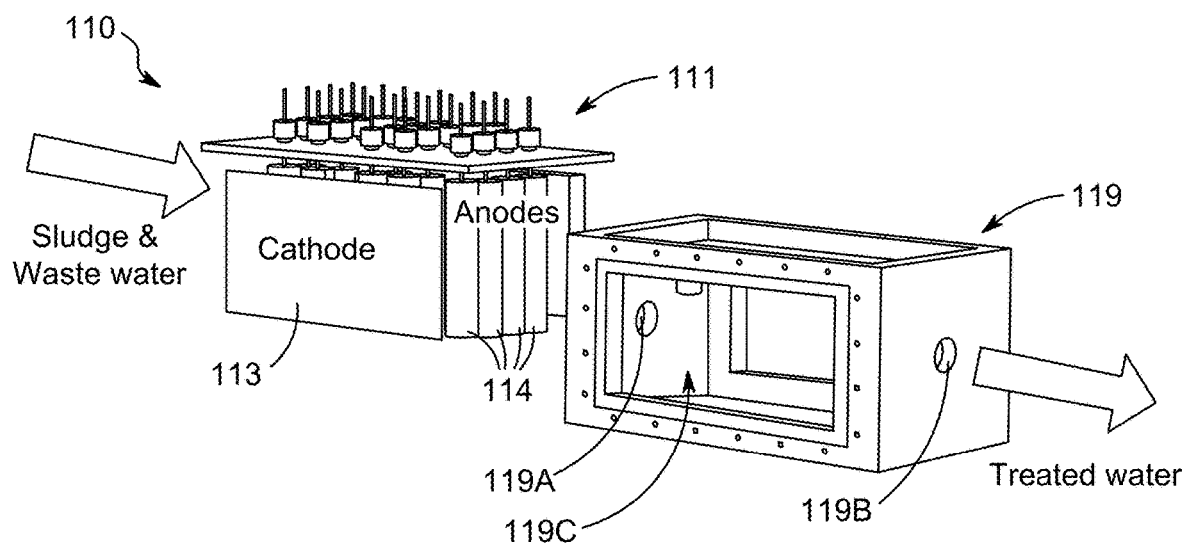
FIGS. 2A and 2B show diagrams of an example embodiment of an MFC device of the array of MFC devices shown in FIG. 1.
Figure 2B:
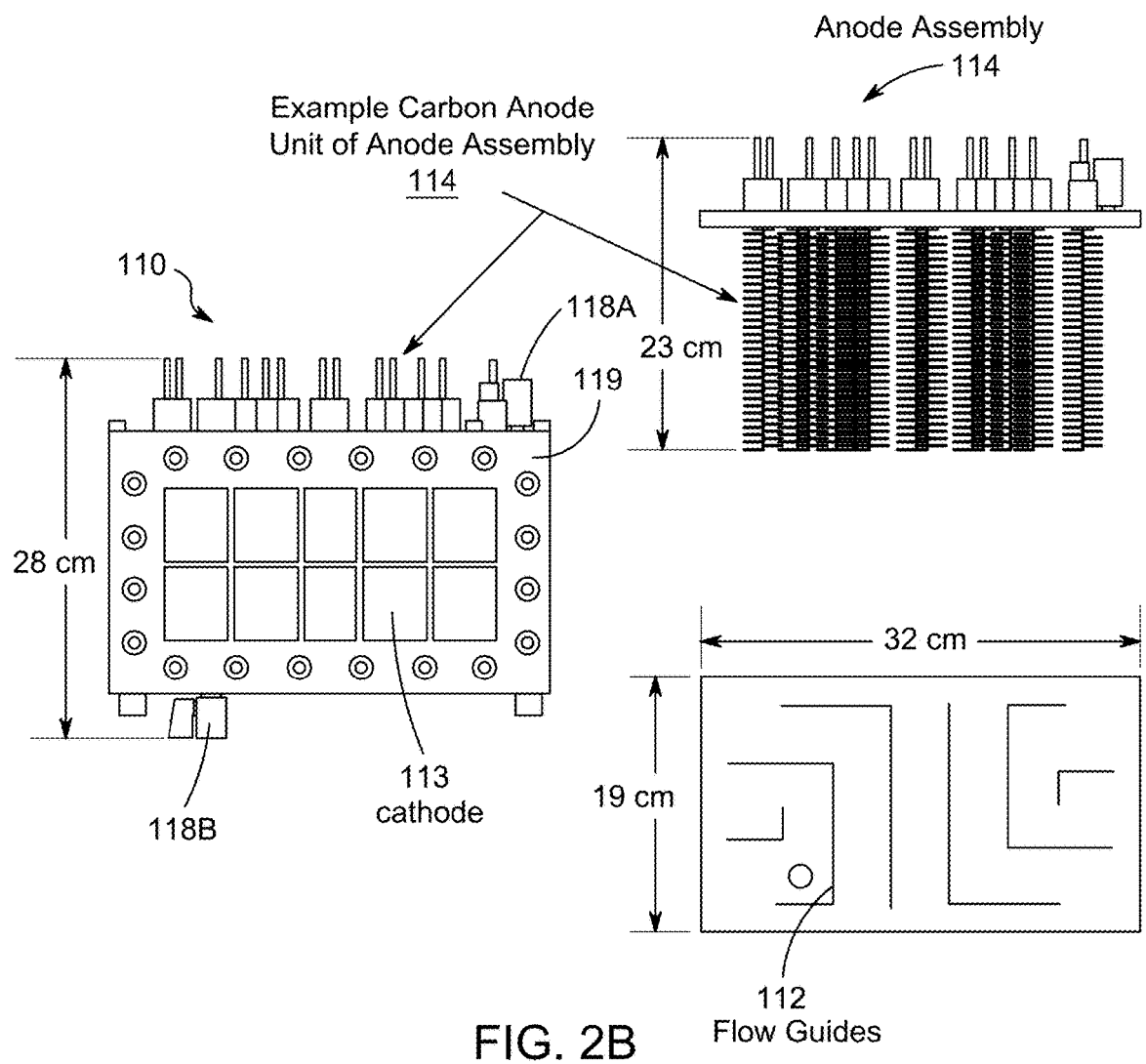
Figure 6A:
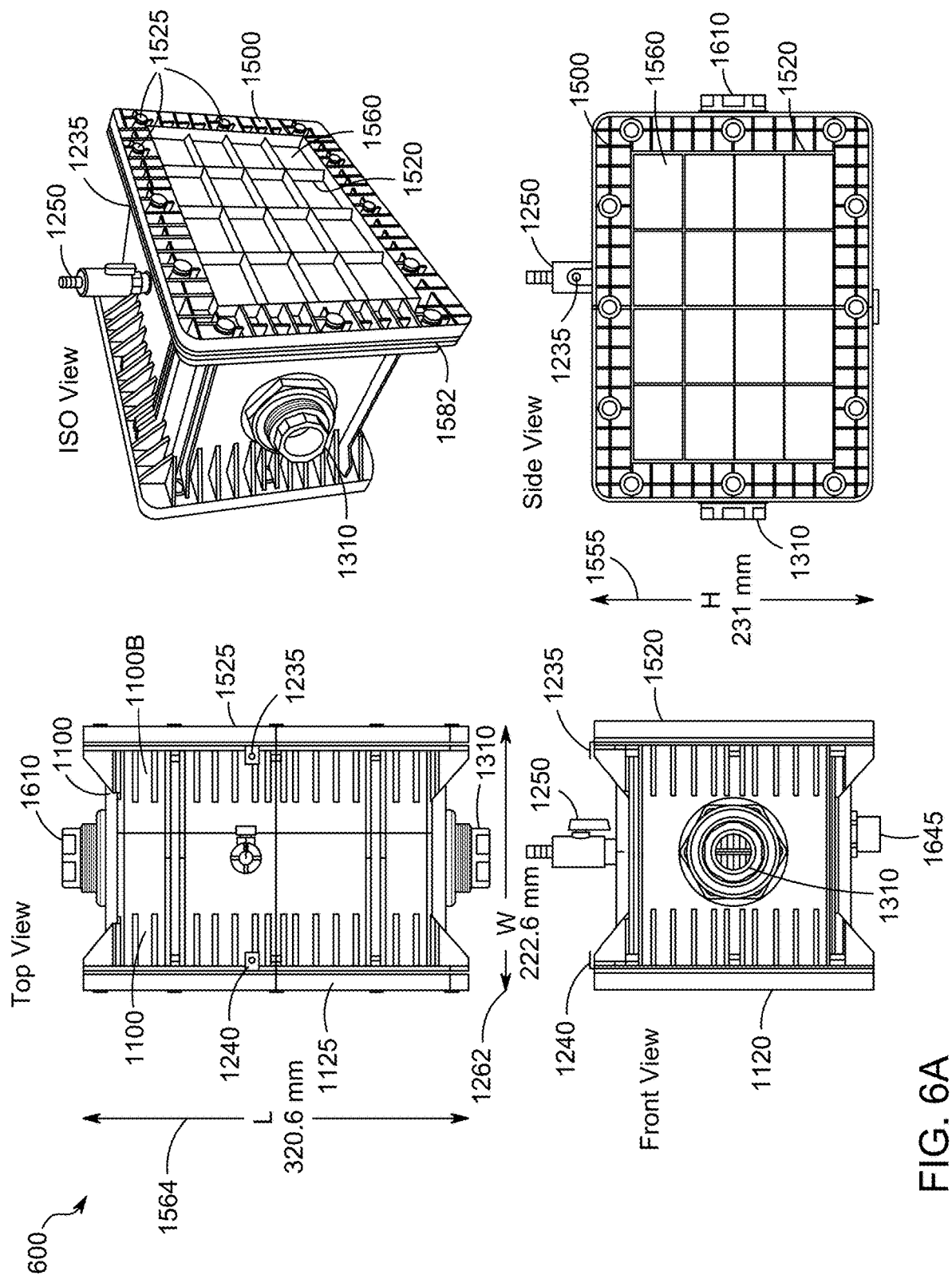
FIG. 6A shows a diagram depicting various views of an example embodiment of a single bioelectrochemical reactor in accordance with the present technology.

FIGS. 2A and 2B show diagrams of an example embodiment of an MFC device 110 of the array of the system 100. As shown in FIG. 2A, the MFC device 110 includes a bioelectrochemical reactor core 111 and a housing 119 to encase the reactor core 111. The reactor core 111 can be configured as a single module device with the anode assembly 114 and the cathode assembly 113. In some embodiments, the housing 119 includes a rigid casing having a solid bottom and an opening at the top to allow modular components of the reactor core 111 to be reversibly positioned within the interior of the housing 119. In some embodiments, the housing 119 is structured to have a first dimension in a flow direction of the wastewater through the MFC device 110, which is configured to be longer than a perpendicular dimension of housing 119. In the example shown in FIG. 2A, the housing 119 includes an input port 119A and output port 119B arranged on opposing sides of the housing 119 along the flow direction. The housing includes two openings 119C and 119D on opposing sides of the housing 119 that are adjacent (and perpendicular in rectangular configurations of the housing 119) to the sides having the ports 119A and 119B. The openings 119C and 119D allow for air flow through the cathode assembly 113 encased in the housing 119. In the example shown in FIG. 2A, the housing 119 includes an access opening on top that is closed by an attachment plate to which the anode assembly 114 is attached. In some example embodiments, the housing 119 can be closed on top to form a whole body, in which the input port 119A and the output port 119B are positioned on short side walls orthogonal to the longer dimension, and the openings 119C and 119D are positioned on long side walls orthogonal to the shorter perpendicular dimension (an example of which is shown in FIG. 6A).

The reactor core 111 includes a cathode assembly 113 comprising two cathode electrodes arranged on sides of the reactor proximate to openings (e.g., openings 119C and 119D) that align with the sides of the housing 119. The inner side of each of the cathodes is exposed to the wastewater solution fed into the reactor core 111. The reactor core 111 includes an anode assembly 114 comprising a plurality of anode units that are arranged between the cathode electrodes of the cathode assembly 113, and which are in the flow direction between the input port 119A and output port 119B when the reactor core 111 is encased in the housing 119.

In the anode assembly 114, for example, individual anode units can be spatially arranged and electrically connected with each other to form an anode, in which one or more anode units can operate as a single anode system. The anode assembly 114 can include a plurality of the single anode systems. In some embodiments, the individual anode units can be identical to one another within a respective single anode system. In some embodiments, the individual anode units can be different from one another in a single anode system and/or to other anode units in other single anode systems. In some embodiments, the anode units can be vertical assemblies of anode electrodes, which can include carbon or other materials that provide surface area for microbial (e.g., bacteria) growth. The anode units of a single anode system can be electrically connected outside or inside the reactor core 111. Within a single anode system, the anode units can be connected in electrical series from anode unit 1 to anode unit N, e.g., via wire. The wire(s) can be titanium, platinum or palladium wire, for example. In some embodiments, within the anode system, the anode units can be connected in parallel or a combination of series and parallel.

In some examples, the MFC device 110 has a rectangular shape with internal dimensions: 31±2 cm×17±2 cm×15±2 cm, and volume of 8±3 L. In the example embodiment shown in FIGS. 2A and 2B, the anode assembly 114 includes twenty anode units, which can be engineered as carbon anode units (e.g., of graphite fiber) and structured to have a 10 cm height and 2.5 cm diameter. Other heights and diameters can also be used.

In some embodiments, at least some of the anode units of the anode assembly 114 are electrically connected together as one electrode. In various implementations, for example, the anode units can be pre-treated before configuration in the reactor core 111 to remove organic contaminants or activate the anode surface, e.g., such as by soaking in an organic solvent and subsequently washing with water. Notably, for example, based on the modular design of the reactor core 111, the anode units of the anode assembly 114 can be washed in such fashion after installation of the MFC device 110 and the system 100 at the implementation site.

In some examples, like the example embodiment shown in FIGS. 2A and 2B, the cathode assembly 113 includes two gas-diffusion cathodes, each of a size of 13.5 cm×27.2 cm, with geometric surface area 367 $cm^2$. Other sizes and with other surface areas may also be used. The example gas-diffusion cathodes are placed on both sides of the reactor core 111 and electrically connected. As shown in FIG. 2B, the example MFC device 110 includes flow guides 112 that can be built as part of the housing 119 to integrate into the reactor core 111 to direct flow of the solution inside the reactor core 111. In some implementations, for example, the flow guides 112 are solid static walls, which can be a part of the reactor housing 119 or additionally inserted before the placement of the reactor core 111. The flow guides 112 can be placed in a specific arrangement to direct the flow, provide proper mixing and higher proton supply at the cathodes. The reactor of the example MFC device 110 can also include one or more vent tubes 118A to allow gas to exit the reactor and/or one or more drain valves 118B to allow for the reactor to be drained of liquid to allow for servicing, transporting, or removing a reactor from a system.

Figure 2C:
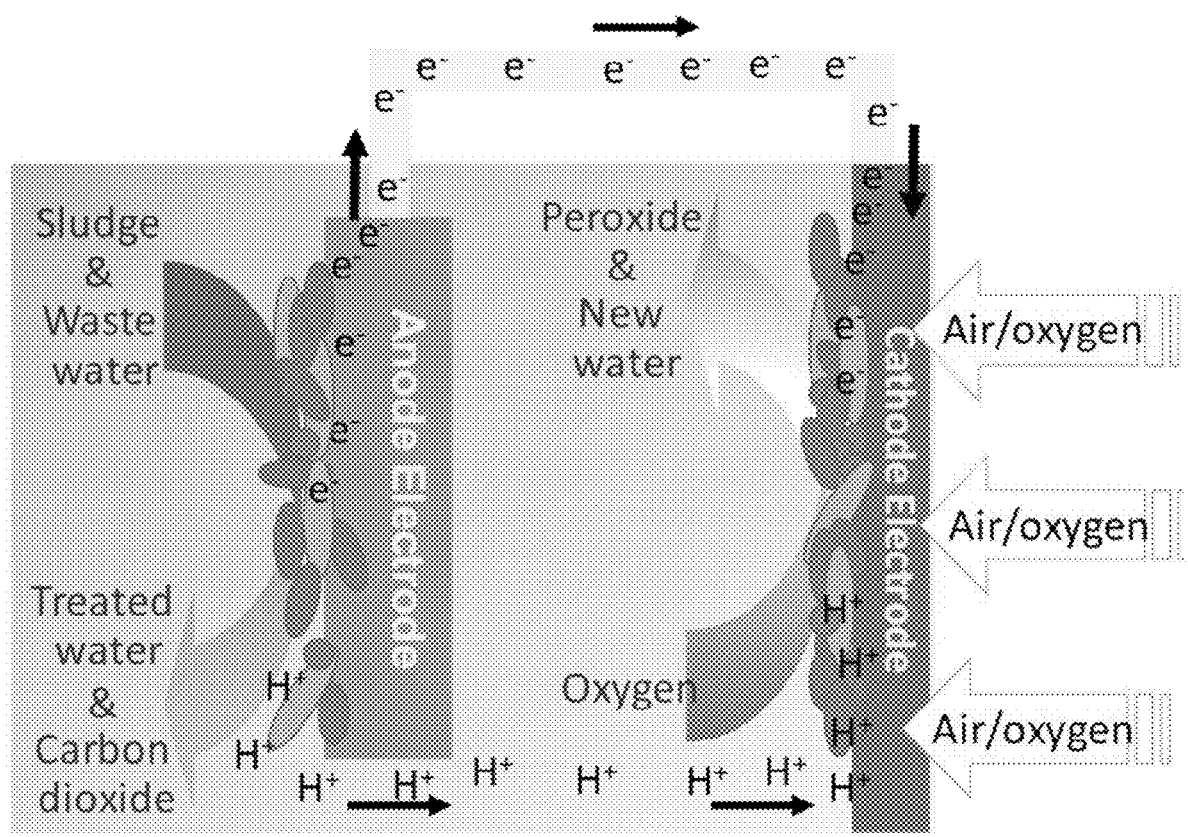
FIG. 2C shows an illustrative diagram of a bioelectrochemical waste-to-energy conversion process in accordance with the present technology.

FIG. 2C shows an illustrative diagram of a bioelectrochemical waste-to-energy conversion process implemented by a reactor core of an example modular MFC device 110. As shown by this example, a biologically catalyzed oxidation of organic matter to dissolve carbon dioxide occurs at an anode electrode of an anode unit (e.g., of the anode assembly 114). The biological species performing the oxidation process include, for example, bacteria, yeast or other microorganisms. These microorganisms can be a pure culture or a whole microbial community. During the oxidation of the organic matter, the given microbes perform extracellular electron transfer to the anode surface and excretion of protons in solution, as illustrated in the diagram of FIG. 2C. The released electrons travel through an external wire to a cathode electrode (e.g., of a cathode plate of the cathode assembly 113). Protons diffuse from the anode surrounding to the cathode and oxygen passively diffuses through the cathode from air. Protons, electrons and oxygen interact at the cathode surface and oxygen is reduced to hydrogen peroxide or new molecular water. The flow of electrons provides a source of energy generation, which can be harvested by the system 100 as one of the results of the bioelectrochemical process, where the other result is cleaner water that is outputted from the reactor. The modular MFC devices 110 generate electricity as DC current, which can be stored in an electrical charge storage device (e.g., a battery). For example, an electrical circuit configured between the anode and cathode can be used to trickle charge batteries. In various implementations of the system 100, the harvested and/or stored energy can be used to power pumps that can offset the power demand of system 100, e.g., such as pump 306 and/or pump 307 shown in FIG. 3.

Further example embodiments and implementations of a high-treatment rate modular MFC system are describe, which can be employed for large-scale applications for wastewater treatment with net-zero energy demands, remote monitoring and high percentage of solids reduction or elimination.

In farming and livestock, for example, significant volumes of wastewater are accumulated and discharged in the sewer during the daily washing and sanitation of animal quarters, such as pens for pig farms. During these processes a vast amount of freshwater is consumed. For example, approximately one quarter of global freshwater is used for animal production. According to a 2011 report by the Pork Checkoff organization, a given swine farm may use 24% of its total water consumption for facility operations such as cooling the animals and manure management. The most common method of manure management at swine production operations is to capture the wastewater in large anaerobic lagoons. However, if not properly lined or maintained, these lagoons may lead to hazardous discharge causing severe environmental impacts due to the release of high concentrations of carbon, nitrogen and phosphorous, and the presence of potentially pathogenic bacteria. Yet, alternative treatment methods that accelerate the removal of carbon and nitrogen from swine wastewater could enable water reuse for farm cleaning and/or irrigation while simultaneously preventing environmental pollution.

As described below, example results from multiple experimental implementations of various example embodiments of the modular MFC system 100 are described. The results demonstrate and suggest the practical utility of the disclosed MFC devices, systems and methods for wastewater treatment and energy recovery from a variety of sources including farm, industrial and domestic wastewater, among others.

In an example implementation, an example embodiment of the modular MFC system 100 was operated for over 200 days in continuous mode with a hydraulic residence time of 4 hours (e.g., flow rate of 380 mL/min, 0.1 gal/min) at a swine farm. Example results from this operation indicate a very stable electrochemical performance and efficient waste treatment with up to 65% of chemical oxygen demand (COD) removed and a maximum removal rate of 5.0 kg-$COD/m^3$ per day. The microbial dynamics within the MFC reactors and electrochemical performance from each reactor were also evaluated. These data sets suggest a very stable and robust microbial enrichment adapted to metabolize and transform a diversity of compounds present in highly complex wastewater into direct electricity. Further, for example, the electrochemical performance of the example modular MFC system 100 shows that the power recovered from the microbial transformation of waste organics into electricity is not only competitive with conventional cogeneration processes, but in-fact sufficient to sustain the operational energy requirements of system 100.

Figure 3:
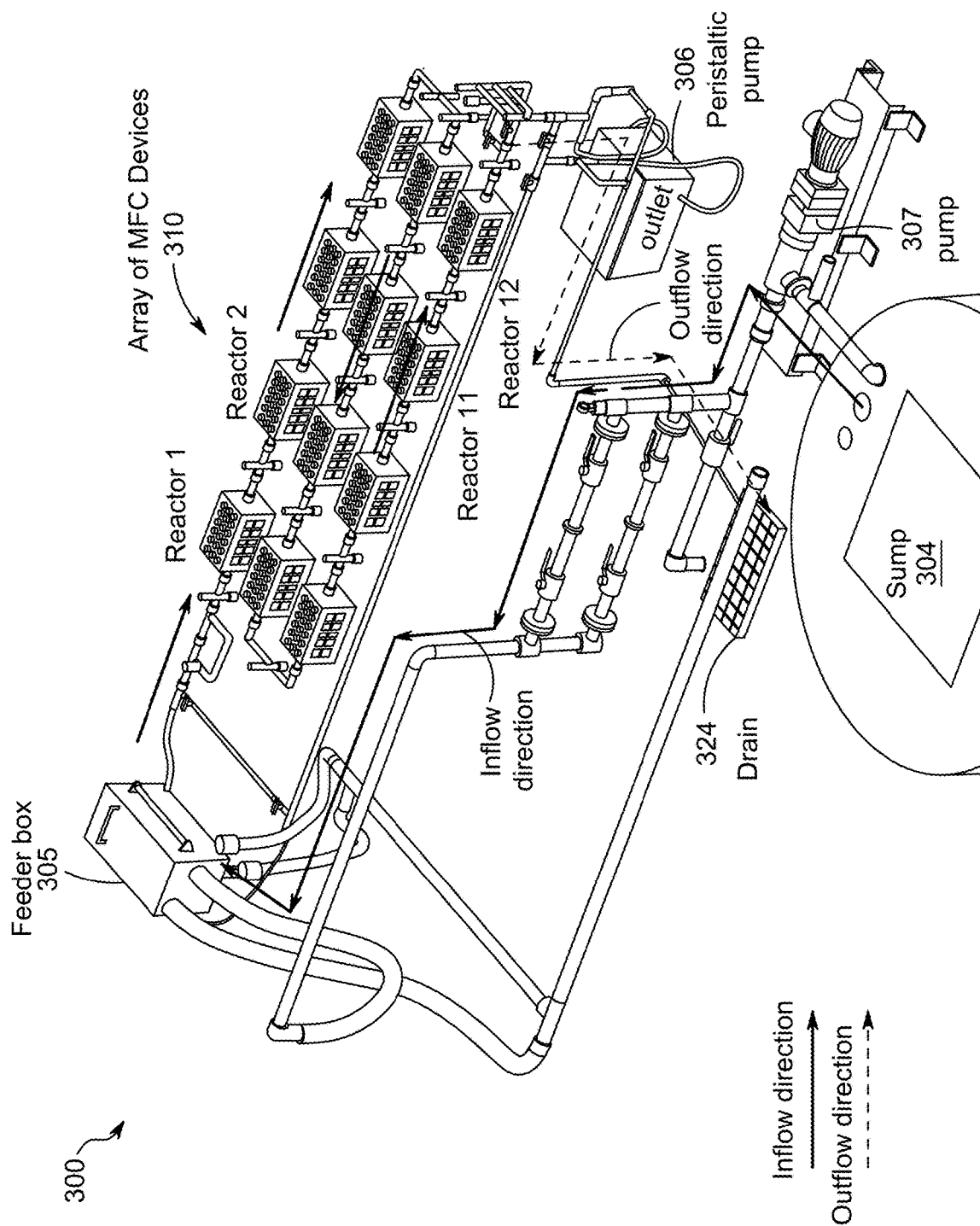
FIG. 3 shows a diagram of an example embodiment of the modular MFC system shown in FIG. 1 implemented for continuous treatment of swine waste at high treatment rates.

FIG. 3 shows a diagram of an example embodiment of the modular MFC system 100, referred to as MFC system 300, used in an experimental implementation for continuous treatment of swine waste at a farm at flow rates, e.g., such as 660 L/day (e.g., 174 gpd) for long-term operation. The modular MFC system 300 includes twelve reactors in an array of MFC devices 310 connected in hydraulic series with a consecutive flow of the solution, e.g., from Reactor 1 to Reactor 2 to Reactor 3 to . . . to Reactor 12. The overall volume of the example system 300 was 110 L. The waste stream was gravity-fed into the reactors of MFC devices 310 through the utilization of a feeder box 305, and a peristaltic pump 306 fluidically coupled to the array of MFC devices 310 was used to precisely control the flow rate. For example, the reactors of the MFC devices 310 are configured along the same plane, approximately; yet in some examples, the MFC system 300 can be configured such that the feeder box 305 is placed at a greater height than Reactor 1 of the MFC device array; Reactor 1 was positioned at a greater height than Reactor 2, and so forth, such that Reactor 12 had the lowest height with respect to the other reactors of the array of MFC devices 310. During continuous mode of operation, for example, the raw swine waste was stored in an underground sump 304 (e.g., 5,700 L) and from there pumped, via a pump 307, into the feeder box 305; after which, gravity-fed the reactors of the MFC devices 310 from the feeder box 305. In some examples, a degritter unit (not shown) is configured before the sump 304 to remove the large-mass and/or large-size particles from the raw wastewater before delivered to the sump 304. The treated water, bioelectrochemically treated by the MFC devices 310, was discarded into a sanitary sewer drain 324.

Example results and discussion of the example implementations of the MFC system 300 for swine wastewater treatment are described later in this disclosure with reference to FIGS. 9A to 22B.

Figure 4:
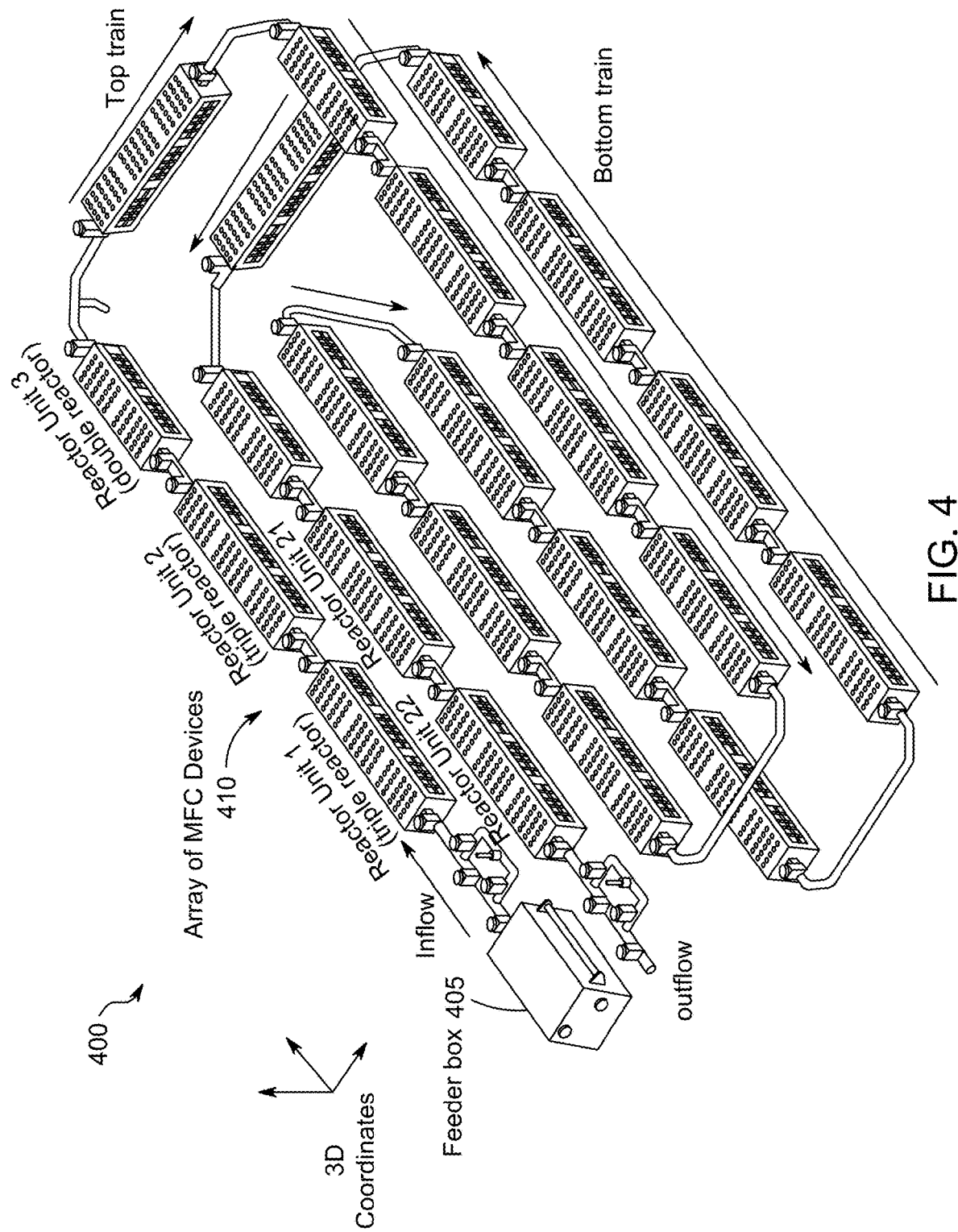
FIG. 4 shows a diagram of an example embodiment of a modular MFC system shown in FIG. 1 implemented for continuous treatment of domestic wastewater at high treatment rates.

FIG. 4 shows a diagram of another example embodiment of the modular MFC system 100, referred to as MFC system 400, used in experimental implementations for continuous treatment of domestic wastewater at high treatment rates. The example modular MFC system 400 includes sixty-two reactors in an array of modular MFC devices 410 three-dimensionally arranged in hydraulic series within a container housing (not shown). The modular MFC devices 410 of the array can be configured in a single reactor unit comprising a single reactor 111, a double reactor unit comprising two reactors 111, and/or a triple reactor unit comprising three reactors 111. The example MFC system 400, as shown in the diagram of FIG. 4, includes twenty-two standalone reactor units (assemblies) of double and triple reactor designs that combine to provide the sixty-two total reactors of the example MFC system 400. For example, Reactor Unit 1 includes three reactors 111 ("triple reactor") directly coupled to each other and contained within in a single housing for hosting the triple reactor unit; and Reactor Unit 3 includes two reactors 111 ("double reactor") directly coupled to each other and contained within in a single housing for hosting the double reactor unit.

The array of modular MFC devices 410 are spatially arranged in the container housing to begin at a height and flow the wastewater fluid through the array downward. This spatial arrangement allows for increased packing density of the modular MFC devices 410 within the container. The modular MFC devices 410 of the array are arranged to receive the pre-treated wastewater from the feeder box 405 at the Reactor Unit 1, e.g., via gravity-fed flow, in which the fluid undergoes a consecutive flow from Reactor Unit 1 to Reactor Unit 2 to Reactor Unit 3 to . . . to Reactor Unit 22. For example, the feeder box 405 is positioned above the plane of the reactors to provide a gravity-fed flow, e.g., in which no pumps are required for the system 400. Also, for example, the fluid level in the feeder box 405 can affect control of the liquid level inside the reactors.

In some embodiments, for example, one or some of the modular MFC devices 410 are arranged in a first vertical plane (e.g., first planar set), which output the treated fluid to the next planar set of modular MFC devices 410 in a second vertical plane, and so forth. In some embodiments, for example, a separate feeder box can be configured between the different planar sets of modular MFC devices 410. In such implementations, the planar feeder box for each planar level can help prevent pressure differences and assist in gravity flow of the fluid as it passes through the array of modular MFC devices 410.

In example implementations of the system 400, the waste stream was gravity-fed into the reactors of MFC devices 410 through the utilization of the planar feeder boxes (note that only initial feeder box 405 is shown in the diagram). For example, the multiple vertical levels can work as one treatment train, and the two or more levels are connected hydraulically in series; or the two or more levels can treat the wastewater in parallel to increase treatment volume. During continuous mode of operation, for example, the waste solution can be stored in an underground sump and from there pumped into an equalization tank (not shown). The treated water, bioelectrochemically treated by the MFC devices 410, can be discarded into a sanitary sewer drain.

FIGS. 5A-5E show diagrams for various views of an example embodiment a single bioelectrochemical reactor, labeled 500, in accordance with the present technology. In FIGS. 5A-5E, the last three digits of each four-digit reference numeral corresponds to one of the six sides of the reactor 500. For example, 5500 is the reference number for one of the side plates, and 5200 is the reference number for the top plate.

Figure 5A:
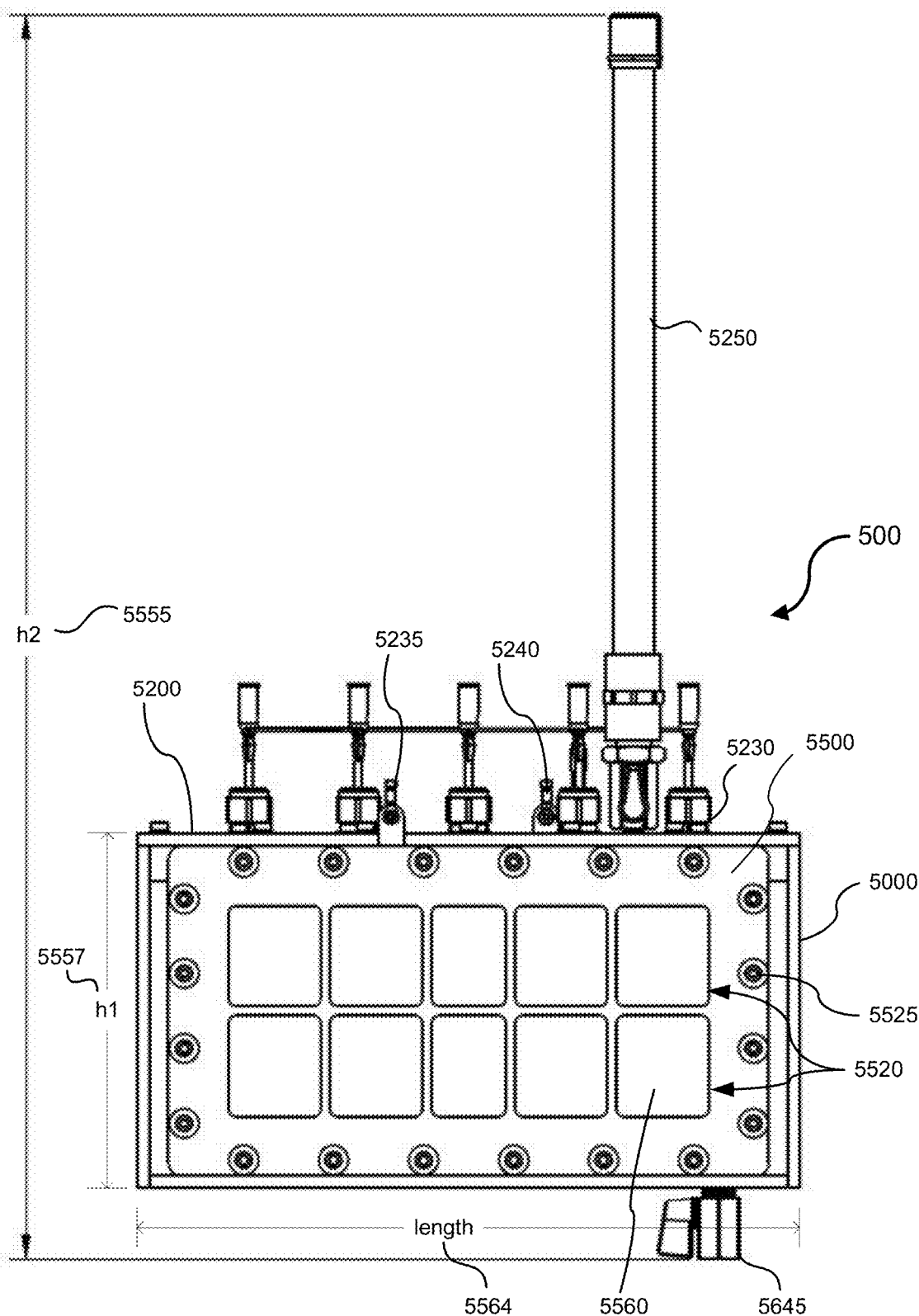
FIGS. 5A-5E show diagrams for various views of an example embodiment a single bioelectrochemical reactor in accordance with the present technology.

FIG. 5A shows a side view 5500A of the example single bioelectrochemical reactor 500. The reactor 500 includes a reactor main housing 5000 with reactor side plate 5500 attached via fasteners 5525. The reactor side plate 5500 has openings 5520 in the side plate to allow air to make contact with a cathode 5560 that is permeable to air and which is placed in a plane adjacent to reactor side plate 5500 toward the inside of the reactor 500. Both sides of the reactor 500 can include cathodes that are made from electrically conductive material and are air permeable, e.g., air permeable cathodes. Liquid in the reactor 500 makes contact with the cathodes, the ends of the reactor, the bottom of the reactor, with anodes held into position inside the reactor, and may make contact with the top of the reactor. On a first side of the reactor 500, a first permeable cathode 5560 is connected to a first side cathode contact 5235; and on a second side of the reactor 500, a second permeable cathode (not shown in FIG. 5A) is connected to a second side cathode contact. Carbon anode units 5230 are attached to the top plate 5200 of the reactor main housing and extend into the reactor making contact with liquid in the reactor. The reactor 500 includes a vent tube 5250 to allow gas to exit the reactor and a drain valve 5645 to allow for the reactor to be drained of liquid and/or to allow for servicing, transporting, or removing a reactor from a MFC system. In some example embodiments, the reactor 500 may be configured at a length (e.g., 13.26 inches long) shown at 5564, and the reactor may be configured at a height h1 (e.g., 7.5 inches tall) shown as 5557. A total height including the thickness of the drain valve 5645 and the length of the vent tube 5250 is shown as h2, labeled 5555, which may be 24.93 inches. The foregoing dimensions are provided as illustrative examples of the dimensions of a reactor. Other reactors consistent with this disclosure may be larger or smaller.

Figure 5B:
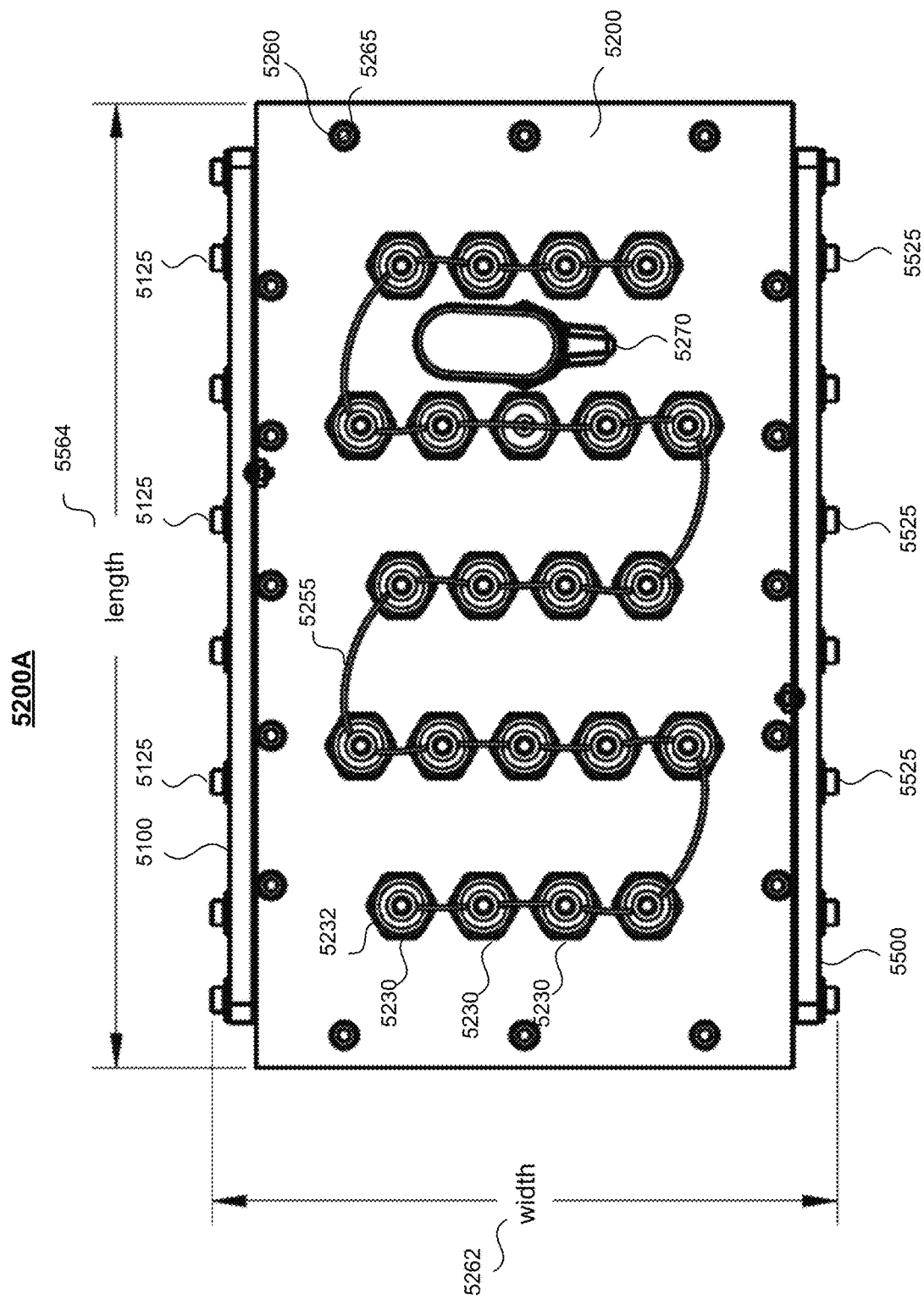

FIG. 5B shows a top view 5200A of the example single reactor 500. Carbon anode units 5230 are placed in rows along the minor axis of top plate 5200. In the example of FIG. 5B, the anode units 5230 are placed in rows of alternating length, where, for example, a first row has four anode units 5230, the second row has five anode units 5230, the third row has four anode units 5230, and a fifth row has four anode units 5230. Each anode unit 5230 has a predetermined length and diameter with the length being longer than the diameter of the anode unit. The anode units have high surface area to increase the surface area of the exposure of the anodes to the liquid in the reactor. Each anode unit 5230 may be attached to the top plate 5200 via a fitting 5232 that holds the anode unit 5230 at a predetermined height in the reactor 500, and which can provide a liquid seal to prevent the liquid in the reactor from leaking out. Each anode unit 5230 is electrically conductive and physically connected to the fitting 5232, where the anode unit 5230 is connected to a wire 5255 that electrically connects all of the anode units together to form the reactor anode. In some example embodiments, the electrical connections (e.g., wires 5255) between the anode units 5230 may be enclosed inside the main reactor housing 5000. Holes 5260 in top plate 5200 allow for fasteners 5265 to be inserted to attach top plate 5200 to reactor main housing 5000. Interface 5270 passes through a hole (not shown) in top plate 5200 and attaches to vent tube 5250 to allow venting of the inside of reactor main housing 5000. Interface 5270 can include a valve allowing the build gasses to escape from the main housing 5000 when interface 5270 is open.

Figure 5C:
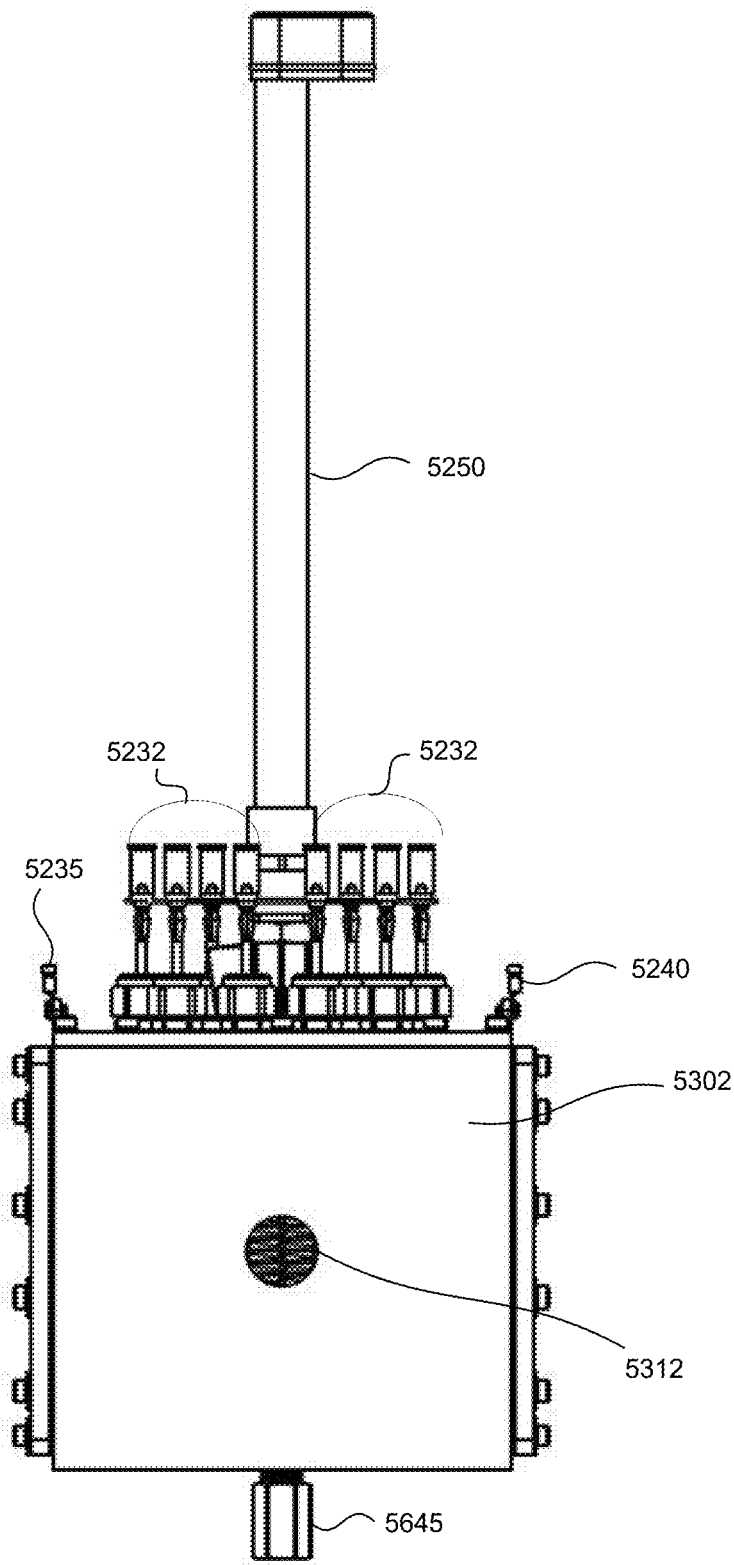

FIG. 5C shows an end view 5300A of the example single reactor 500. The end plate 5302 of the reactor 500 may be part of the reactor main housing 5000. End plate 5302 has a hole 5312 to allow for fluid to flow in/out of the reactor. The end plate at the opposite end of the reactor 500 also has another hole to allow for fluid to flow out/in of the reactor. The size of the hole 5312 and the hole at the other end of the reactor may be selected to allow/restrict the flow of liquid to a predetermined flow rate which may be based on the rate at which the reactor 500 can process the liquid. Also shown in FIG. 5C are vent tube 5250, vent tube interface 5270, first side cathode contact 5235, second side cathode contact 5240 and drain 5645.

Figure 5D:
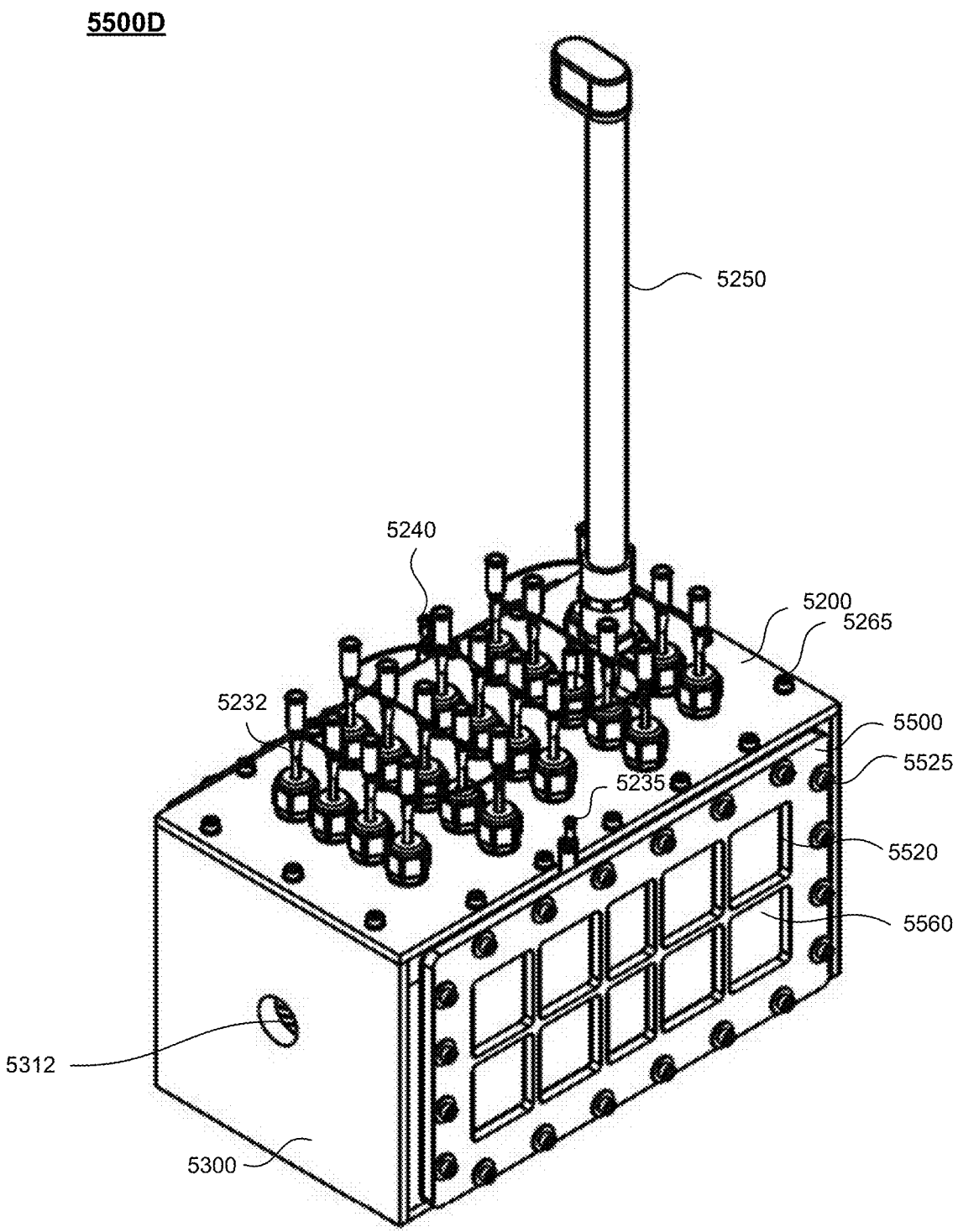

FIG. 5D shows an elevation view 5500D of the example single reactor 500. Shown in FIG. 5D are vent tube 5250, vent tube interface 5270, first side cathode contact 5235, second side cathode contact 5240, drain 5645, fasteners 5525 and 5265, top plate 5200, end plate 5302, side plate 5500, side plate openings 5520, hole 5312, and air permeable cathode 5560.

Figure 5E:
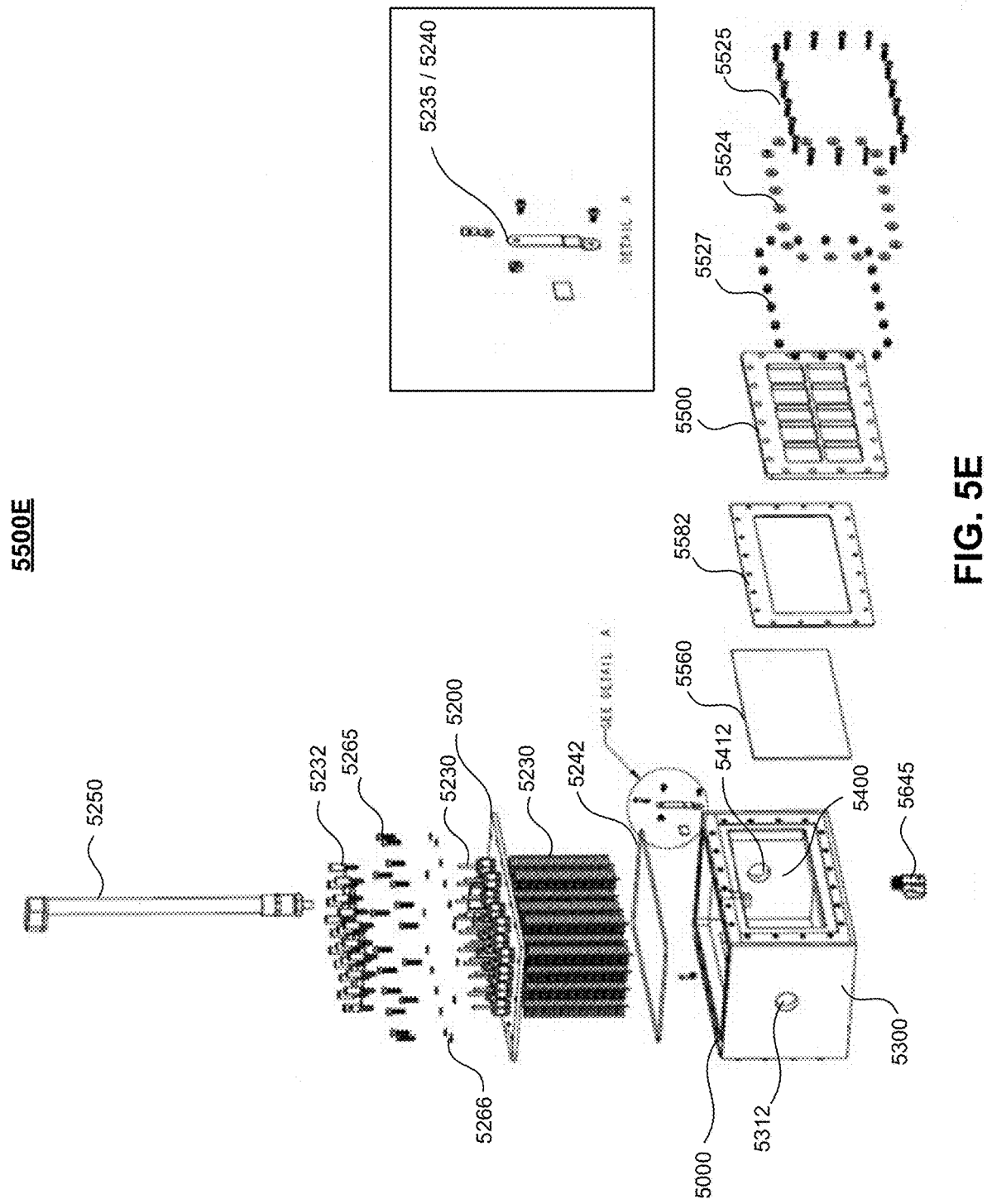

FIG. 5E shows an exploded view 5500E of the example single reactor 500. Shown are reactor main housing 5000, top plate 5200, vent tube 5250, first side cathode contact 5235, second side cathode contact 5240, fittings 5232, fasteners 5265, washers 5266, and anode units 5230. Also shown is gasket material 5242 used to seal the top plate 5200 to the reactor main housing 5000 to prevent leakage of the liquid inside the reactor between the top plate 5200 and the reactor housing. Also shown in FIG. 5E are side plate 5500, side plate openings 5520, fasteners 5525, washers 5526, inserts 5527, gasket material 5582, and one of the two air permeable cathodes 5560. Also shown are end plates 5300 and 5400 with holes 5312 and 5412 and drain 5645.

In some example embodiments, the dimensions of the reactor include a height of 7.5 inches (e.g., see 5557 on FIG. 5A), a length of 13.26 inches (e.g., see 5564 on FIG. 5A), and a width of 8.59 inches (e.g., see 5262 on FIG. 5B). Single reactor embodiments of other sizes may be produced as well.

In various implementations, the single reactor performance may depend, at least in part, on the dimensions of the reactor. For example, a reactor that is significantly bigger or smaller may perform less well than a reactor with the approximate dimensions given above. A reactor width (e.g., in width dimension 5262) that is too wide will increase the spacing between the cathodes and anode units in the middle of the reactor introducing high internal resistance and decreasing the proton flux from the anode units to the cathodes. For example, high internal resistance and decreased proton flux will reduce the generated current and COD removal efficiency of the reactor. A reactor length (e.g., in length dimension 5564) that is too long may introduce different or nonuniform flow patterns of the fluid being treated, which can cause decreased flow dynamics in the core of the reactor. For example, the liquid flow in a longer reactor is usually slower and less uniform, introducing zones in the reactor lacking proper flow dynamics. Slower and non-uniform liquid flow also decreases current recovery and removal rates of the reactor. Notably, a smaller width of the reactor might allow oxygen intrusion around the anode units, which impede bacterial activity. In addition, smaller reactor treats less volume.

As such, the example single reactor 500 includes a spatial configuration of the separated cathodes (e.g., air permeable cathode plates) that surrounds the anode units on at least two sides that optimizes (i) the spacing (e.g., distance) between anodes and cathodes for facilitating efficient microbial-catalyzed redox reactions, (ii) the ability for constituent entry and diffusion (e.g., such as oxygen) into and within the reactor, and (iii) modularity of the reactor components for ease of modifications to be made, e.g., to allow custom tailoring of the reactor for different applications and/or to allow repair.

The example single reactor 500 includes a length-to-width aspect ratio of 1.54. In some embodiments, the length-to-width aspect ratio of the modular MFC devices can be in a range of ~1.1 to ~2.0. The example single reactor 500 includes a length-to-height aspect ratio of 1.77 and a width-to-height aspect ratio of 1.15. In some embodiments, the length-to-height aspect ratio of the modular MFC devices can be in a range of ~1.3 to ~2.3; and/or the width-to-height aspect ratio of the modular MFC devices can be in a range of ~0.8 to ~1.5.

FIG. 6A shows a diagram depicting various views of an example embodiment of a single bioelectrochemical reactor, labeled 600. The reactor main housing 1100 may be produced using an injection molding or other molding process. Side plates 1520 and 1120 can also be produced using injection molding or other molding process. Side plates 1520 and 1120 may be attached to the reactor main housing 1100 via fasteners 1525 such as screws or other type of fastener. A gasket 1582 and an air permeable cathode 1560 may be placed between each side plate and the reactor main housing 1100. The gasket 1582 may be compressed by fasteners 1525 to seal the main housing and side plates to prevent fluid from leaking out from inside the reactor. The air permeable cathodes on each side of the reactor are electrically connected to cathode contacts 1235 and 1240. Vent tube 1250 at the top of the reactor allows for venting of gas from the reactor and the vent tube may include a valve to open/close the vent tube. Drain 1645 allows for draining the reactor. The reactor main housing 1100 has a hole 1310/1610 at each end, one for fluid input and one for output. Some example embodiments may have a length L (labeled 1564) of 320.6 millimeters (mm), a width W (labeled 1262) of 222.6 mm, and a height H (labeled 1555) of 231 mm (excluding an extended vent tube). Other sizes of the single reactor 600 may also be produced.

The example housing structure of the single reactor 600 is specifically designed for cost-efficient production by an injection molding manufacturing process where one reactor housing 1100 is produced using one mold. Main housing 1100 includes a first plate 1101 and a second plate 1102, which significantly decreases the amount of manufacturing steps and materials needed, e.g., eliminating the need of some components of the single reactor 500, such as top plate 5200, fasteners 5265, washers 5266 and gasket material 5242, as well as their assembly process. For example, a main housing and an anode plate can be manufactured as part of one body in reactor 600, which is produced using a single mold. Main housing 1100 of single reactor 600 may include specific features, in some embodiments, such as triangle ribs on the sides of the housing 1100 and rectangular ribs along the short side of housing 1100, which can provide physical stability and rigidity of the housing 1100. Notably, the example side plates 1520 and 1120 shown in FIG. 6A are identical and can also be manufactured by injection molding using one mold. Side plates 1520 and 1120, similar to the main housing body 1100, can be produced to have ribs for enhanced stability and rigidity.

Figure 6B:
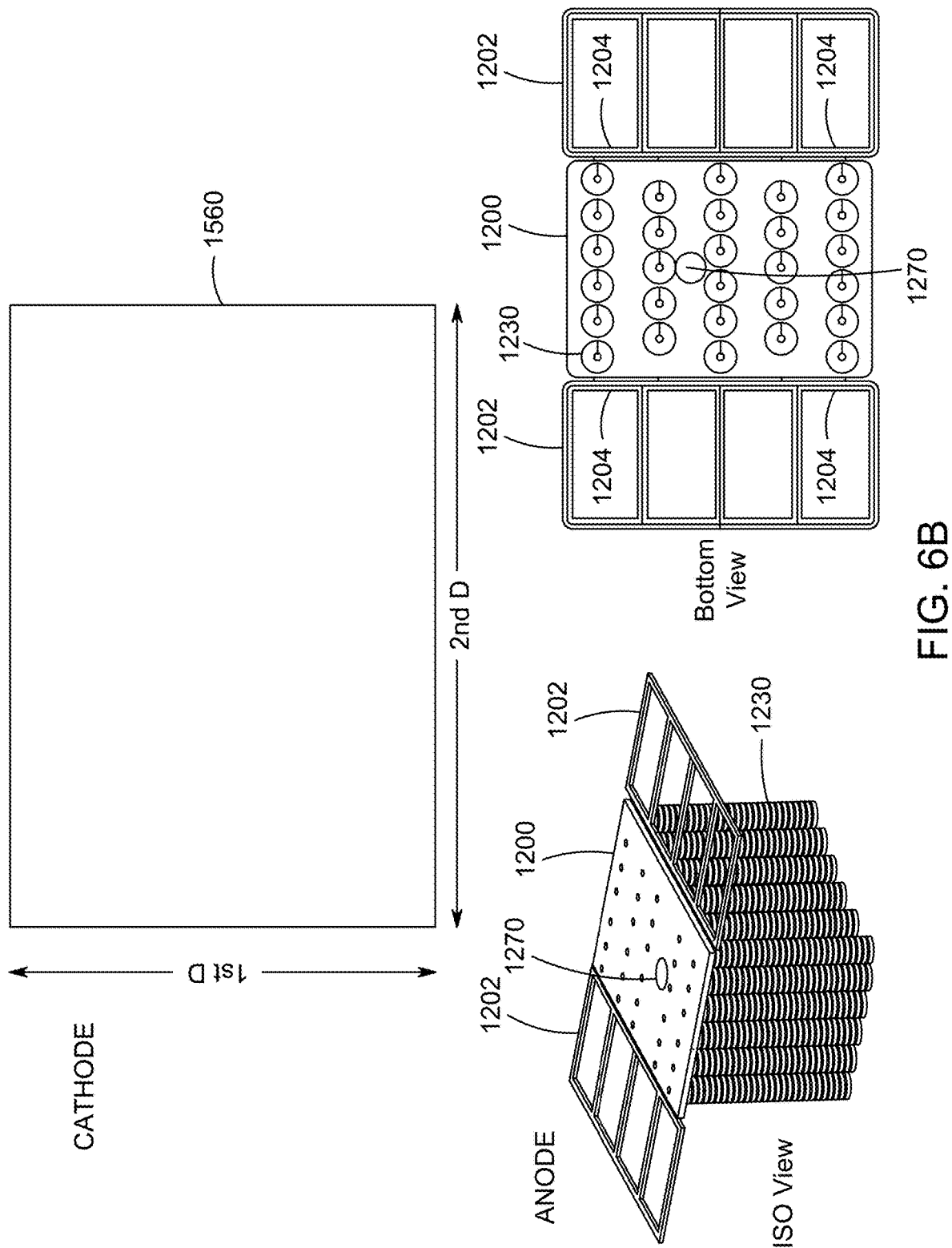
FIG. 6B shows examples of various views of an anode and a cathode of the single bioelectrochemical reactor of FIG. 6A.

FIG. 6B shows examples of various views of an anode and a cathode from the example single reactor 600. The reactor 600 can include the cathode 1560, which is an air permeable cathode in this example. In some examples, the air permeable cathode 1560 includes a carbon or other conductive textile material with a gas-diffusion layer. In some embodiments, the cathode 1560 includes carbon powder pressed on metal or carbon current collector. In some embodiments, the cathode 1560 can include a cathode with air permeable membrane to allow air permeability. In some embodiments, the cathode 1560 can include a cathode with impregnated polymer to for air permeability and liquid resistivity. For example, in some embodiments, the air permeable cathode 1560 can be configured to have a first dimension of 279.6 mm and a second dimension of 190 mm. The example air permeable cathode is electrically conductive and allows air to pass through the cathode while not allowing liquid to pass through the cathode. This allows for air to reach the fluid inside the reactor while keeping the fluid in the reactor 600.

Also shown in FIG. 6B is anode plate 1200 of the reactor 600, which is integrated with anode units 1230. The anode units may be electrically connected together via wires above or below anode plate 1200 and may not require anode fittings. Anode plate 1200 may include foldable sides 1202 that are attached to the anode plate 1200 via hinges 1204. Foldable sides 1202 may be capable of being folded down to a position that is roughly parallel to the anode units 1230, which can be used as a support for cathodes 1560 and/or to facilitate the assembly process. Anode plate 1200 may have a hole to aligned with the vent tube 1250 to allow for venting.

Figure 6C:
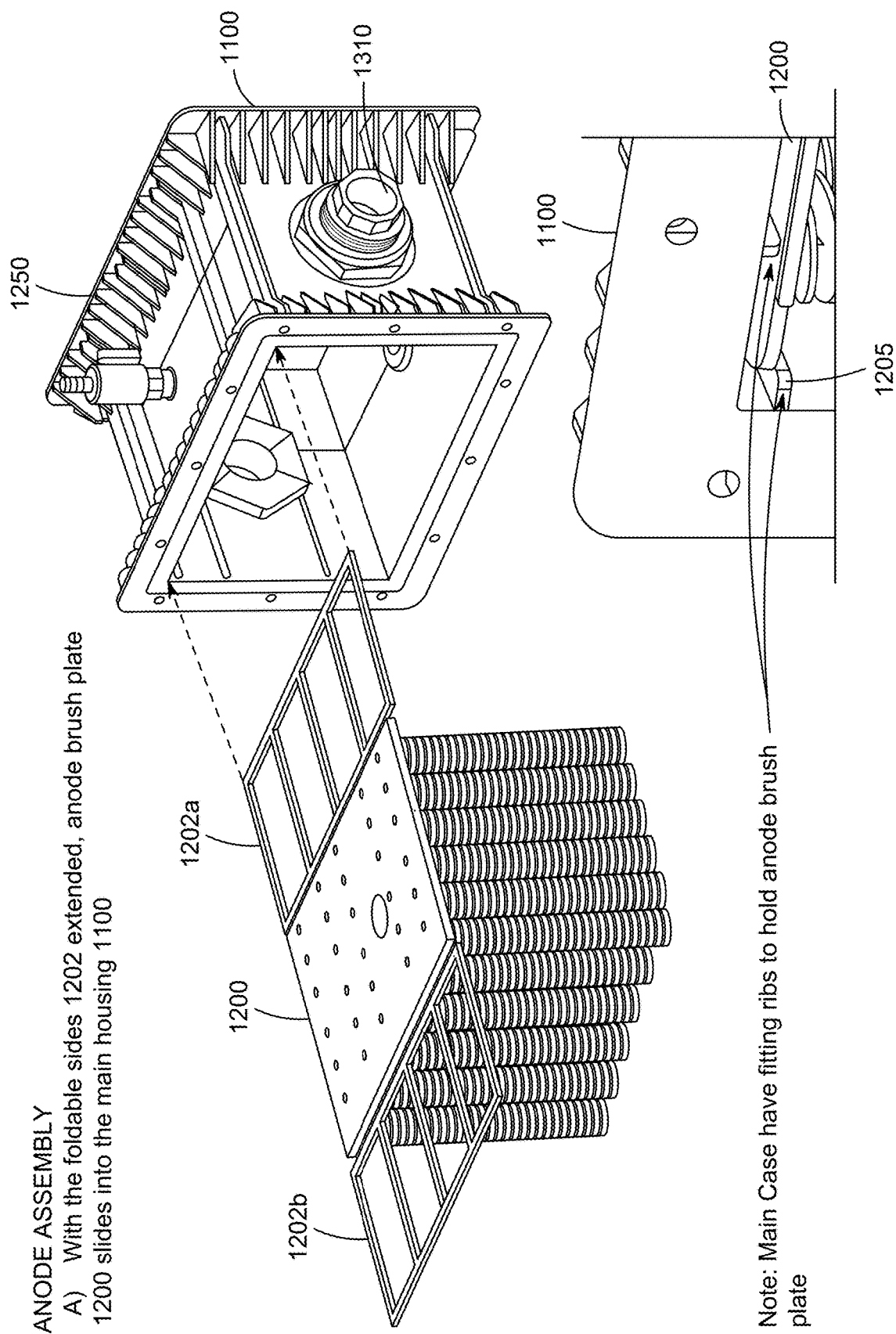
FIG. 6C shows examples of fitment of an anode assembly into a housing of the single bioelectrochemical reactor of FIG. 6A.

FIG. 6C shows an example of fitment of an anode assembly into a housing for the example single reactor 600. The anode assembly includes anode units 1230 that may be electrically connected together, and anode plate 1200 with foldable sides 1202A/B, shown extended, is configured to slide into reactor main housing 1100. The anode plate 1200 may slide on ribs 1205 near the inside edge of each side of the main reactor housing 1200. Ribs 1205 can be molded as part of the reactor main housing 1100. A first foldable side 1205A may slide along the ribs 1205 through reactor main housing 1100 to the far side where the anode assembly is centered in the reactor main housing. Once foldable side 1202A is slid through, both foldable sides 1202A and 1202B can be folded down to a position parallel to the anode units.

FIG. 6D shows an example of fitment of an anode assembly into a main reactor housing for the example single reactor 600. As described above with respect to FIG. 6C, anode plate 1200 with foldable sides 1202A/B extended may be slid into reactor main housing 1100, and then the foldable sides folded down. The foldable sides include stop ribs 1207 to prevent the foldable sides from rotating beyond vertical and into the main reactor housing.

Figure 6E:
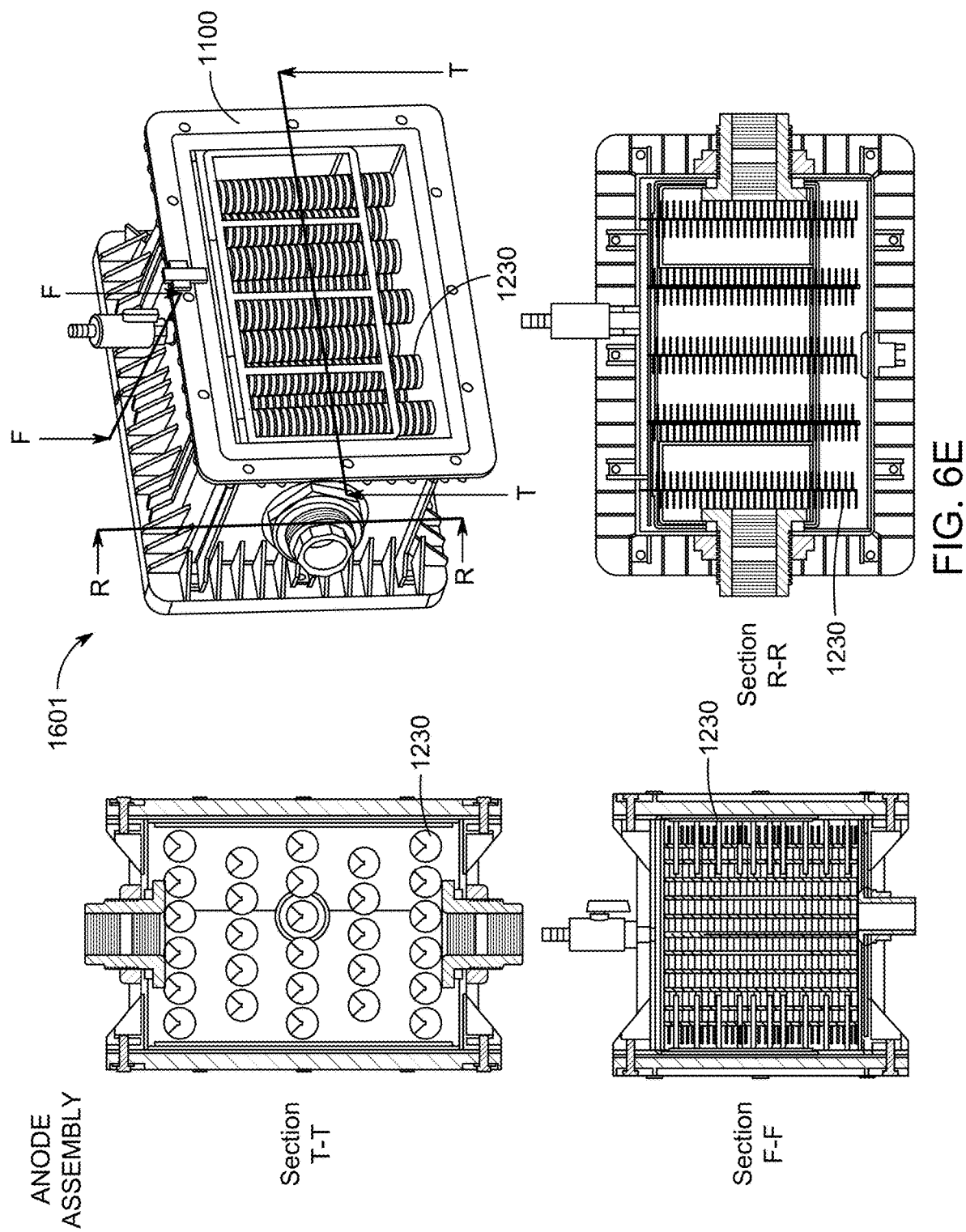
FIG. 6E shows examples of a housing for the single bioelectrochemical reactor of FIG. 6A with anodes in place.

FIG. 6E shows examples of cross-sectional views of the example single reactor 600 with the anode assembly in place. The cross-sectional views T-T, F-F, and R-R are identified in the view labeled 1601.

Figure 7A:
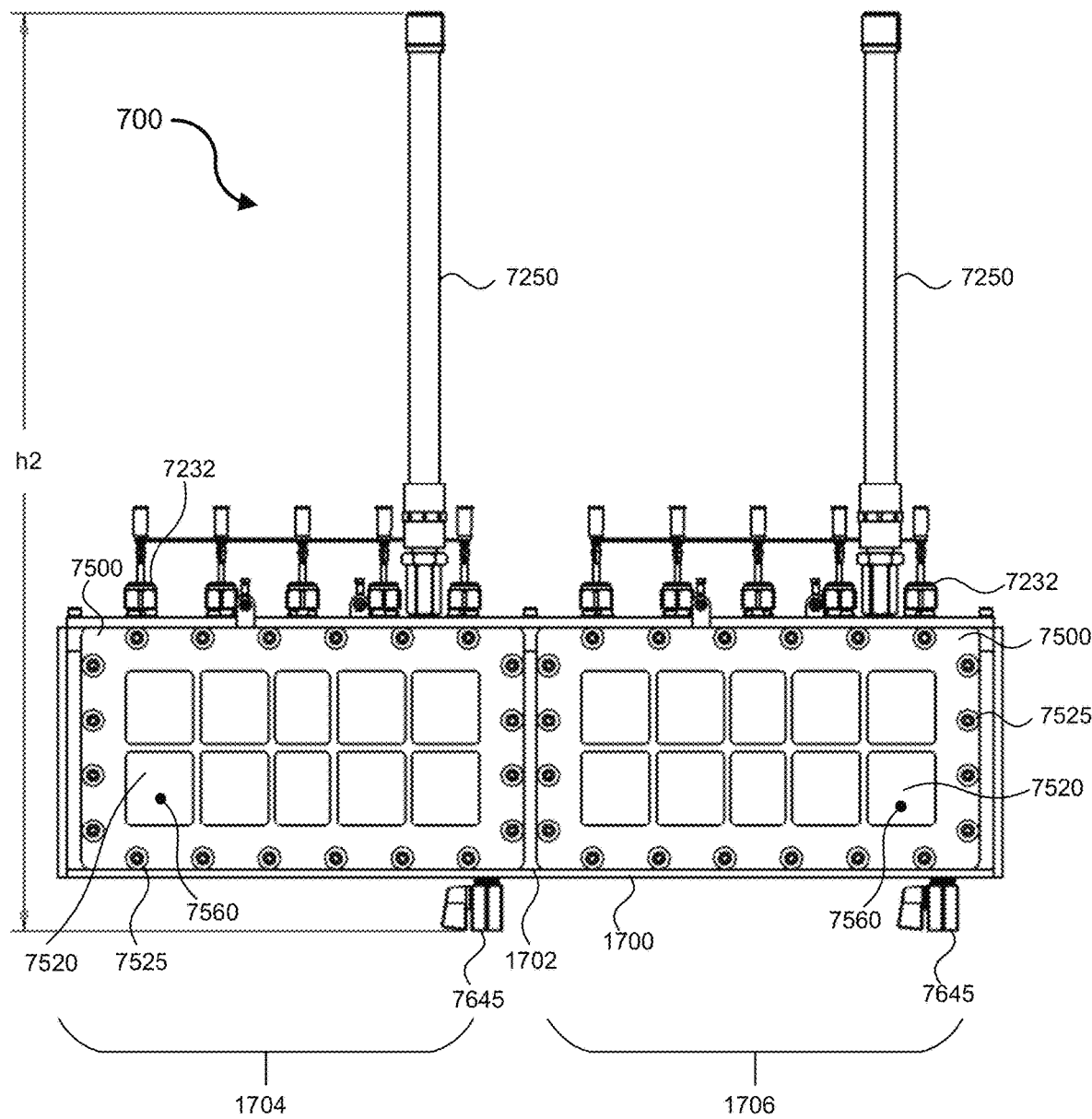
FIGS. 7A-7E show diagrams for various views of an example embodiment a double bioelectrochemical reactor in accordance with the present technology.

FIG. 7A shows a side view 7500A of the example double bioelectrochemical reactor 700. Some features of the double reactor 700 are similar to some features of the single reactor 500, which may be recognized by the last three numerals in the four-digit reference numeral of the feature. The double bioelectrochemical reactor 700 includes a double reactor main housing 1700, which has a single wall 1702 that is shared by a first bioelectrochemical reactor 1704 and a second bioelectrochemical reactor 1706. Other than the shared wall, reactors 1704 and 1706 are both similar to the single reactor 500 described in connection with FIGS. 5A-5E. The shared wall 1702 has a single opening for the output of one reactor and the input to the other reactor. The first reactor 1704 and second reactor 1706 each include vent tubes 7250, drains 7645, anode fittings 7232, anode units 7230 (not shown), side plates 7500, fasteners 7525, openings 7520, and air permeable cathodes 7560, as well as other features described in FIGS. 7A-7E.

Figure 7B:
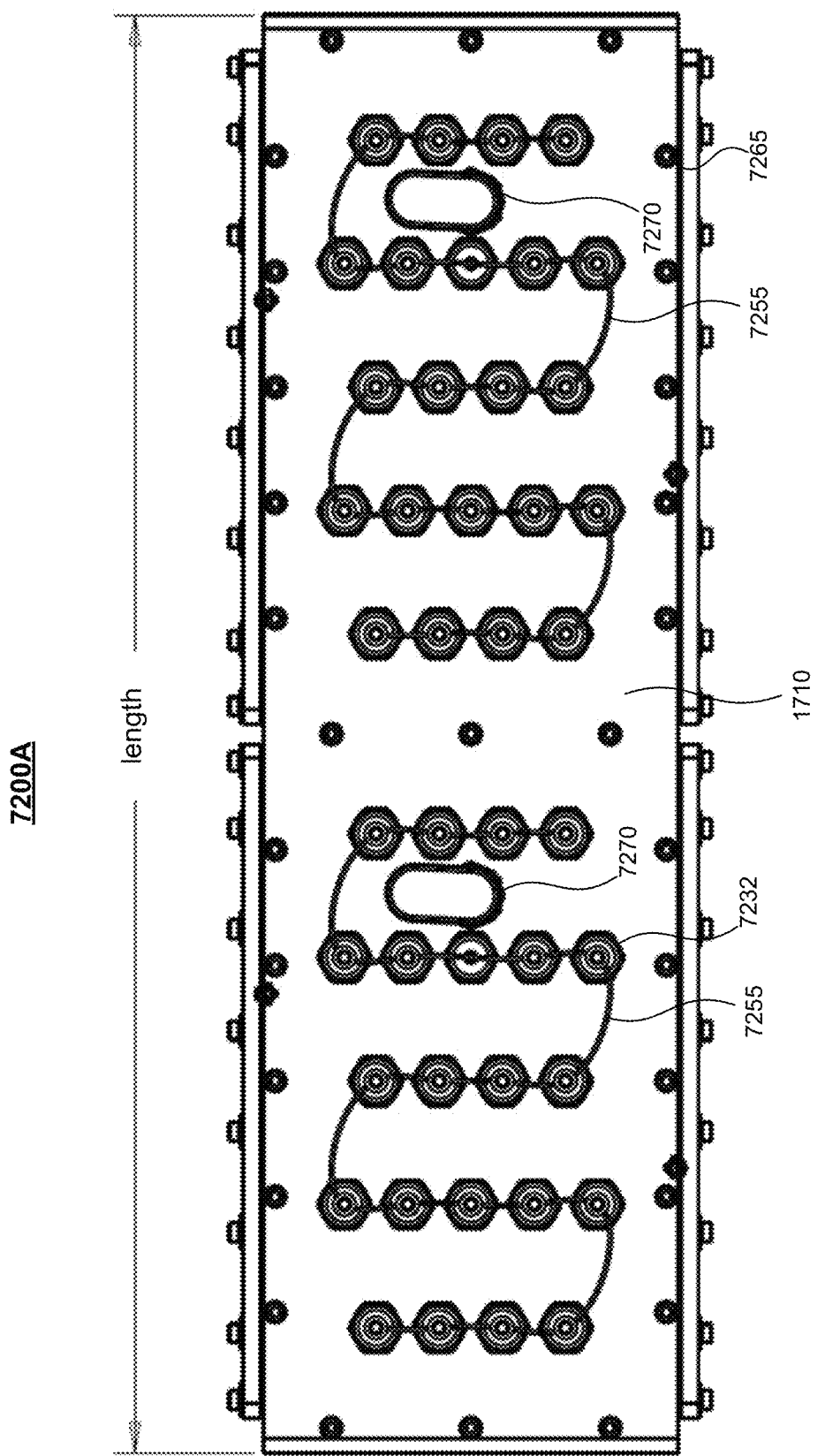

FIG. 7B shows a top view 7200B of the example double reactor 700. The top of the double reactor includes vent tube interfaces 7270, fittings 7232, wire 7255, and fasteners 7265. Top plate 1710 for the double reactor may be a single plate covering the tops of both reactors 1704 and 1706.

Figure 7C:
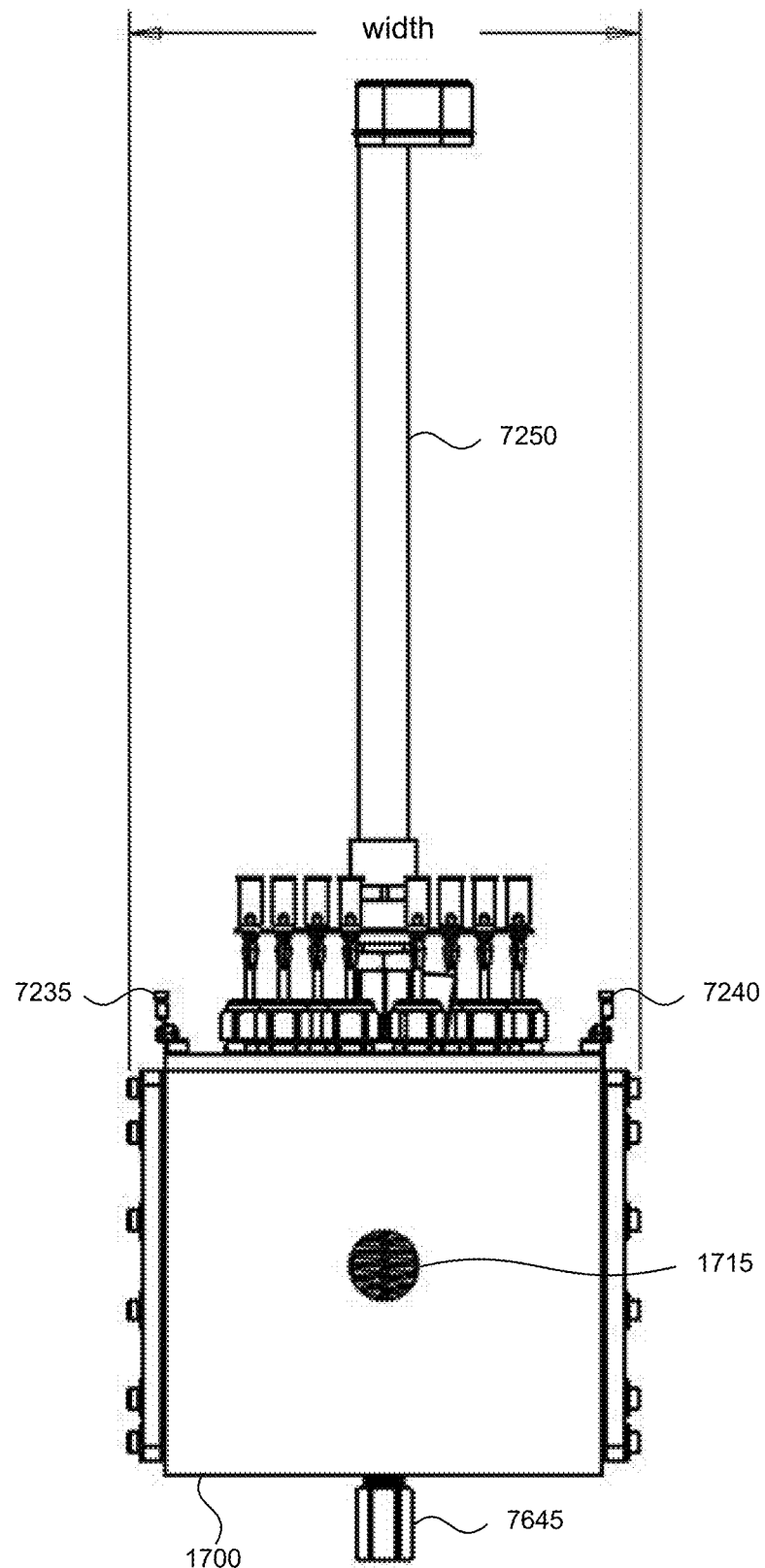

FIG. 7C shows an end view 7300A of the example double reactor 700. The end view in FIG. 7C is similar to the end view in FIG. 5C with respect to the single reactor 500. For the double reactor 700, a fluid input hole 1715 allows for fluid entry into the first reactor 1704. The first reactor 1704 and second reactor 1706 each include vent tubes 7250, drains 7645, fittings 7232, anode units 7230, side plates 7500, fasteners 7525, as shown later in FIG. 7E. The vent tubes 7250, fittings 7232, cathode contacts 7235 and 7240, drains 7645 and fasteners 7525 of the two reactors 1704 and 1706 overlap in FIG. 7C so that the elements of the reactor furthest into the page are not visible.

Figure 7D:
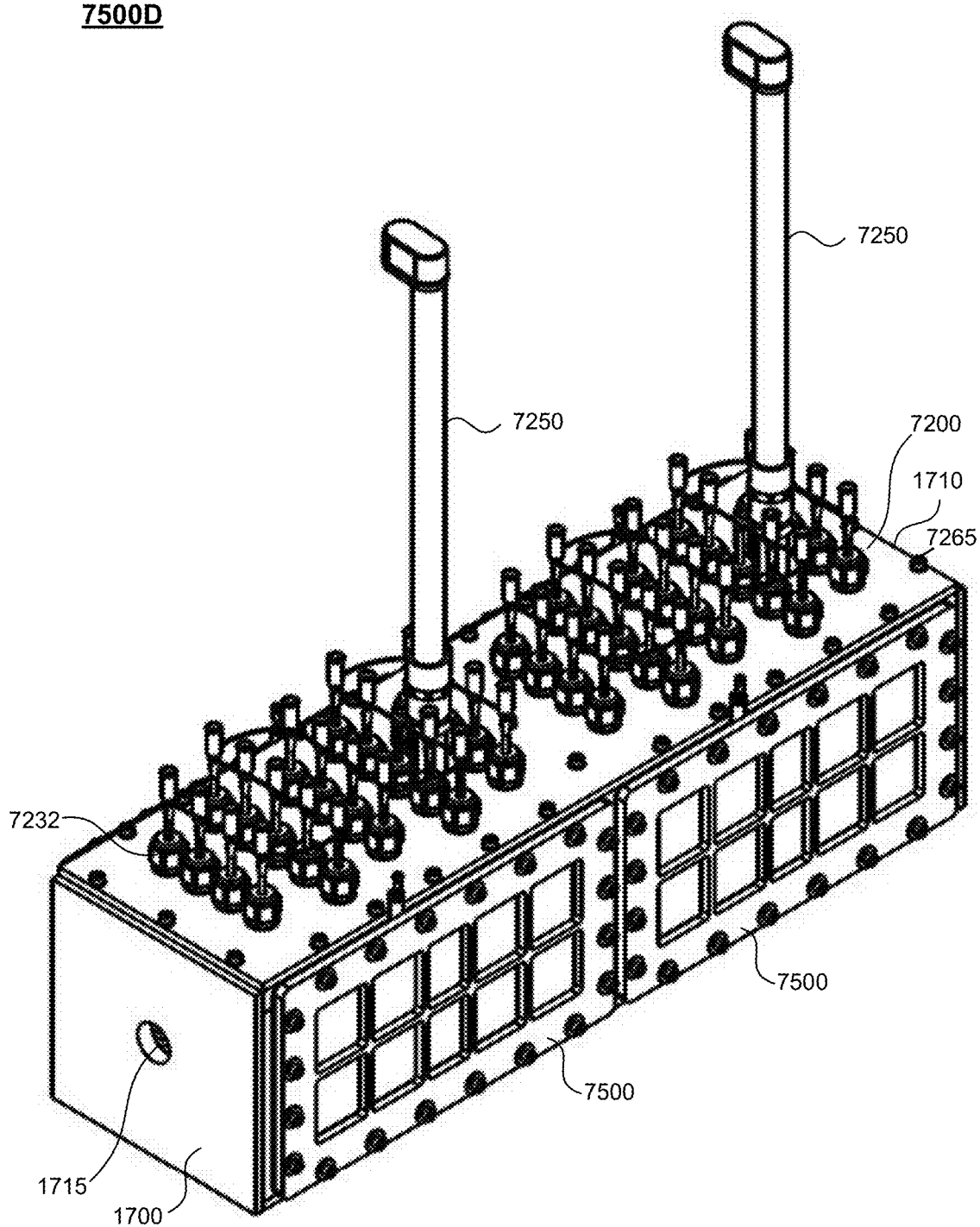

FIG. 7D depicts an elevation view of a double reactor. Many of the features described above in FIGS. 7A-7C and 5A-5E are shown.

FIG. 7D shows an elevation view 7500D of the example double reactor 700. Shown in FIG. 7D are vent tube(s) 7250. Also shown among FIGS. 7A-7E include vent tube interface 7270, first side cathode contact(s) 7235/7235A, second side cathode contact(s) 7240/7240, drain 7645, fasteners 7525 and 7265, top plate 7200, end plate 7302, side plate(s) 7500, side plate openings 7520, hole 1715, and air permeable cathode(s) 7560.

Figure 7E:
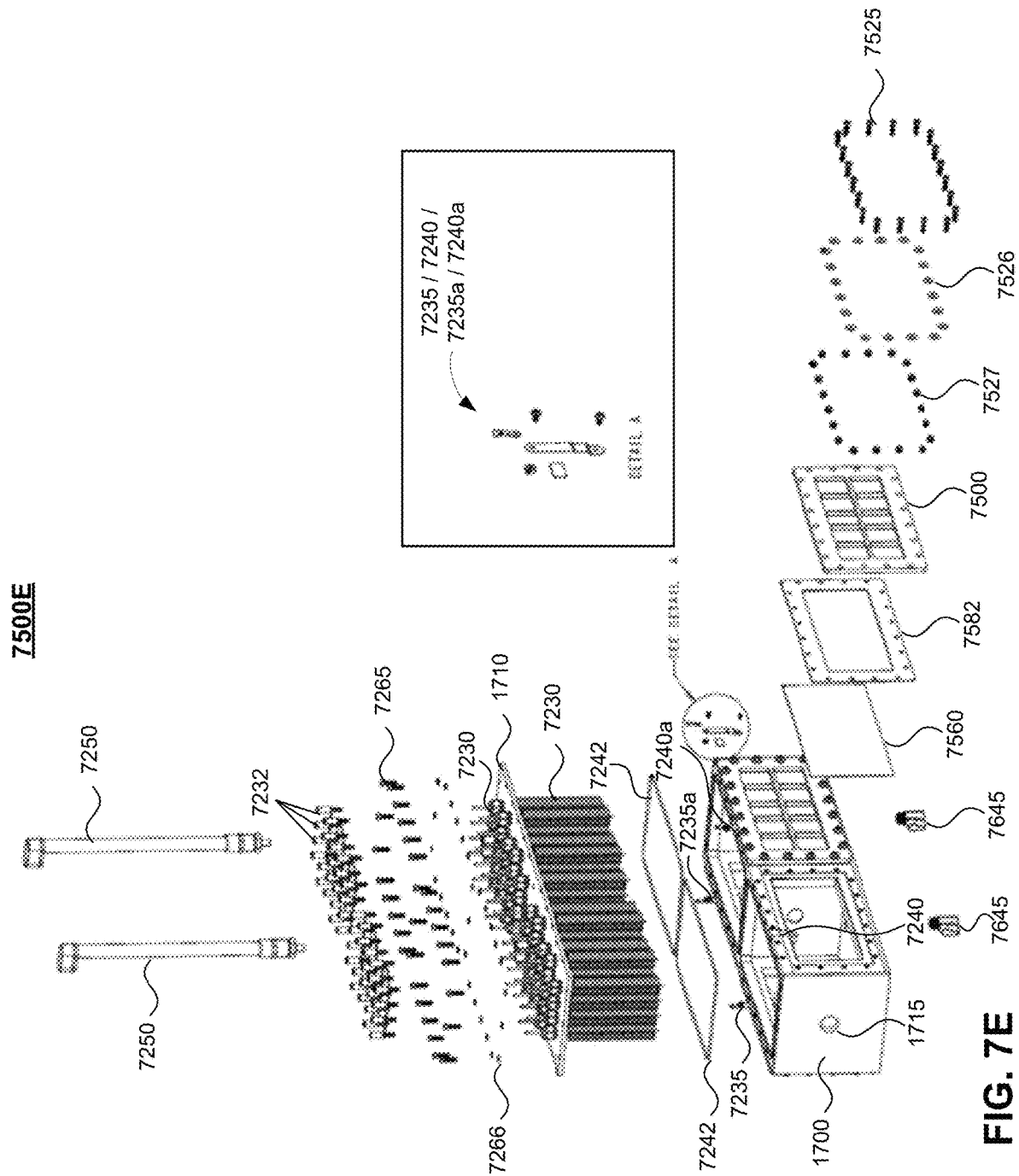

FIG. 7E shows an exploded view 7500E of the example double reactor 700. Shown are reactor main housing 1700, top plate 1710, vent tubes 7250, first side cathode contacts 7235 and 7235A, second side cathode contacts 7240 and 7240A, fittings 7232, fasteners 7265, washers 7266, and carbon anode units 7230. Also shown is gasket material 7242 used to seal the top plate 1710 to the reactor main housing 1700 to prevent leakage of the liquid inside the reactor between the top plate 1710 and the reactor housing. Also shown in FIG. 7E are side plates 7500, side plate openings 7520, fasteners 7525, washers 7526, inserts 7527, gasket material 7582, and air permeable cathodes 7560, and single wall 1702 with an opening between reactors 1704 and 1706. The end plates have holes 1710.

In some example embodiments, the dimensions of a double reactor are 7.5 inches height (from top plate to bottom plate) and 24.93 inches high (including the length of the vent tubes), by 25.62 inches long, and by 8.59 inches wide. Double reactors of other sizes may be produced as well. Reactor performance may depend, at least in part, on the dimensions of the reactor where a reactor that is significantly bigger or smaller may perform less well that a reactor with the approximate dimensions given above. In some example embodiments, the anode units and electrical connections may be enclosed inside the main reactor housing.

The example double reactor 700 includes a length-to-width aspect ratio of 2.98. In some embodiments, the length-to-width aspect ratio of the modular MFC devices having a double reactor configuration can be in a range of ~2.1 to ~3.9. The example double reactor 700 includes a length-to-height aspect ratio of 3.42 and a width-to-height aspect ratio of 1.15. In some embodiments, the length-to-height aspect ratio of the modular MFC devices having a double reactor configuration can be in a range of ~2.4 to ~4.4; and/or the width-to-height aspect ratio of the modular MFC devices having a double reactor configuration can be in a range of ~0.8 to ~1.5.

Figure 8A:
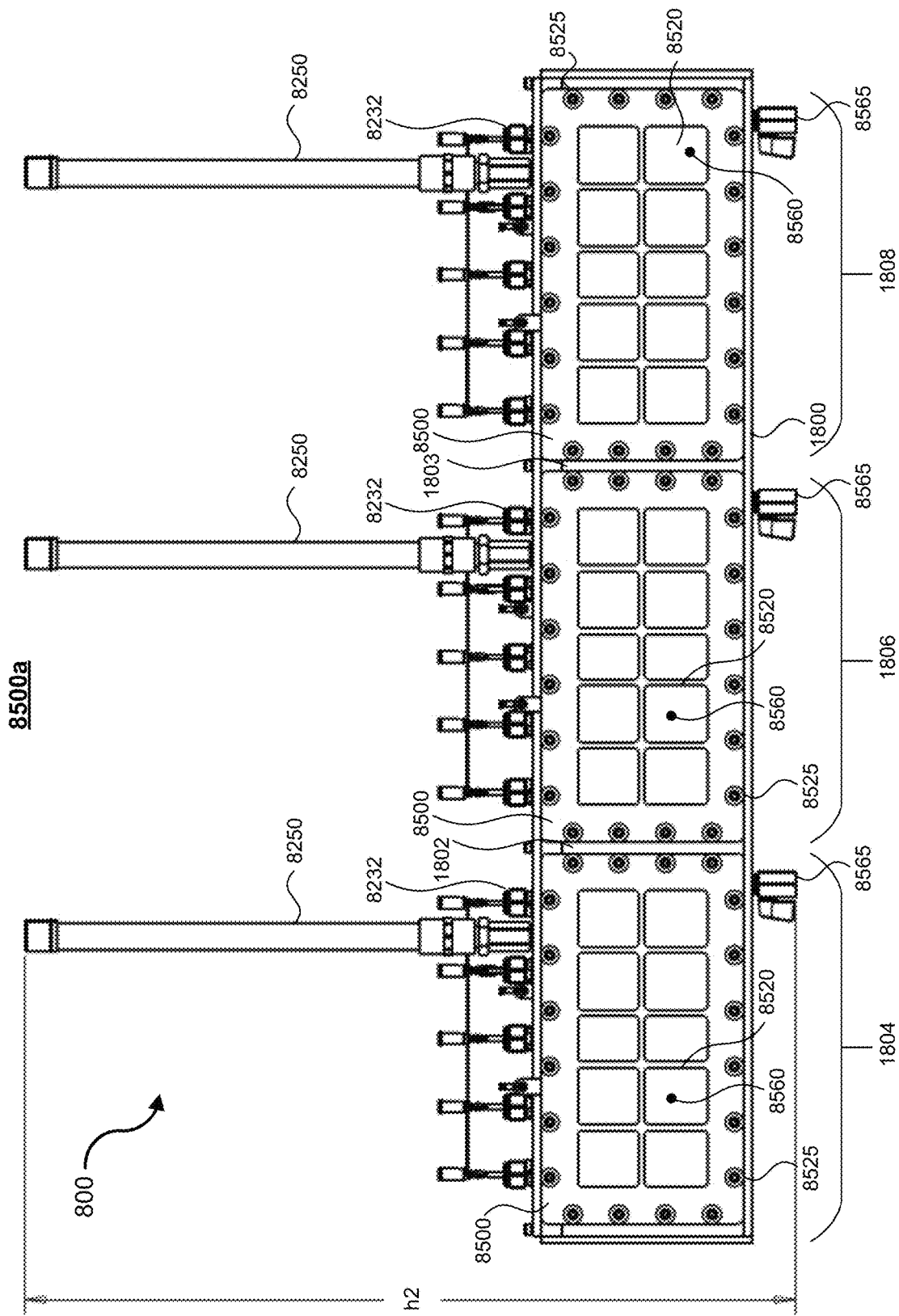
FIGS. 8A-8E show diagrams for various views of an example embodiment a triple bioelectrochemical reactor in accordance with the present technology.
Figure 8B:
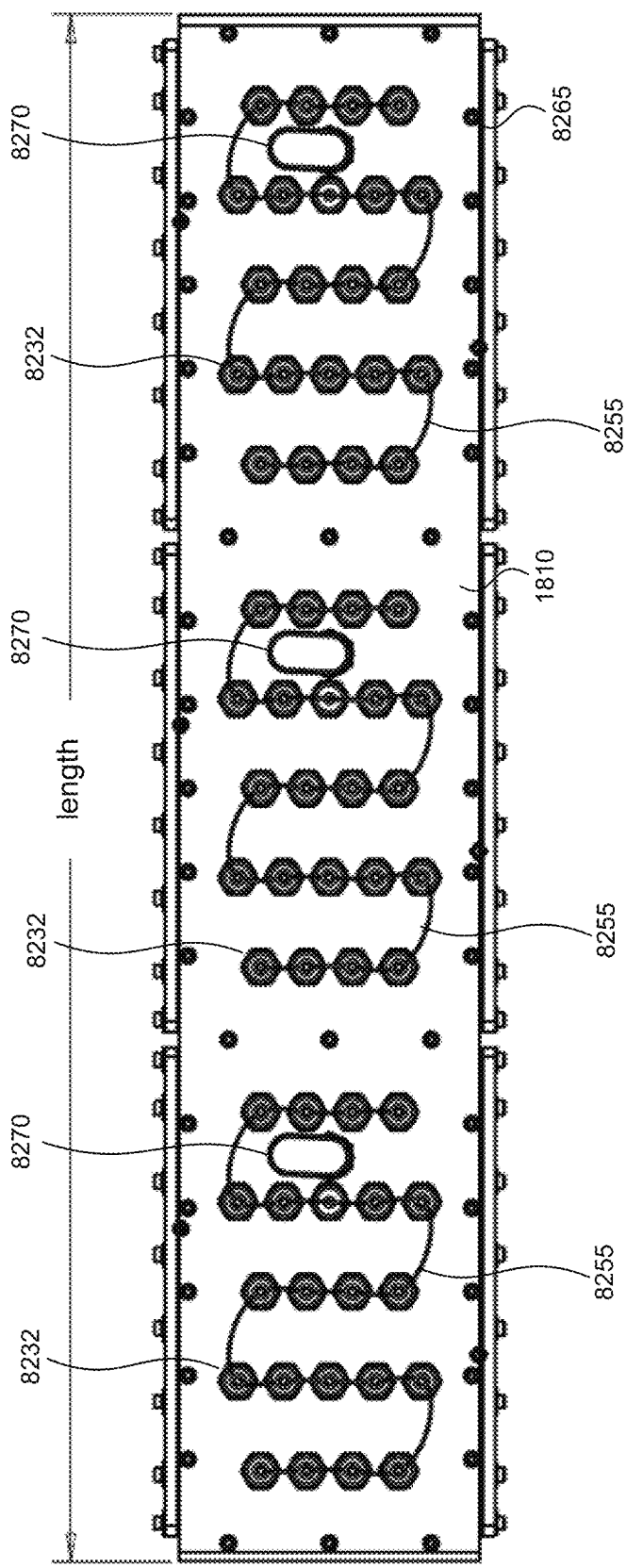

FIG. 8A shows a side view 8500A of the example triple bioelectrochemical reactor 800. Some features of the triple reactor 800 are similar to some features of the single reactor 500 and/or the double reactor 700, which may be recognized by the last three numerals in the four-digit reference numeral of the feature. The triple bioelectrochemical reactor 800 includes a triple reactor main housing 1800, which can be configured to have a single wall that is shared by a first bioelectrochemical reactor 1804, a second bioelectrochemical reactor 1806, and a triple bioelectrochemical reactor 1808. In the example shown in FIGS. 8A-8E, the triple reactor main housing 1800 has a first wall 1802 that is shared by a first reactor 1804 and second reactor 1806, and a second wall 1803 that is shared by the second reactor 1806 at the opposite end to 1802 and third reactor 1808. Other than the shared wall, reactors 1804, 1806 and 1808 are similar to the single reactor 500 described in connection with FIGS. 5A-5E. The shared wall 1802 has a single opening from the output of reactor 1804 to the input of reactor 1806 and shared wall 1803 has a single opening from the output of reactor 1806 to the input of reactor 1808. The first reactor 1804, second reactor 1806, and third reactor 1808 each include vent tubes 8250, drains 8565, anode fittings 8232, anode units 8230 (not shown), side plates 8500, fasteners 8525, openings 8520, and air permeable cathodes 8560, as well as other features described in FIGS. 8A-8E FIG. 8B shows a top view 8200B of the example triple reactor 800. The top of the triple reactor is similar to the top of the single and double reactors which include vent tube interfaces 8270, fittings 8232, wire 8255, and fasteners 8265 as described above. Top plate 1810 for the triple reactor may be a single plate covering the tops of all three reactors 1804, 1806, and 1808.

Figure 8C:
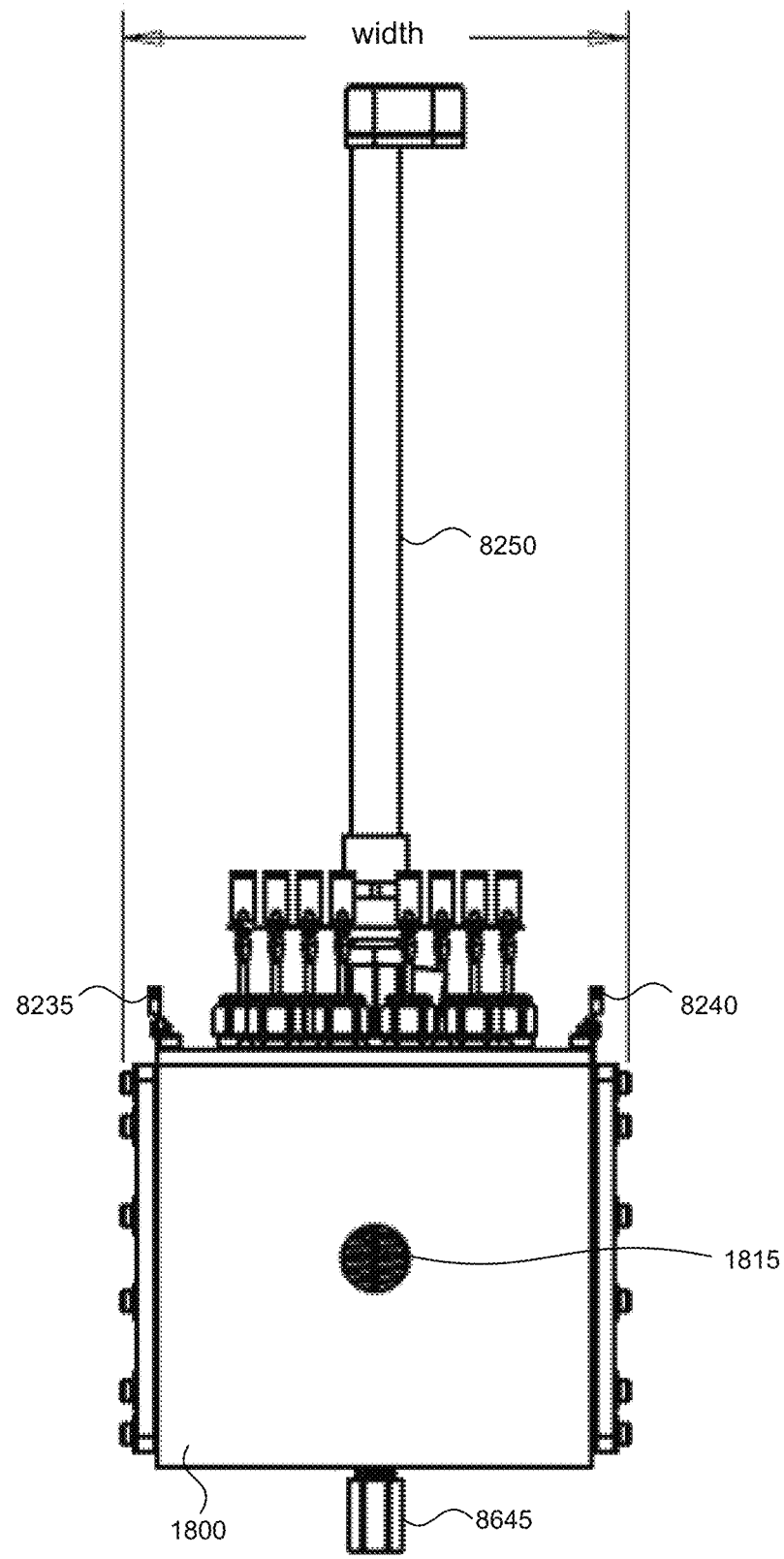

FIG. 8C shows an example of fitment of an anode assembly into a housing for the example single reactor 800. The end view in FIG. 8C is similar to end views shown in FIG. 7C and FIG. 5C. A fluid input hole 1815 allows for fluid entry into the first reactor 1804. The first reactor 1804, second reactor 1806, and third reactor 1808 each include vent tubes 8250, drains 8645, fittings 8232, anode units 8230, side plates 8500, fasteners 8525. The vent tubes 8250, fittings 8232, cathode contacts 8235 and 8240, drains 8645 and fasteners 8525 of the three reactors 1804, 1806, and 1808 overlap in FIG. 8C, and therefore these elements of the second and third reactors furthest into the page are not visible.

Figure 8D:
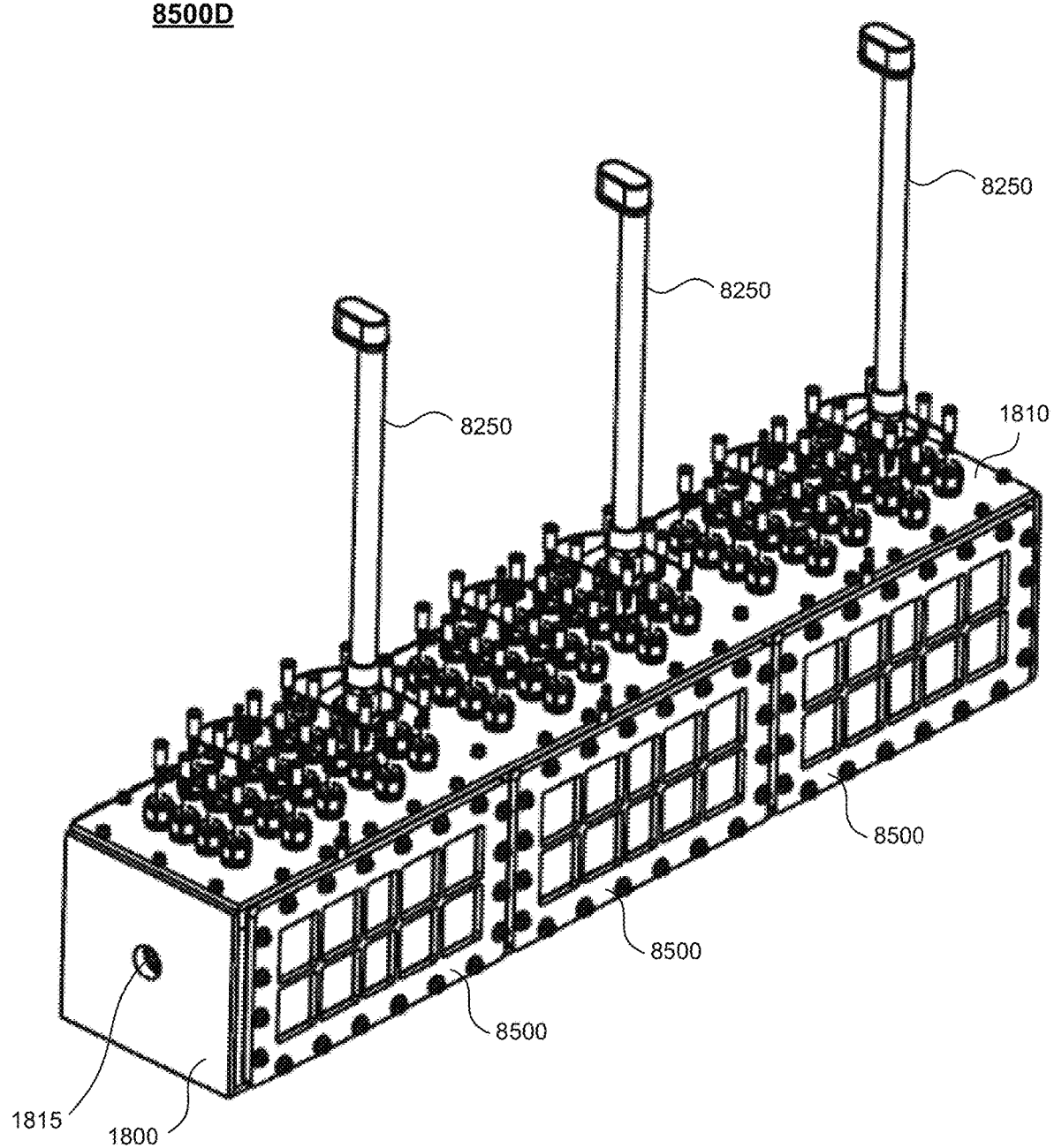

FIG. 8D shows an elevation view 8500D of the example triple reactor 800. Shown in FIG. 8D are vent tube(s) 8250.

Figure 8E:
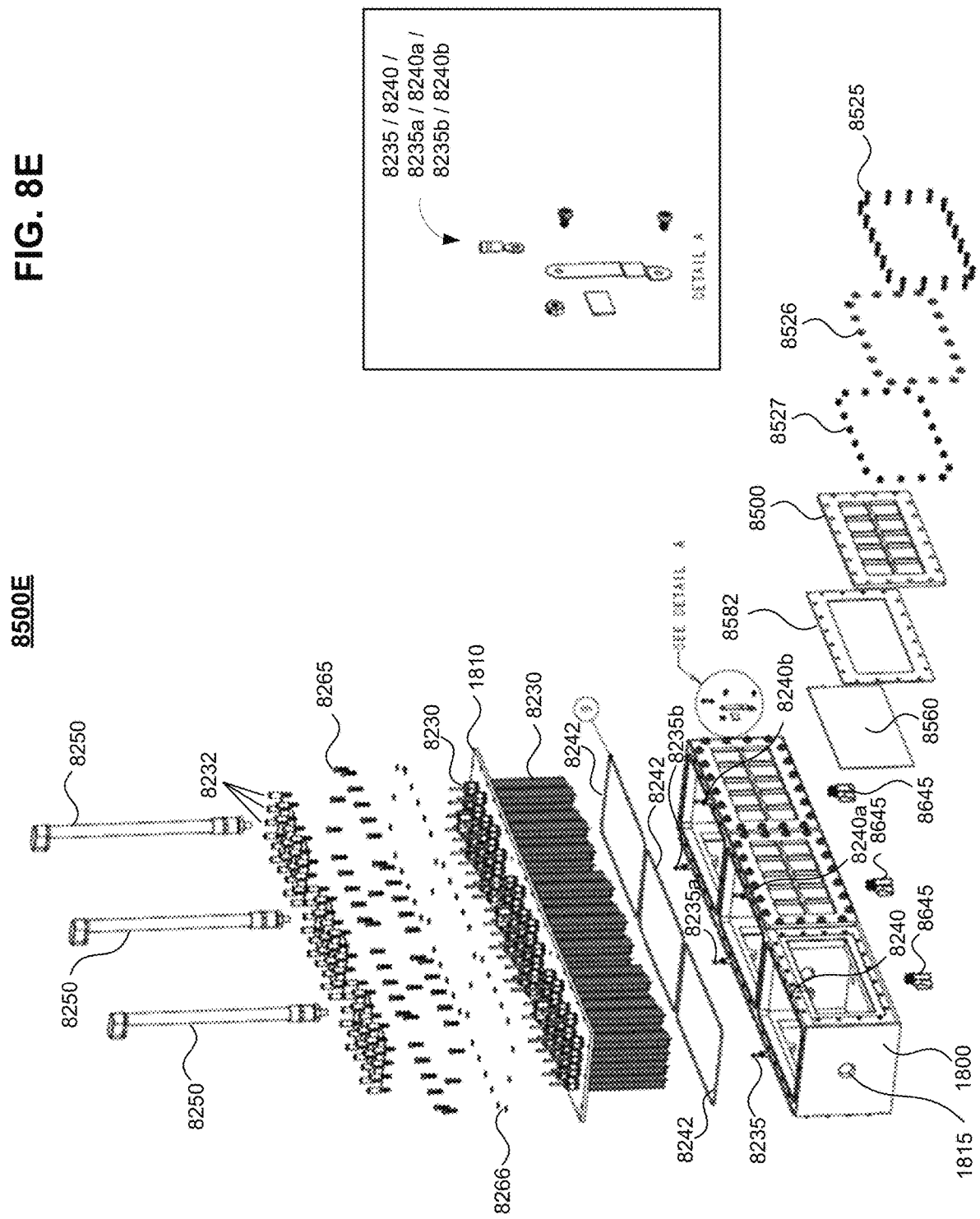

FIG. 8E shows an exploded view 8500E of the example triple reactor 800. Shown are reactor main housing 1800, top plate 1810, vent tubes 8250, first side cathode contacts 8235, 8235A, and 8235B, second side cathode contacts 8240, 8240A, and 8240B, fittings 8232, fasteners 8265, washers 8266, and carbon anode units 8230. Also shown is gasket material 8242 used to seal the top plate 1810 to the reactor main housing 1800 to prevent leakage of the liquid inside the reactor between the top plate 1810 and the reactor housing. Also shown in FIG. 8E are side plates 8500, side plate openings 8520, fasteners 8525, washers 8526, inserts 8527, gasket material 8582, and air permeable cathodes 8560, wall 1802 with an opening between reactors 1804 and 1806, and wall 1803 with an opening between reactors 1806 and 1808. The end plates have holes 1815.

In some example embodiments, the dimensions of the reactor are 7.5 inches height (from top plate to bottom plate) and 24.93 inches high (including the length of the vent tubes), by 37.98 inches long, and by 8.59 inches wide. Triple reactors of other sizes may be produced as well. Reactor performance may depend, at least in part, on the dimensions of the reactor where a reactor that is significantly bigger or smaller may perform less well that a reactor with the approximate dimensions given above. In some example embodiments, the anode units and electrical connections may be enclosed inside the main reactor housing.

The example triple reactor 800 includes a length-to-width aspect ratio of 4.42. In some embodiments, the length-to-width aspect ratio of the modular MFC devices having a double reactor configuration can be in a range of ~3.1 to ~5.7. The example triple reactor 800 includes a length-to-height aspect ratio of 5.06 and a width-to-height aspect ratio of 1.15. In some embodiments, the length-to-height aspect ratio of the modular MFC devices having a triple reactor configuration can be in a range of ~3.5 to ~6.6; and/or the width-to-height aspect ratio of the modular MFC devices having a triple reactor configuration can be in a range of ~0.8 to ~1.5.

Example Implementations of the MFC System 300 for Swine Wastewater Treatment

For experimentation, an example of the modular MFC system 300 was installed outside proximate to a small pig farm to receive swine wastewater, and included a shade structure and monitoring system to shade and study environmental variables of temperature and humidity on the reactors of the system. In the experimental implementations, the system 300 was inoculated by mixing 2.9 L of stock swine waste solution (e.g., 53,000 mg/L chemical oxygen demand (COD)); 0.5 L lagoon sediment and 30 mM carbonate buffer, pH 7.5.

Table 1 shows the chemical composition of the swine wastewater. In Table 1, COD(T) and COD(S) represent the total and soluble chemical oxygen demand, respectively.

TABLE 1

Chemical composition of swine wastewater at system inoculation.

| Parameter | Concentration |
| --- | --- |
| pH | 7.8 |
| COD (T), mg/L | 298 |

TABLE 1-continued

Chemical composition of swine wastewater at system inoculation.

| Parameter | Concentration |
|---|---|
| COD (S), mg/L | 133 |
| $NO_3^-$—N, mg/L | 7 |
| $NO_2^-$—N, mg/L | Not detected |
| $NH_4^+$—N, mg/L | 4.3 |
| $SO_4^{2-}$, mg/L | Not detected |
| Total Suspended Solids (TSS), mg/L | 530 |
| Conductivity, mS/cm | 62.7 |
| Turbidity, NTU | 435 |

For the experimental implementation, the stock swine waste solution was prepared from pig excrements collected from the small pig farm located at/near a school in Escondido, Calif. The pig excrements were mixed with tap water and blended to grind the solid waste into smaller particulates. The swine waste suspension was then screened through a stainless-steel mesh. The concentrated swine waste solution (e.g., 50,000-80,000 mg/L COD) was then added to the feeder box during batch mode and to the sump during continuous mode. The experimental implementation of swine wastewater treatment by the example modular MFC system 300 was conducted over 200 days.

For the first 30 days, the system was operated in a batch mode with recirculation of the solution through the feeder box and the reactors at a flow rate of 1.9 L/min. The COD level during the initial 14 days of operation was maintained at 1000 mg/L by daily additions of stock swine waste solution to the feeder box. The following two weeks, swine waste solution was introduced in the system 300 once a week.

After 30 days, the operation was switched from batch to continuous flow mode. The sump was filled with swine waste solution (COD (T)~1000 mg/L) and 30 mM carbonate buffer (pH 7.5) and was directed from the sump to the feeder box via a cavitation pump, then through the reactors via gravity and peristaltic flow control, and discarded into the sanitary sewer drain. The flow rate was 0.38 L/min.

Each reactor was electrically monitored separately. The anode and the cathode of each reactor of the MFC device 310 were connected through a resistor which magnitude was progressively decreased from 47,000Ω to 47Ω over 30 days of operation period.

Electrochemical characterization of the bioelectrochemical treatment process implemented by the reactors of the array of MFC devices 310 are discussed below. The voltage (V) across an external resistor for each reactor was monitored in 10 min intervals using a data logger. The reactors were periodically disconnected to measure open circuit potential (OCP) of the electrodes, perform polarization curves, cyclic voltammetry (CV) measurements or electrochemical impedance spectroscopy (EIS). Polarization curves were carried out by varying the external resistance from open circuit to 3Ω in 5 min intervals. The voltage of the reactor as well as the electrodes potentials were measured with each resistor applied. Current (I) and power (P) were calculated using Ohm's law (I=V/R and P=V*I). The potentials of the anode and the cathode were measured against an Ag/AgCl reference electrode. The volumetric system current and power densities were calculated by normalizing the current and power to the total volume of all reactors (0.09 $m^3$).

The current and power densities of each individual reactor were calculated as the current of the reactor normalized to the cathodes geometric surface area (0.0734 $m^2$). Cyclic voltammetry measurements of the anodes were performed by using a Potentiostat/Galvanostat Gamry 300. The potential was swept from −0.6 to 0.4 V vs. Ag/AgCl at 1 mV/s, where the anode was used as the working electrode and the cathode as the counter electrode. EIS of the anode and the cathode of the reactors were carried out at OCP from 100,000 Hz to 0.1 Hz with 5 mV applied AC voltage.

Chemical analyses associated with the bioelectrochemical treatment process implemented by the reactors of the array of MFC devices 310 are discussed below. Chemical oxygen demand (COD), sulfate, nitrate, and nitrite of influent and effluent samples were periodically analyzed using Hach DR850 and DR900 instruments and associated methods. Total Suspended Solids (TSS) was quantified using EPA method 160.2. Dissolved Oxygen (DO), pH, and ammonium were periodically measured on site by Hach HQ40d portable meter equipped with pH, DO, and ammonium probes.

COD removal was calculated as:

$$\text{COD removal (mg/L)} = COD_{inflow} - COD_{outflow}$$

and COD removal efficiency (%) was calculated using the following equation:

$$COD \text{ removal efficiency } (\%) = \frac{COD_{outflow}}{COD_{inflow} - COD_{outflow}}$$

In a similar manner, the TSS removal was determined:

$$TSS \text{ removal (mg/L)} = TSS_{inflow} - TSS_{outflow}$$

$$TSS \text{ removal efficiency } (\%) = \frac{TSS_{outflow}}{TSS_{inflow} - TSS_{outflow}}$$

The TSS loading (g/d TSS) during continuous mode of operation was calculated as follows:

$$\text{TSS loading (g/d)} = TSS_{inflow} \text{ (g/L)} * \text{flow rate (L/d)}$$

The amount of produced biomass was calculated based on the TSS of the solution ($TSS_{solution}$) withdrawn during regular maintenance of the system pipes, taking into account that the maintenance is performed on weekly bases:

$$\text{Biomass produced } (g/d) = \frac{TSS_{solution} * V_{solution}}{\text{Days}},$$

where $V_{solution}$ is the volume of the solution withdrawn during maintenance.

Microbial composition analysis associated with the bioelectrochemical treatment process implemented by the reactors of the array of MFC devices 310 are discussed below. Effluent samples were collected at various time-points during the experiment. In addition, before the inoculation, samples were collected from the lagoon sediment, swine waste solution and mixed inoculum. Samples were also collected from the anode and the cathodes of reactor 6, which was decommissioned after 140 days of operation. Genomic DNA was extracted from each sample using the PowerBiofilm® DNA Isolation Kit (MO Bio, Carlsbad Calif., P/N 24000-50) according to manufacturer instructions, with some minor modifications. Next, PCR was used to obtain libraries of 16S rRNA locus using the primers 357F (5'-CCTACGGGAGGCAGCAG-3') and 926R (5'-CCGTCAATTCMTTTRAGT-3') and standard Illumina adapters.

The amplicon libraries were sequenced using Illumina Miseq 2×150 bp paired end technology. The raw reads were quality filtered and analyzed using QIIME 1.0 to identify and remove chimeric sequences and perform taxonomic classification.

Scanning electron microscopy (SEM) imaging was used in characterization of the implementation of the system 300. During the MFC 6 decommission, small sub-sections of anodes and cathodes were collected and immediately immersed in 2.5% glutaraldehyde in 1M PBS buffer and stored at 4° C. Before the SEM imaging, the samples were washed and dehydrated in 0%, 10%, 25%, 50%, 75% and 100% ethanol, diluted with PBS solution as needed. Then the samples were dried with a critical-point drier and sputtered with an Iridium layer. The coated samples were examined with a SEM (FEI XL30 SFEG) at 3 kV.

Principal Component Analysis (PCA) is a statistical tool used to analyze data sets to find patterns. PCA visualizes correlations and anticorrelations among samples and variables. It creates uncorrelated components called principal components. The first principal component (F1) has the largest possible variance and the second, orthogonal to the first, has the largest possible inertia (F2). PCA in XLSTAT (Addinsoft) was applied to a dataset of samples collected from the decommissioning of reactor 6.

Canonical correspondence analysis (CCA) was performed using XLSTAT to describe the correlations between community composition and environmental factors. CCA is a comparative evaluation tool that can visualize correlations between key environmental variables and associated species (phylotype) compositions.

Example results of the experimental implementation of the system 300 is described below.

Example Results for Electrochemical Performance and Characterization, and COD Removal Rate After inoculation, each reactor was connected by a 47,000Ω resistor. The immediate response of the reactors was a voltage of ~0.1V, which is most likely due to the accumulated electrochemically active compounds in the swine wastewater or stored charge in bacteria. After the initial discharge and drop, the voltage of each reactor gradually increased to ~0.3 V at day 2 to 0.6 V at day 6. The start-up time of the system 300 is short (e.g., less than 24 hours). A fluctuation in the generated voltage following the day and night cycles can also be seen.

During the enrichment phase the system was operated under batch mode with daily feeds to maintain a relatively constant level of COD (e.g., ~1000 mg/L). One example goal of this phase of the experimental implementation was the development of a robust and functionally selective microbial community at the anode surface, to prepare the system 300 for continuous flow through. Therefore, to provide enough energy for bacterial growth and biofilm development, the reactors were initially connected through a high resistor of 47,000Ω, which was switched to 4,700Ω during the second week. The following resistors of 330Ω and 47Ω were selected based on cell polarization measurements where the most efficient resistor was the one corresponding to a power slightly lower than the maximum power from the polarization curves. After week two, an overpotential was applied to the electrodes to provide the selective pressure for electroactive bacteria. However, applying a resistor of 47Ω led to fast decrease in the cathodic potential and the system was placed back to 330Ω at the end of the batch mode, and remained under this resistor during continuous mode.

Figure 9A:
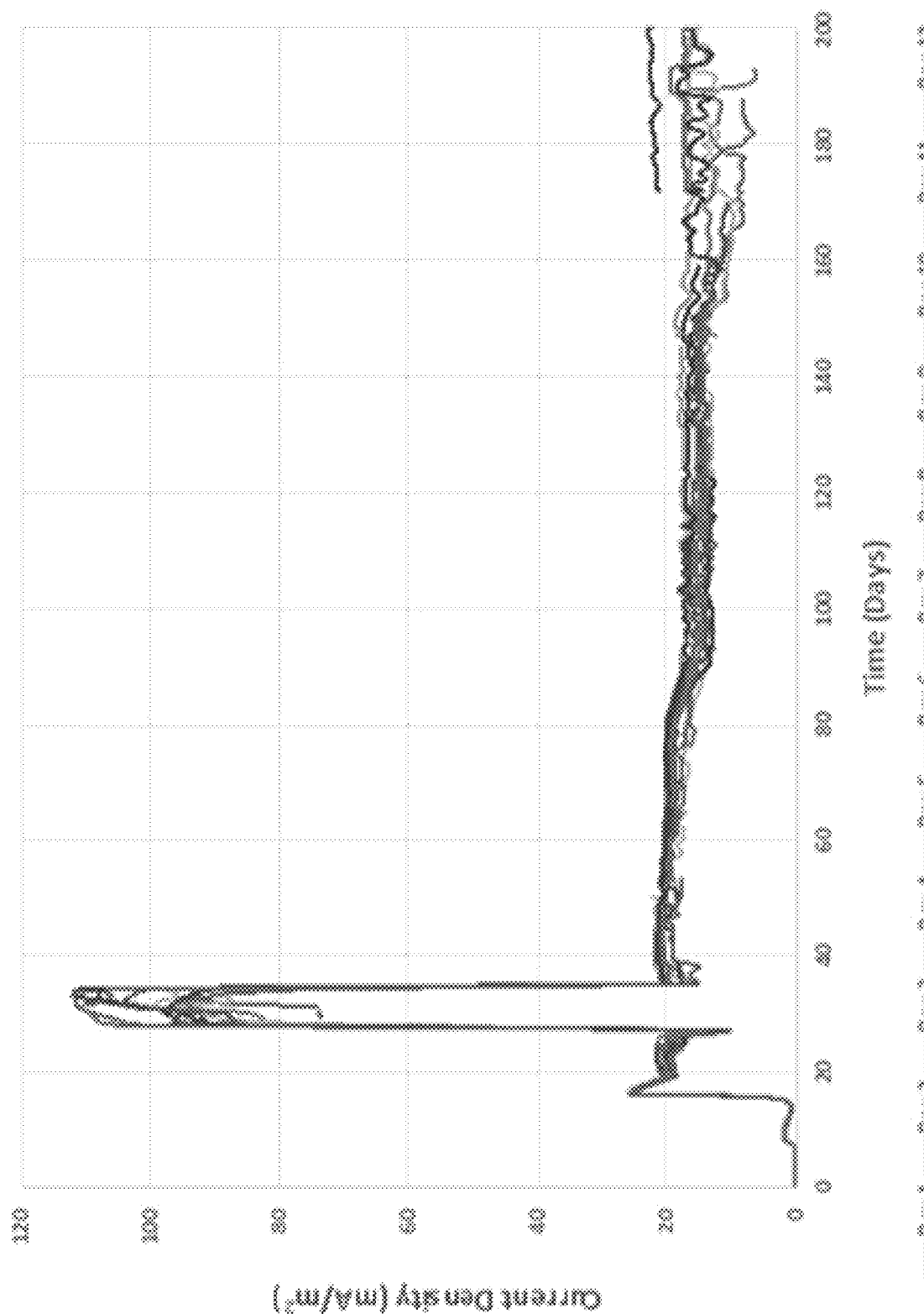
FIGS. 9A and 9B show data plots depicting current density for each individual reactor of the example MFC system of FIG. 3 when normalized to the cathodes surface area (FIG. 9A) and the reactor volume (FIG. 9B).
Figure 9B:
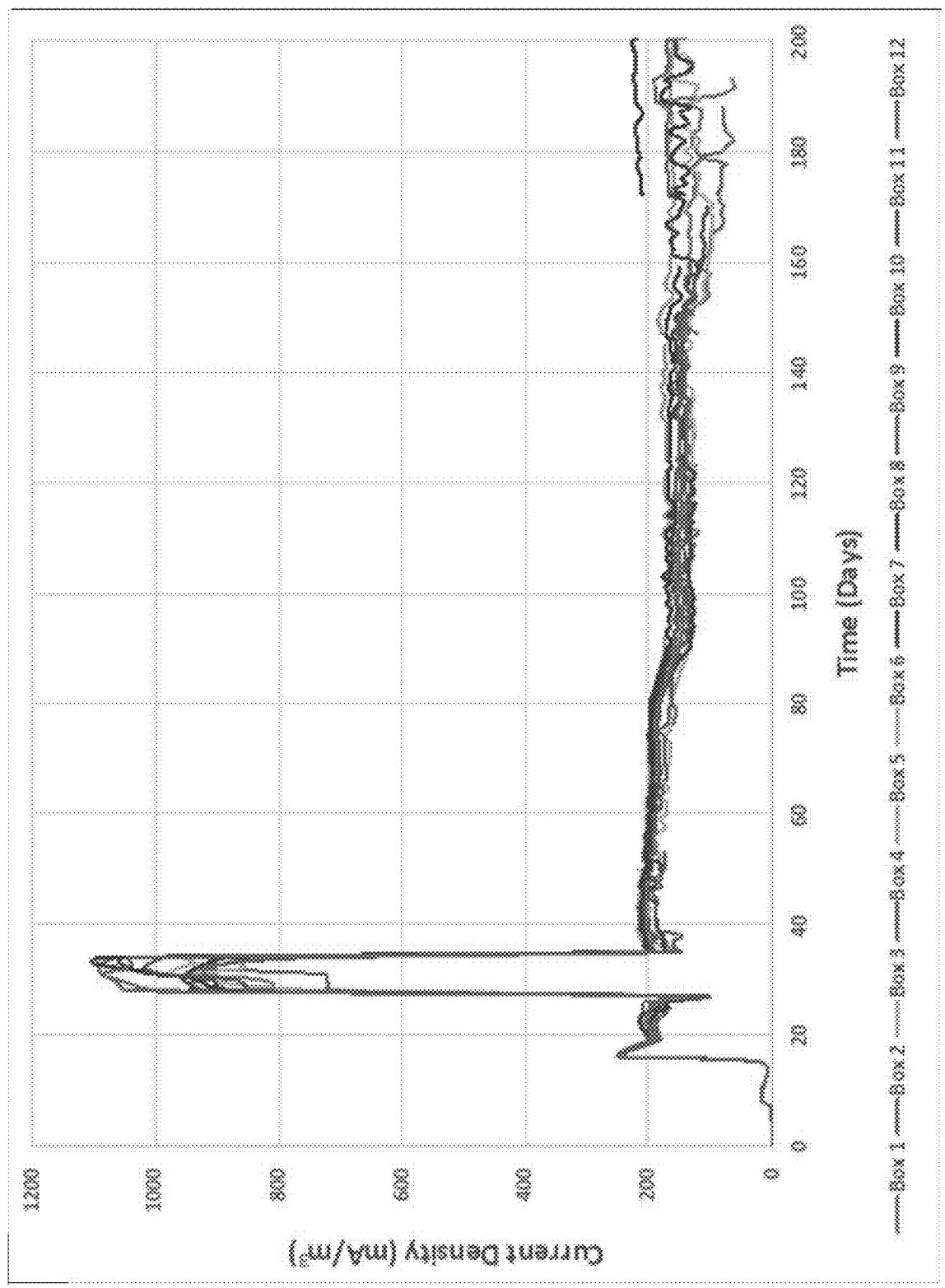

FIGS. 9A and 9B show data plots depicting current density for each individual reactor when normalized to the cathodes surface area (FIG. 9A) and the reactor volume (FIG. 9B).

The generated current was used as an indicator of the performance of each reactor (FIGS. 9A and 9B). The reactors demonstrated similar electrochemical performance. For example, the average current density at day 100 was 14.9±1.4 mA/m$^2$ (186±10 mA/m$^3$), with a relative standard deviation (RSD) of 5%, indicating very good reproducibility and identical reactor performance. No trend was observed in ascending or descending current along the series of reactors.

The maximum average current density of 103±7 mA/m$^2$ (1011±73 mA/m$^3$) was achieved under 47Ω resistor and corresponds to 37±5 mW/m$^2$ (362±52 mW/m$^3$). For example, this lower electrochemical characteristic of the designed reactors herein might be due to the markedly lower COD loadings.

Figure 10:
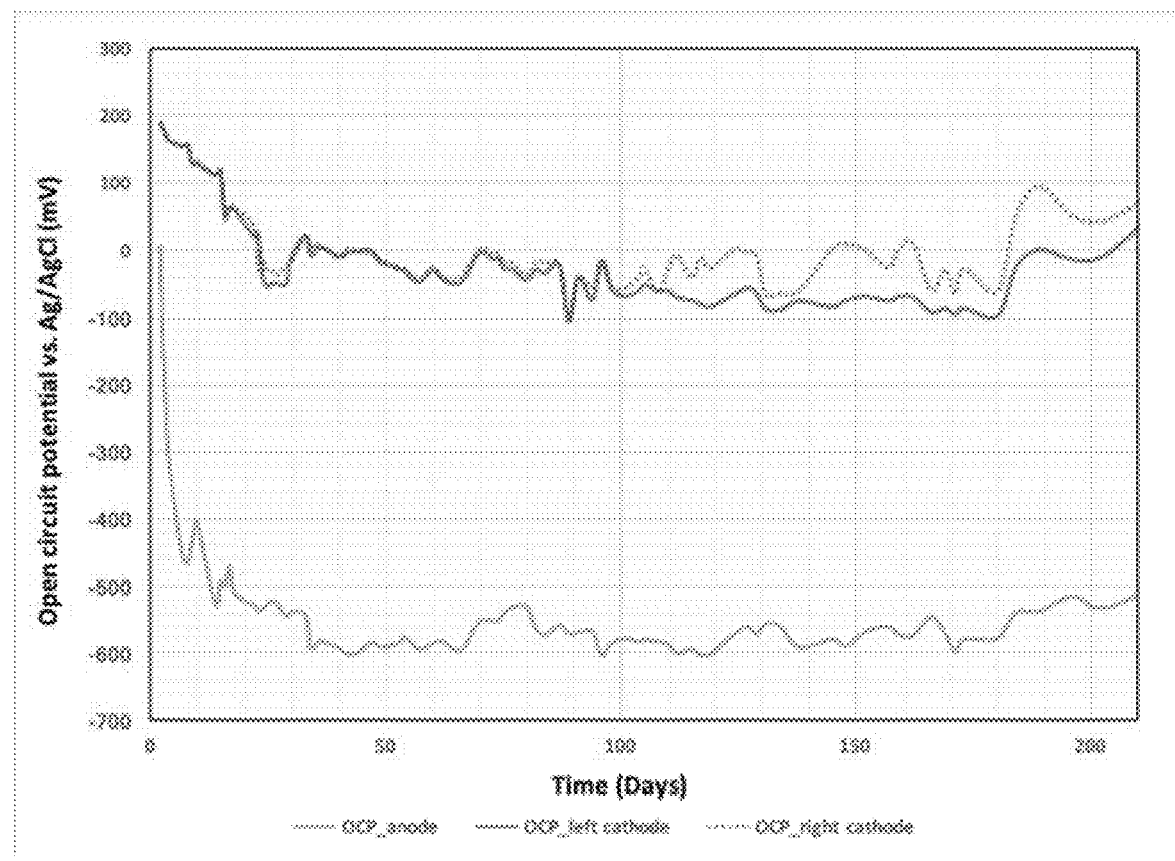
FIG. 10 shows a data plot depicting open circuit potential (OCP) measurements of the anode and the cathodes for reactor five of the example MFC system of FIG. 3.

FIG. 10 shows a data plot depicting open circuit potential (OCP) measurements of the anode and the cathodes for reactor 5 of the example MFC system 300. The OCP of the separate electrodes was also monitored on a regular basis. FIG. 10 shows the OCP of the anode (e.g., 20 anode units operated as a single anode system), and left and right cathodes of reactor 5 as a representative reactor. As can be seen in the data plot, the anode developed a stable electrochemical potential in 35 days, which stayed constant for the remainder of the operation. At the same time the OCPs of the two cathodes decreased from 183±6 mV and 182±7 mV to −33±40 mV and −22±17 mV for the left and right cathodes, respectively.

For example, the sharp decrease in the cathodic potential was likely due to the higher polarization at 47Ω although the system showed the highest energy recovery at this point. Therefore, the resistance was switched back to 330Ω and remained at this value for the rest of the study. Prolonging the cathodes operation was of a major importance since in most of the long-term studies reported to-date, the cathodes were the electrodes that failed over time and required repair or replacement. Also, one example goal of the experimental study using the system 300 was organics removal and wastewater treatment, not maximized energy harvesting. Thus, operating the system 300 with sub-optimal energy generation conditions was acceptable for the example implementations.

Figure 11A:
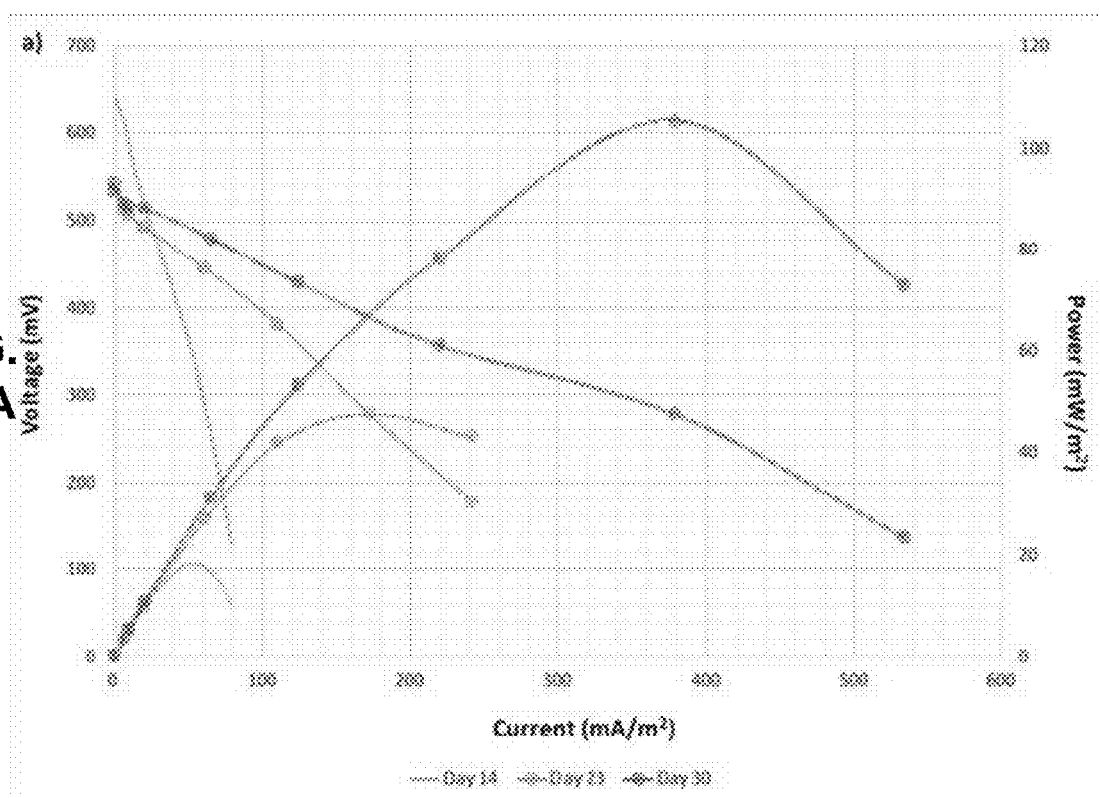
FIGS. 11A and 11B show data plots depicting polarization and power curves (FIG. 11A) and polarization curves for the cathode and anode of reactor five during batch mode of operation (FIG. 11B).
Figure 11B:
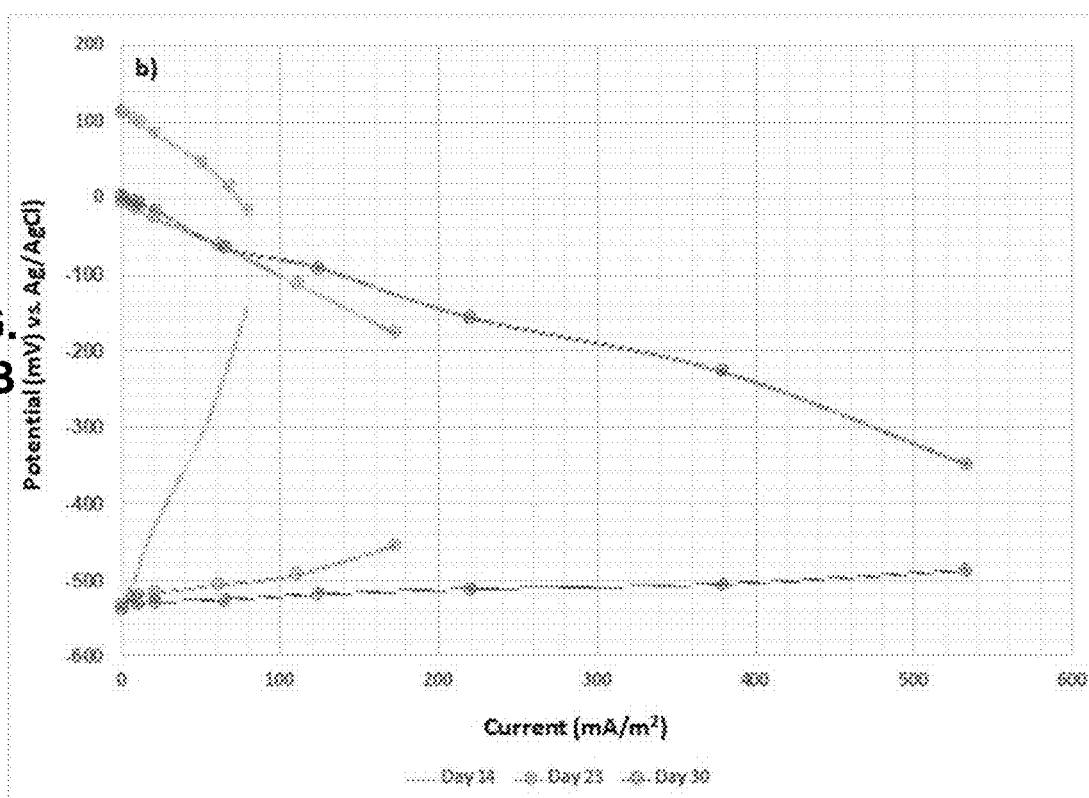

FIGS. 11A and 11B show data plots depicting polarization and power curves (FIG. 11A) and polarization curves for the cathode and anode of reactor 5 during batch mode of operation (FIG. 11B). The electrochemical performance of the reactors increased during batch mode due to the gradual anode development (FIGS. 11A and 11B). The maximum power increased from 18 to 105 mW/m$^2$ (133 to 1067 mW/m$^3$) from day 14 to day 30, accompanied by a 6.5 times enhancement of the generated current, from 79 mA/m$^2$ (800 mA/m$^3$) at day 14, to 533 mA/m$^2$ (5,200 mA/m$^3$) at day 30. Although the OCP of the anode did not change significantly (−533±6 mV vs. Ag/AgCl) during batch mode, the ability of the electrogenic community to participate in charge transfer with the anode surface was dramatically increased.

The cathodic potential decreases from day 14 to day 23 were most likely due to the development of a biofilm at the cathode surface. It is also notable that the overall electrochemical output of the reactor was determined by the anode performance during batch mode of operation.

FIGS. 12A-12D show data plots depicting polarization (FIGS. 12A, 12C) and power curves (FIG. 12B) as well as maximum power development over time (FIG. 12D) for reactor 5 of the example MFC system 300 during continuous mode. Different behavior was observed when the system 300 was operated under continuous flow. During continuous mode, the reactors showed power output in the range of 84-105 mW/m$^2$ (800-933 mW/m$^3$) at 339-379 mA/m$^2$ (3333-4000 mA/m$^3$) from day 30 until day 150 when the COD loading was decreased to 500-600 mg/L COD(T). Due to the lower organic content the electrochemical output decreased to 53-64 mW/m$^2$ (533-667 mW/m$^3$) of power at approximately 273 mA/m$^2$ (2667 mA/m$^3$).

The Michaelis-Menten constant for this study was 1,510 mg/L COD(T), which is higher than the COD loading till day 150, and three times higher than the COD loading after day 150 in this study. Therefore, a decrease of the electrochemical output of the MFCs can be expected as a function of the decreased COD loading.

Figure 12A:
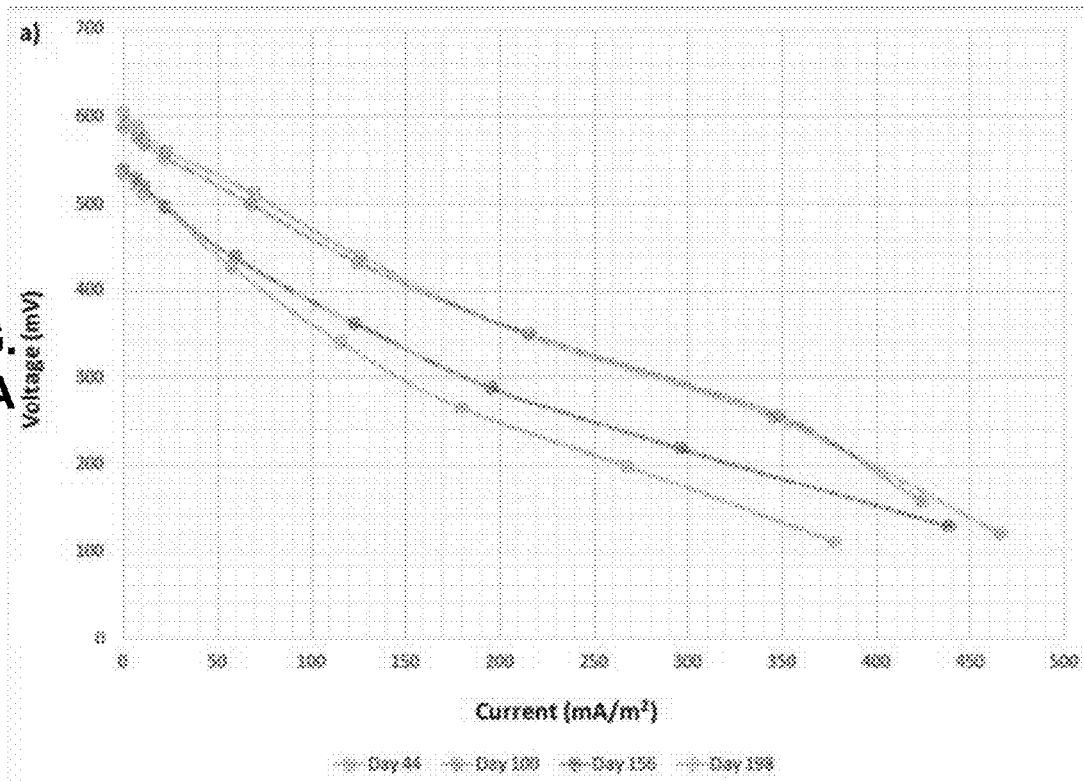
FIGS. 12A-12D show data plots depicting polarization (FIGS. 12A, 12C) and power curves (FIG. 12B) as well as maximum power development over time (FIG. 12D) for reactor 5 during continuous mode.
Figure 12B:
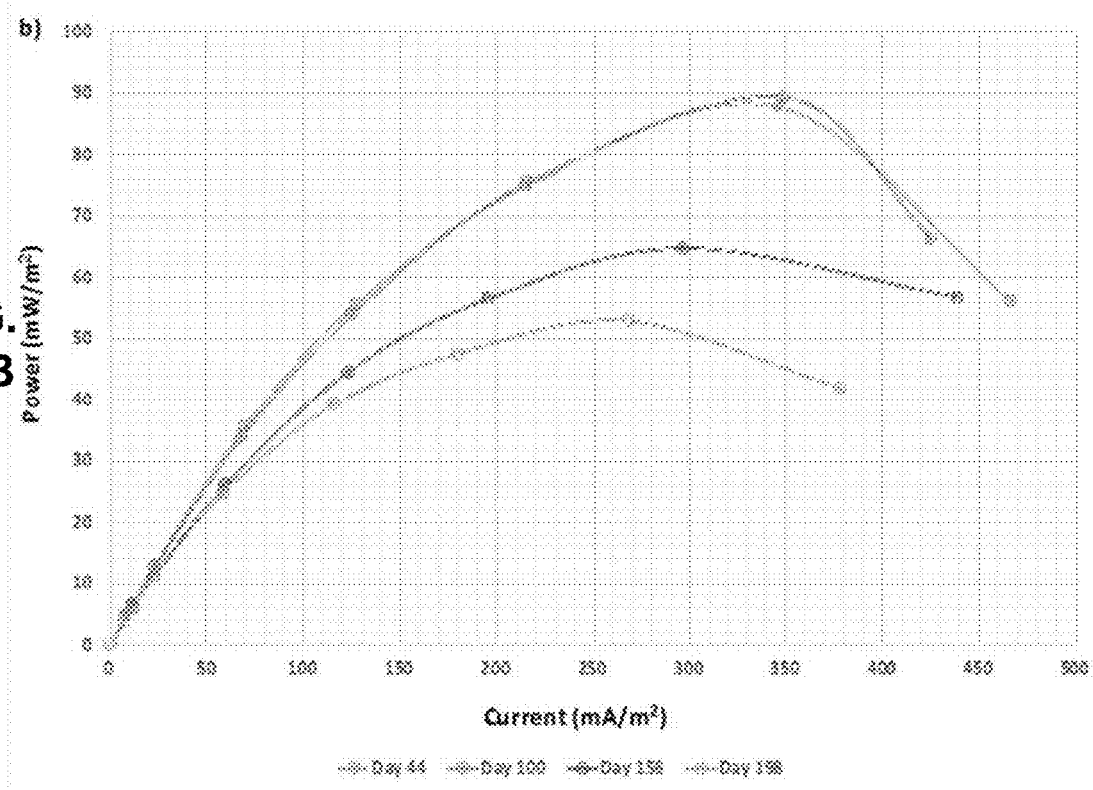
Figure 12C:
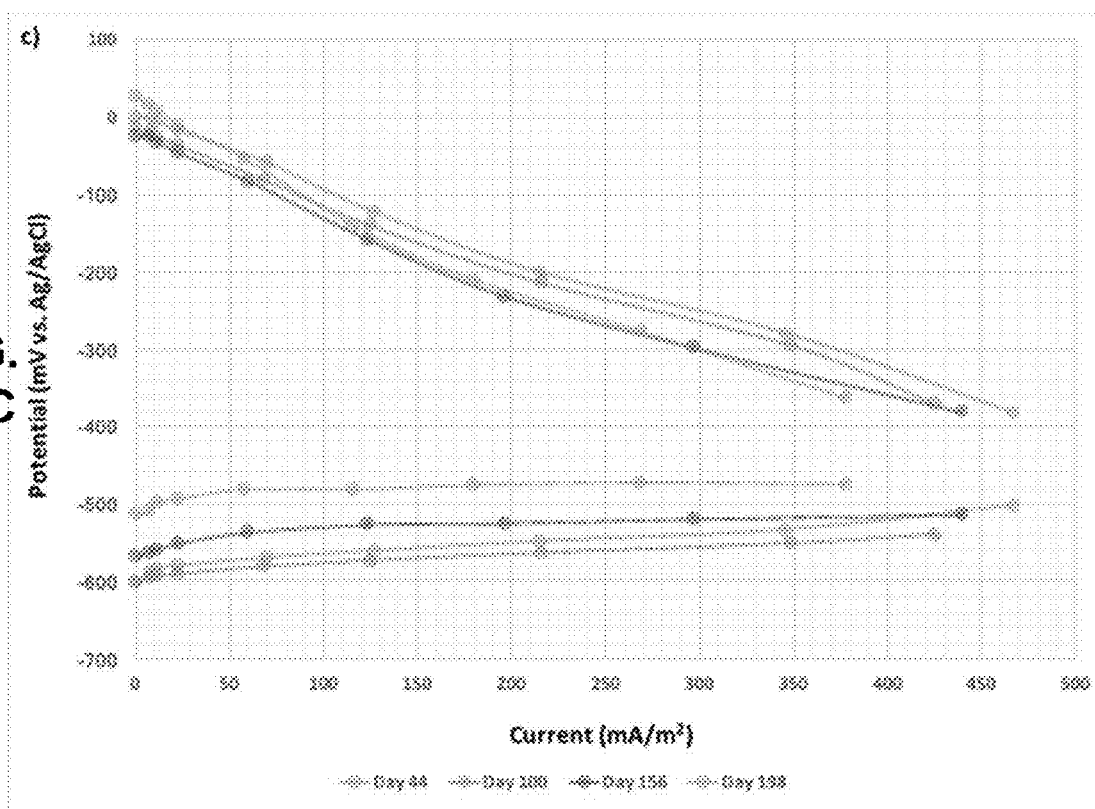

A constant and slight decay in the current was recorded after day 150 because of the decreased electrode performance as seen from the polarization curves of the anode and cathode of reactor 5, e.g., shown in FIG. 12C. Over time the anodic potential became less negative, but the anode still possessed stable polarization. The cathode suffered from higher potential losses than the anode and in general dictated the generated current.

Figure 12D:
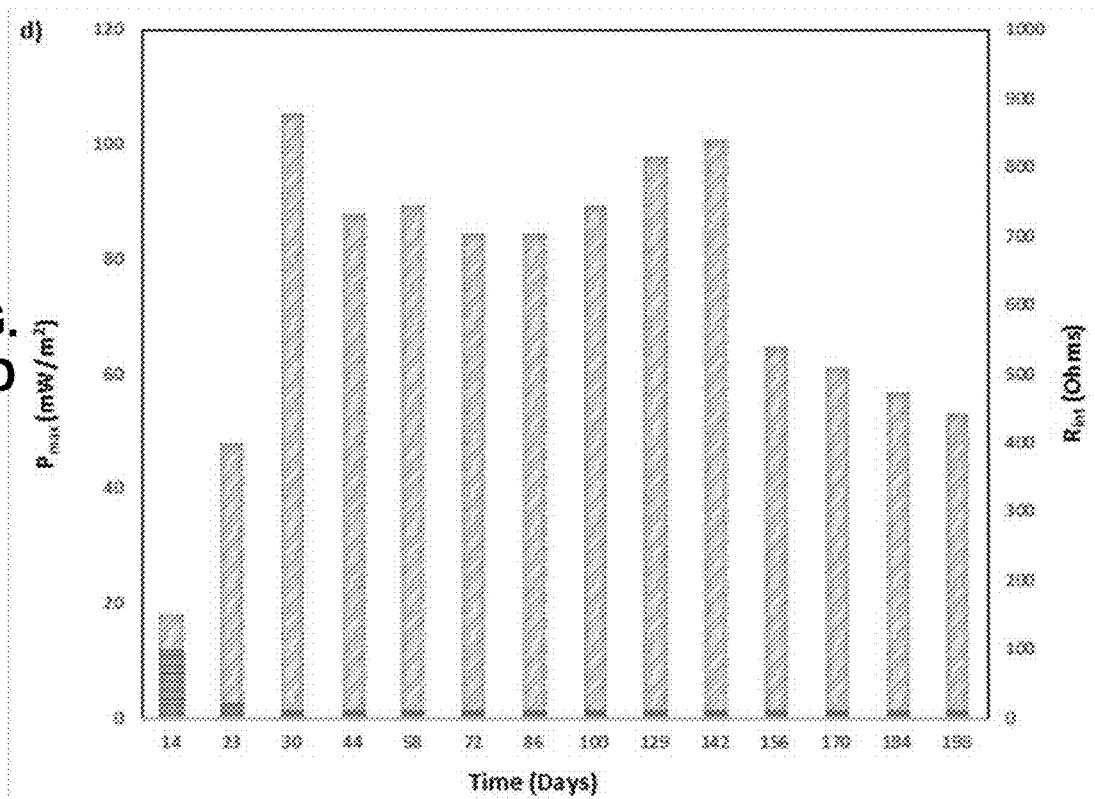

FIG. 12D shows the maximum power for reactor 5 of the example system 300, determined through cell polarization and power curves. During batch mode, the maximum power of the reactor was low due to the undeveloped anode. After it reached day 30, the maximum power stayed around 92±8 mW/m$^2$ (905±78 mW/m$^3$) until day 142, after which it decreased ultimately to 53 mW/m$^2$ (519 mW/m$^3$) measured day 198. In general, higher P$_{max}$ was recorded at higher COD loading rates, which is expected since the current and power are extracted from the oxidation of the organic material.

The internal resistance of the reactor determined from the slope of the polarization curves was 100Ω at day 14, 22Ω at day 23 and stayed 10Ω from day 30 to day 200 (e.g., shown in FIG. 12D). Therefore, the electrochemical performance of the reactors was not influenced by variations or an increase of the reactors' internal resistance. The accumulation of biomass in the reactors and at the electrode surfaces did not lead to an increase in R$_{int}$, which indicates that the reaction rates at the two electrodes were not changed during operation.

The decreased cathodic output is most likely a result of decreased oxygen diffusion through the cathodes due to biofilm formation or salts accumulation. In our study, a pronounced decline in the cathodic operation was not observed (FIG. 12C) although a thick biofilm was developed on the cathode surface. Notably, formation of struvite precipitate on the cathode surface facing the solution can occur at basic pH, which is assumed to occur near the cathode surface due to generated hydroxide as a byproduct of oxygen reduction. Notably, no precipitate formation was visually observed in this study.

Figure 13:
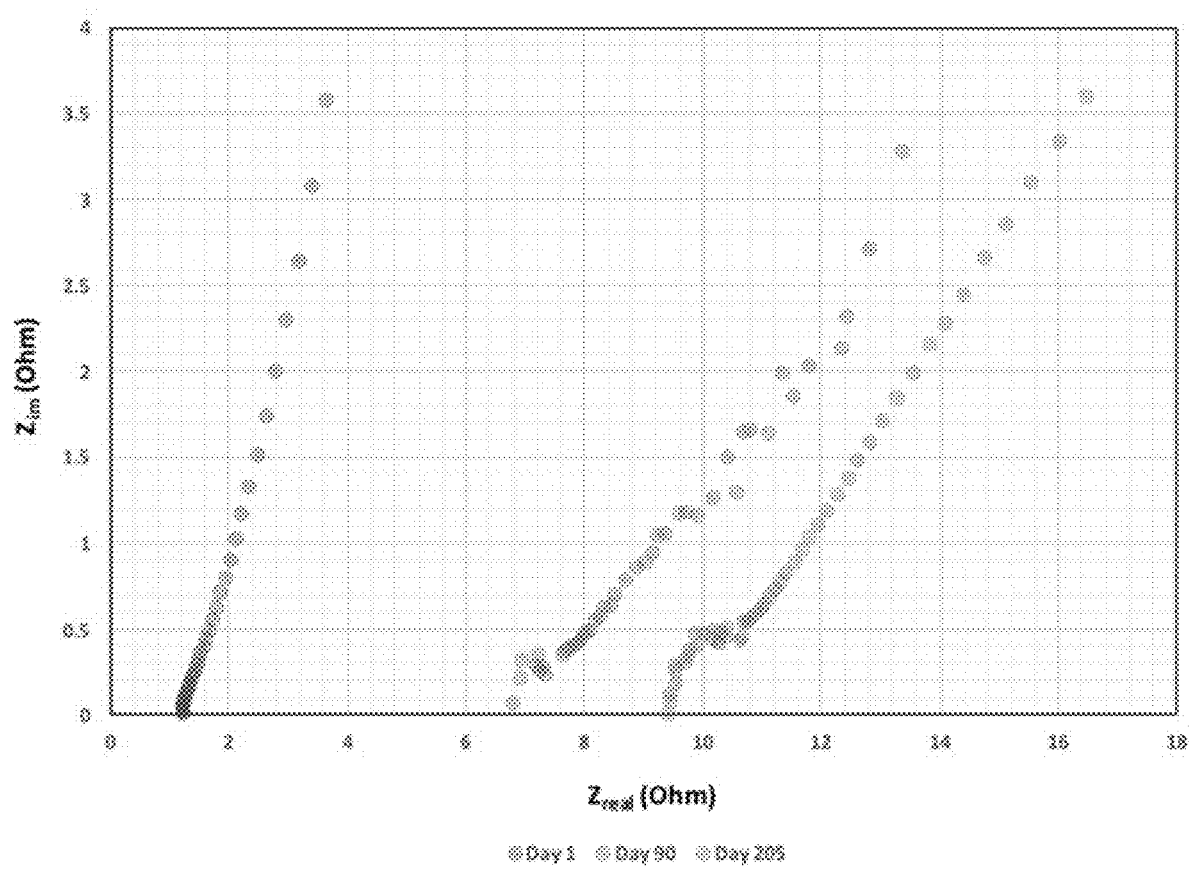
FIG. 13 shows a data plot depicting an EIS of a reactor of the example MFC system of FIG. 3 at different time intervals.

FIG. 13 shows a data plot depicting an EIS of a reactor of the example system 300 at different time intervals. EIS of the anode was used to evaluate the charge transfer resistance at the anode (FIG. 13). The starting anodic charge transfer resistance was 0.1Ω and gradually increased to 1.2Ω at day 205. The charge transfer resistance at the initial stages and at day 205 were very low, which indicates highly active and fast bacteria-electrode interactions, e.g., rapid extracellular electron transfer.

The solution resistance also increased slightly from 1.2Ω to 9.4Ω due to decreased conductivity of the solution. The solution was no longer buffered after day 150, and the COD loading decreased from 1000 mg/L to 500 mg/L after day 110. In addition, biomass was built up in the reactors, which also leads to decreased conductivity and increased ohmic resistance.

Example Results for Chemical Analysis of Wastewater Composition

Samples for chemical analysis of the inflow and outflow of the example MFC system 300 were taken periodically to evaluate the COD removal rate as a main parameter, as well as to determine the ability of the system to remove nitrogen and sulfur-containing inorganic pollutants.

Figure 14A:
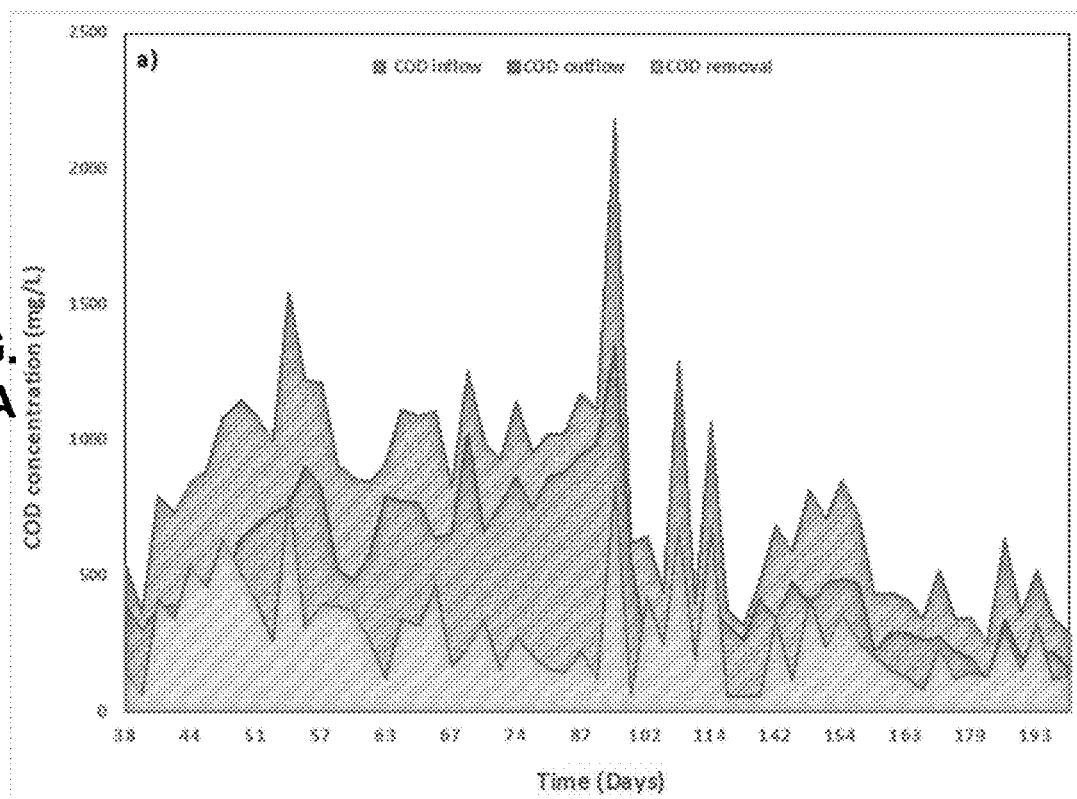
FIGS. 14A and 14B show data plots depicting COD concentration of the influent, effluent and the COD removal for the experimental implementation (FIG. 14A) and COD treatment rate (FIG. 14B) over time.
Figure 14B:
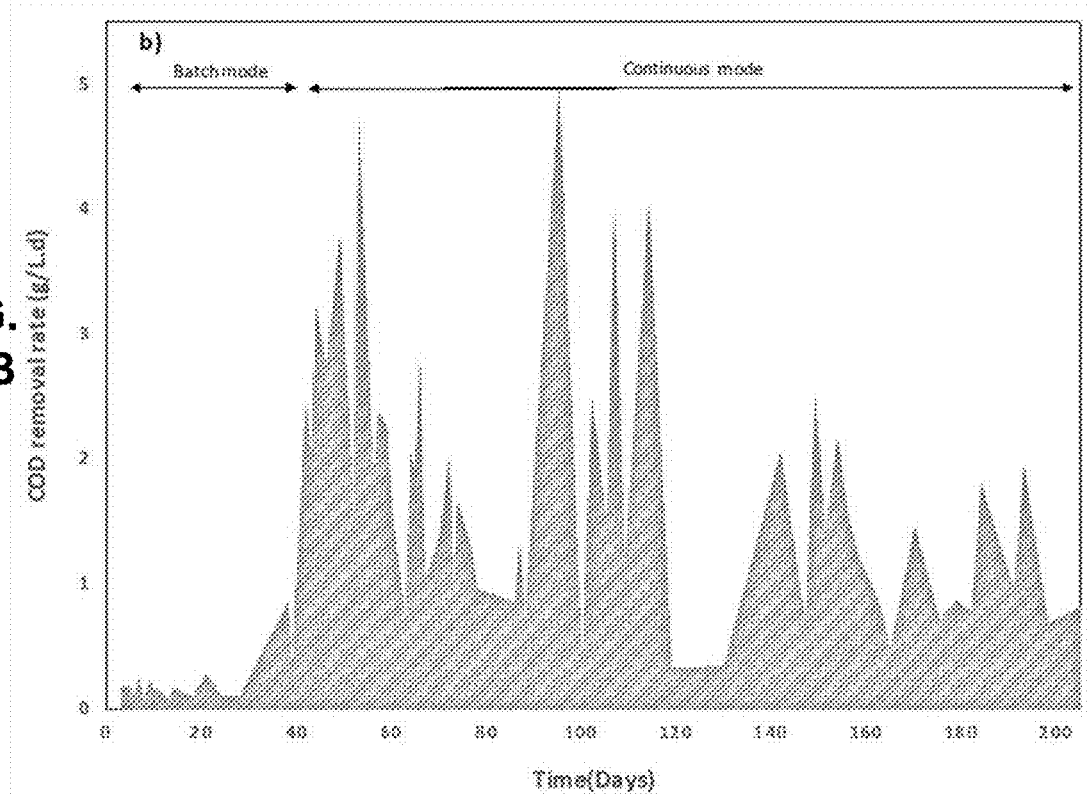

FIGS. 14A and 14B show data plots depicting COD concentration of the influent, effluent and the COD removal for the experimental implementation (FIG. 14A) and COD treatment rate over time (FIG. 14B). During the first 110 days, the target COD for the inflow of the MFC system 300 was 1000 mg/L, after which it was decreased to approximately 500 mg/L. FIGS. 14A and 14B show that on average, the higher instantaneous COD removal in mg/L was observed during the initial stage of continuous mode, when the COD loadings were higher. The organic removal rate of the system varied in the range of 1-5 kg/m$^3$.

The COD removal rate constant was calculated based on the assumption of first order rate constant as: k (h$^{-1}$)=−ln (COD$_{inflow}$/COD$_{outflow}$)/HRT, where COD$_{inflow}$ is the influent COD, COD$_{outflow}$ is the effluent COD and HRT is 4 hours. The COD removal rate constant at COD$_{inflow}$~1000 mg/L was 0.112±0.07 h$^{-1}$, and at COD$_{inflow}$~500 mg/L, k=0.135±0.07 h$^{-1}$. The rate constants at the two COD loadings were not significantly different at P=0.01, which indicates that the COD removal in this study followed a first order reaction rate, and the rate of COD removal is dependent on the concentration of inflow COD.

The maximum COD treatment rate of z 5.0 kg COD/m$^3$ per day was observed at day 95, where the COD loading was 2200 mg/L. The maximum COD removal efficiency (65%) was seen on day 102. The lowest COD removal was recorded during the enrichment period when the system was under batch mode.

Figure 15:
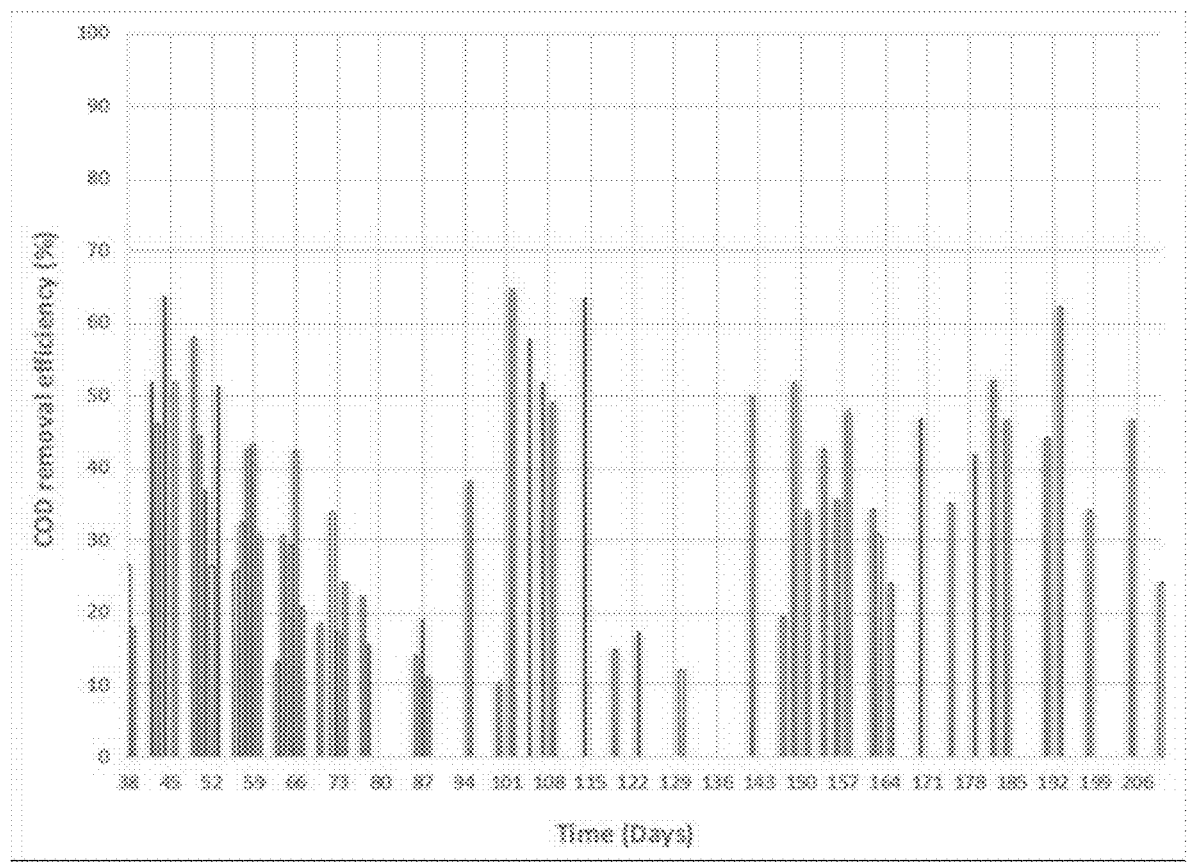
FIG. 15 shows a data plot depicting COD removal efficiency (%) during continuous mode of system operation.

FIG. 15 shows a data plot depicting COD removal efficiency (%) during continuous mode of system operation. The COD removal efficiency was on average lower at higher COD loading, and was more consistent and stable when the COD loading was decreased. In the example implementations, 36±15% COD removal efficiency was interested under continuous mode and HRT of 4 h (as shown in FIG. 15), and significant solids sedimentation was not observed in the reactors over the course of operation. The highest COD removal efficiency achieved by the example MFC system 300 was 65% at different time points of operation.

An MFC used for odor removal demonstrated 84% COD removal under batch mode for 260 h. The control MFC, kept under open circuit, already showed 53% COD removal because of anaerobic fermentation. Therefore, it can be assumed that the COD removal due to the operation of the MFC as a bioelectrochemical system is only 31% of the overall observed removal, which is comparable to the average removal rates in this example study.

The example MFC system 300 in this study has a significantly higher working volume and faster flow rate than conventional system of previous studies, which is important for practical wastewater treatment. For example, the COD removal efficiency of the MFC system 300 in the example implementations is one of the highest among the MFCs running under continuous mode; the current and power densities (per square cm) of the MFC system 300 in this study are comparable to other studies; and the net energy recovery (NER) observed in this study is significantly higher than other systems. The normalized energy recovery (NER) of the MFC system 300 at 330Ω and continuous mode of operation was 0.11 kWh/kg COD, which is higher than the NER of anaerobic digestion treatment plant with energy recovery from methane. Due to the lower COD removal rates during batch mode, the NER was calculated as 0.22 kWh/kg COD with Coulombic Efficiency (CE) of 27%. On average, the CE of the MFC system 300 under continuous mode was estimated as 7%.

Nitrogen and sulfur are major contaminants in wastewater and their removal is also a key parameter for sustainable wastewater treatment technology. Nitrogen can be removed from wastewater through biological nitrification and denitrification steps. Nitrification involves the oxidation of ammonium to nitrate with the participation of oxygen and nitrifying bacteria. Nitrate can be further reduced to nitrite and ultimately to nitrogen gas. The electrons necessary for the denitrification process can be provided by the oxidation of organic material.

Denitrification (Scheme 1) can be performed in solution or by using the electrons captured at the anode and transferred to the cathode where nitrate reduction will appear, e.g., ($E^{o'}_{NO3/NO2}$=+433 mV vs. SHE, $E^{o'}_{NO2/NO}$=+350 mV vs. SHE, $E^{o'}_{NO3/N2}$=+700 mV vs. SHE). In an MFC, for example, the denitrification reaction can typically occur at the cathode surface via (i) direct electron transfer from the cathode to microorganisms or (ii) intermediate production of $H_2$, which is further used by bacteria as an electron donor for nitrate reduction. A competing reaction to denitrification reaction is the dissimilatory nitrate reduction to ammonium (DNRA) (Scheme 1).

Scheme 1: Denitrification and DNRA pathways

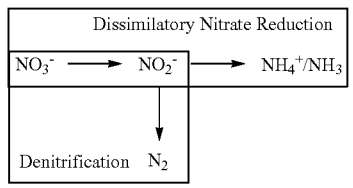

Figure 16A:
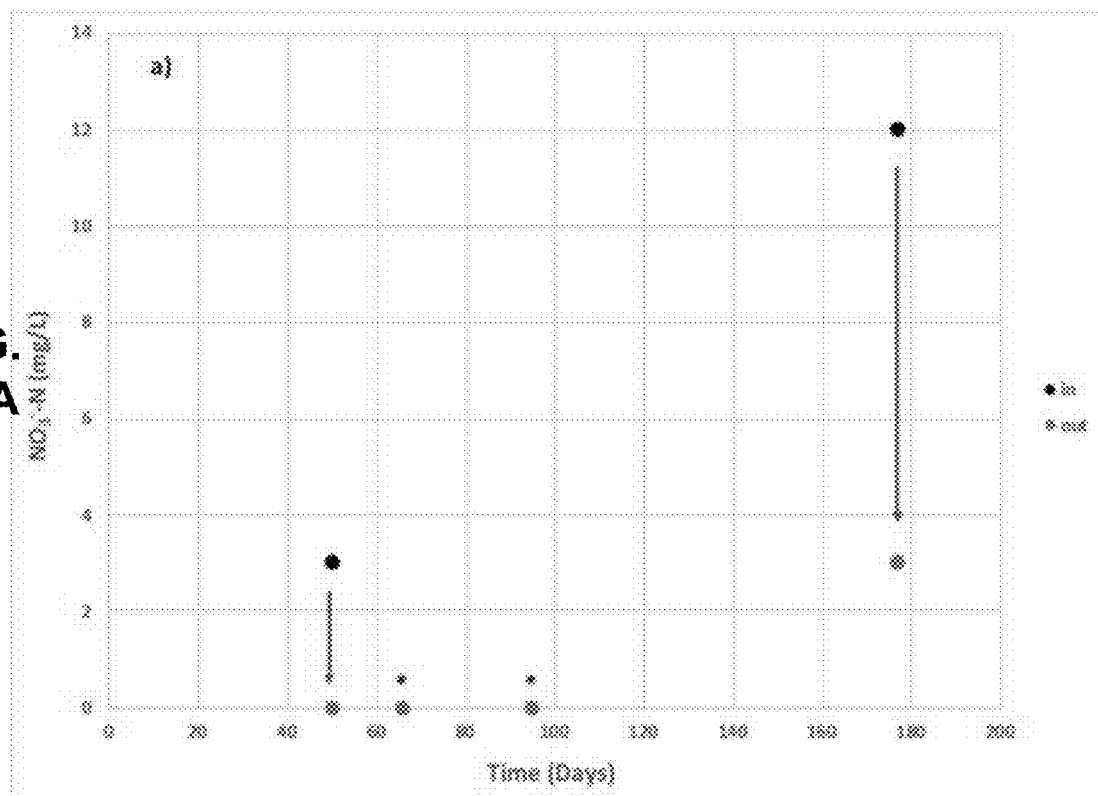
FIGS. 16A-16C show data plots depicting concentration of $NO_3^-$—N (FIG. 16A), $NO_2^-$—N (FIG. 16B) and $NH_4^+$—N (FIG. 16C) in the influent (in) and effluent (out) of the example MFC system of FIG. 3 during continuous mode.
Figure 16B:
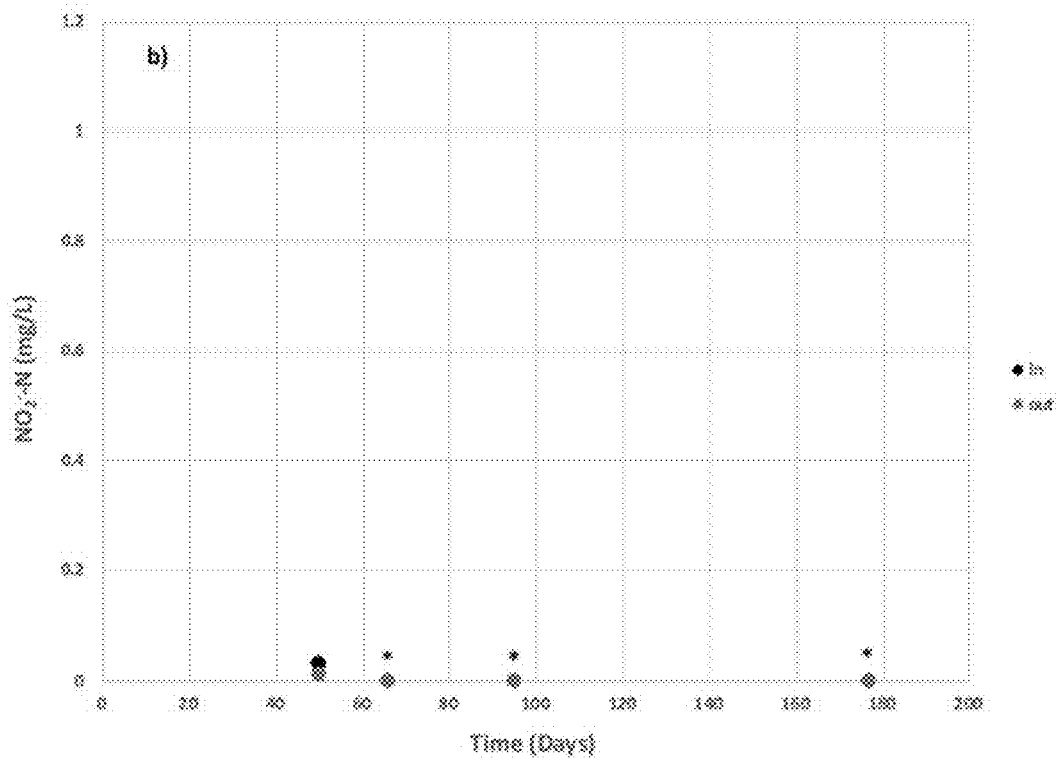
Figure 16C:
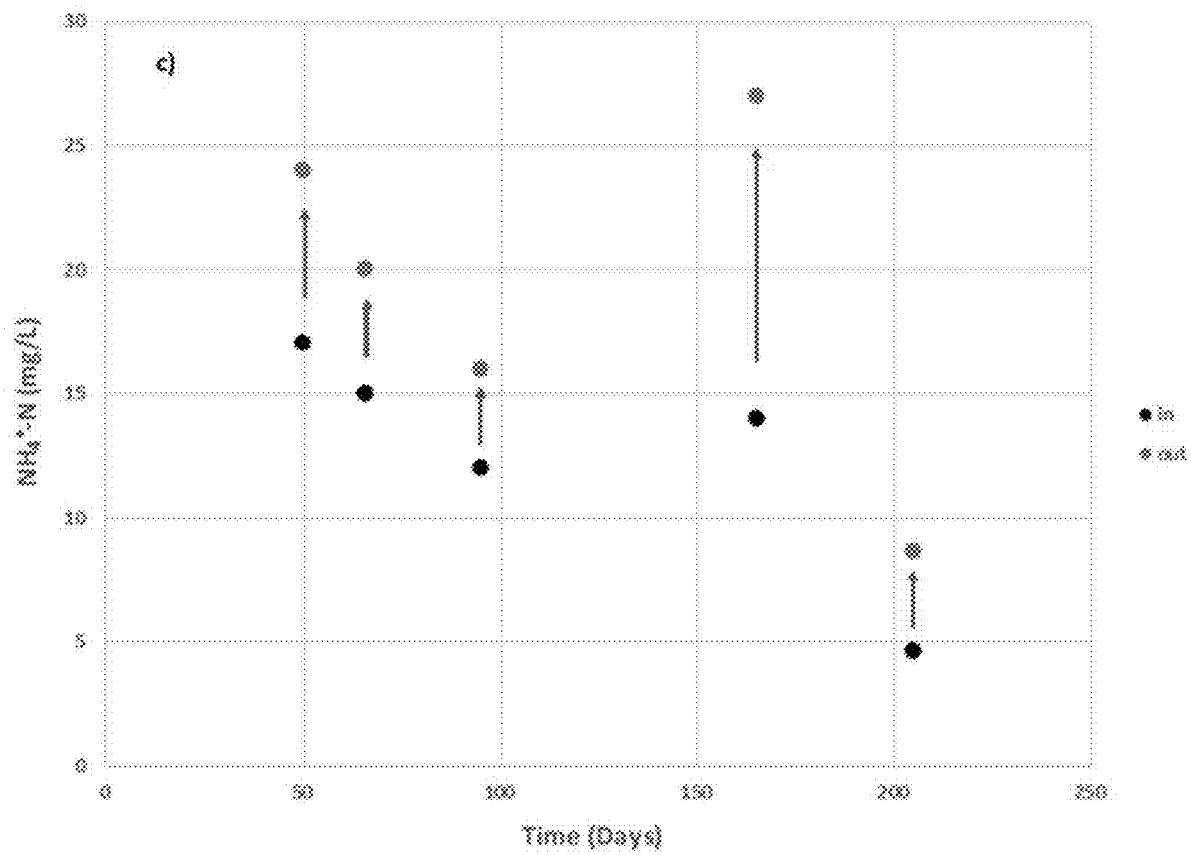

FIGS. 16A-16C show data plots depicting concentration of $NO_3^-$—N (FIG. 16A), $NO_2^-$—N (FIG. 16B) and $NH_4^+$—N (FIG. 16C) in the influent (in) and effluent (out) of the system during continuous mode. Note: *—the concentration in the influent and effluent was zero.

The two possible processes for conversion of nitrate in an MFC are denitrification to nitrogen gas or DNR. Due to the anaerobic conditions in MFC reactors, nitrification of ammonium does not proceed, therefore it is accumulated in the effluent. The latter process is what was seen in some of the implementations of the example system 300. As such, DNRA is an example main pathway for nitrate removal in the MFC system 300 (e.g., example results shown in FIGS. 16A-16C). When nitrate is present in the influent it is rapidly reduced to ammonium. The nitrate removal efficiency was 60-100% under continuous mode (e.g., FIG. 16A). Nitrite is usually not present in swine wastewater or it is not produced in measurable amounts during the treatment process (e.g., FIG. 16B).

In the samples, the concentration of ammonium increased when the wastewater passed through the reactors. An increase in the ammonium content was observed to be 30-40% on average, and up to 90% was recorded (e.g., FIG. 16C). The latter is a clear indication of DNRA, for example. During heterotrophic nitrate reduction, DNRA can occur in solution at a high C/N ratio due to the high organic content, which translates into high electron donor content.

The example MFC system 300 is a bioelectrochemical system with high C/N ratio, thus both mechanisms, heterotrophic and autotrophic, of DNRA can proceed and lead to the production of ammonium. In the example implementations, the C/N ratio, calculated as $COD/NO_3^-$—N, for the example system 300 was determined to be in the range of 28 to 380. The example results from the microbial composition analysis of the cathodes population showed the presence of Rhodocyclales, which are known as aerobic, denitrifying bacteria (FIG. 20). *Geobacter lovleyi* was also found at the cathode surface in small abundance (e.g., <0.5%) and has been identified as a DNRA-capable species. As a result of the neutral pH in the reactors, ammonium does not transform into ammonia and accumulates in the effluent.

It should be noted that there is not an EPA regulation for ammonium concentrations; however, taste and smell limitations are in the range of 35 mg-N/L to 0.2 mg-N/L, respectively. Nitrate and nitrite water quality limitations are 10 mg-N/L and 1 mg-N/L, respectively. The example MFC system 300 showed ammonium removal and a decrease of the nitrate and nitrite concentrations, which provides treated water that can meet and exceed these thresholds.

Swine waste is not characterized with high sulfate content. The highest amount of sulfate measured in a concentrated swine waste solution was 250 mg/L and most of the time sulfate was not detectable. Sulfate removal up to 70% was demonstrated in the example MFC system 300 (e.g., shown in FIG. 17).

Figure 17:
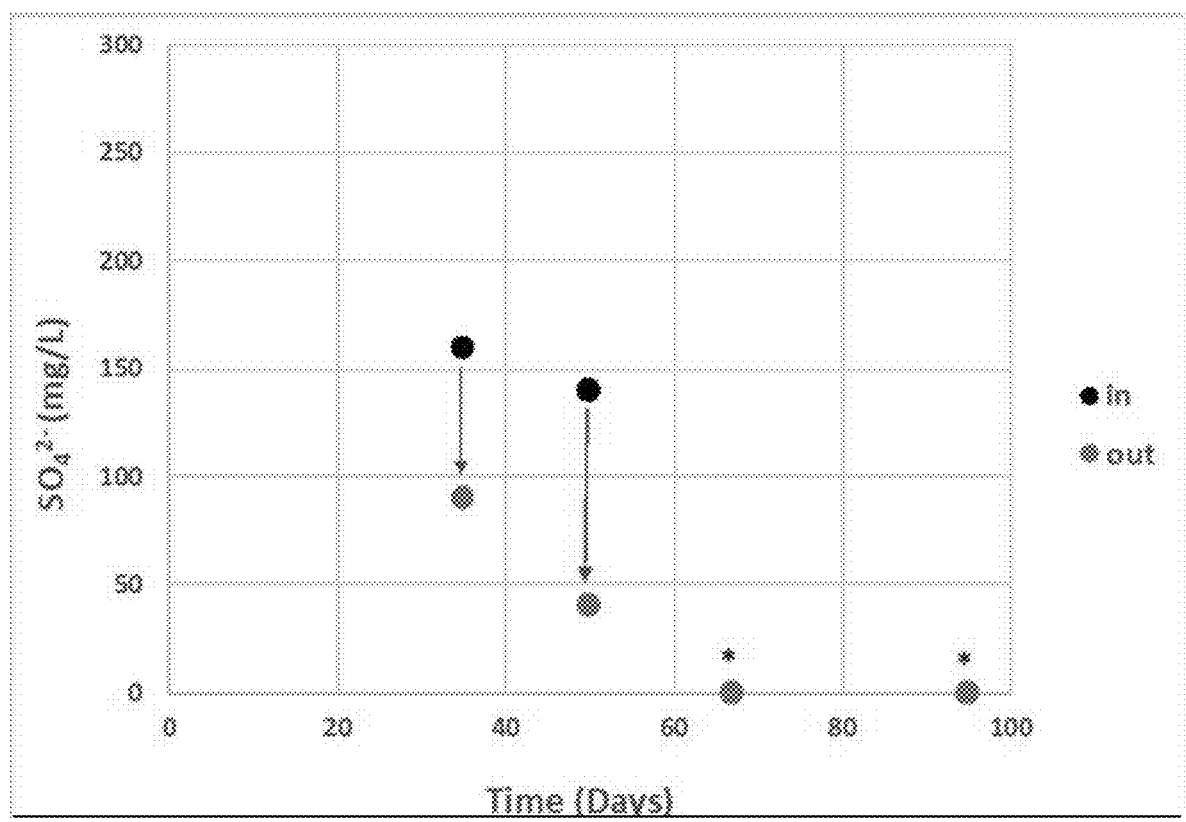
FIG. 17 shows a data plot depicting sulfate concentration in the influent (in) and effluent (out) of the example MFC system of FIG. 3 during continuous mode.

FIG. 17 shows a data plot depicting sulfate concentration in the influent (in) and effluent (out) of the system 300 during continuous mode. Note: *—the concentration of sulfate in the influent and effluent was zero. Sulfate was reduced to sulfide, and sulfide levels did not exceed 6 mg/L. Sulfate is regulated as a secondary contaminate, with a maximum contamination level of 250 mg/L. The influent and effluent from the MFC did not exceed this value over the course of operation.

One of the main disadvantages of conventional aerobic wastewater treatment technologies is the significant production of biomass, which requires additional sludge management. For swine wastewater, for example, the level of total suspended solids (TSS) is higher than domestic wastewater and ranges from 400-500 mg-TSS/L versus less than 100 mg-TSS/L for domestic wastestreams. For 4 hours of HRT, the TSS amount decreased by 50 to 80% with the production of biomass less than 0.12% of the initial TSS loading. It was estimated that 270±32 g/d of TSS are introduced into the system with 1.7 g/d build up as a biomass in the reactors.

One of the concerns of two-chamber MFCs is the accumulation of protons in the anodic chamber causing pH to become acidic, and the depletion of protons and accumulation of hydroxide in the cathodic chamber, which leads to a basic environment. In a single chamber MFC, this problem is usually not observed but even in this example design the MFC's solution was still buffered for a time. A 33 mM carbonate buffer was used to maintain constant and close to neutral pH (e.g., shown in FIG. 18). However, after day 150, the swine wastewater was not buffered but pH still remained relatively constant. DO of the inflow was also constantly monitored to ensure anaerobic conditions and the DO measured was consistently below the detection limits of the probe.

Figure 18:
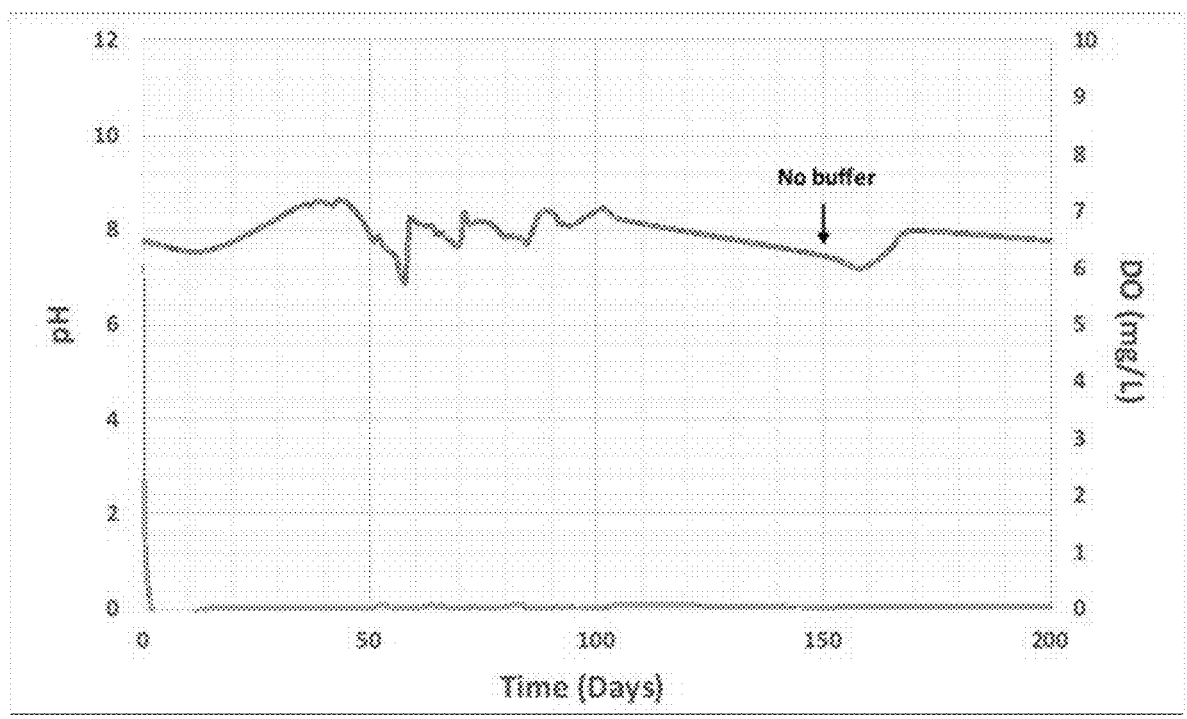
FIG. 18 shows a data plot depicting pH and DO profiles over time.

FIG. 18 shows a data plot depicting pH and DO profiles over time.

Example Results for Microbial Composition Analyses

Microbial composition and dynamics of the example MFC system 300 were monitored and evaluated by 16S rRNA sequence analysis in the experimental implementations. The inoculum source and system outflow during batch and continuous modes of operation were surveyed as well as the anode and cathode associated populations for a single reactor.

Figure 19:
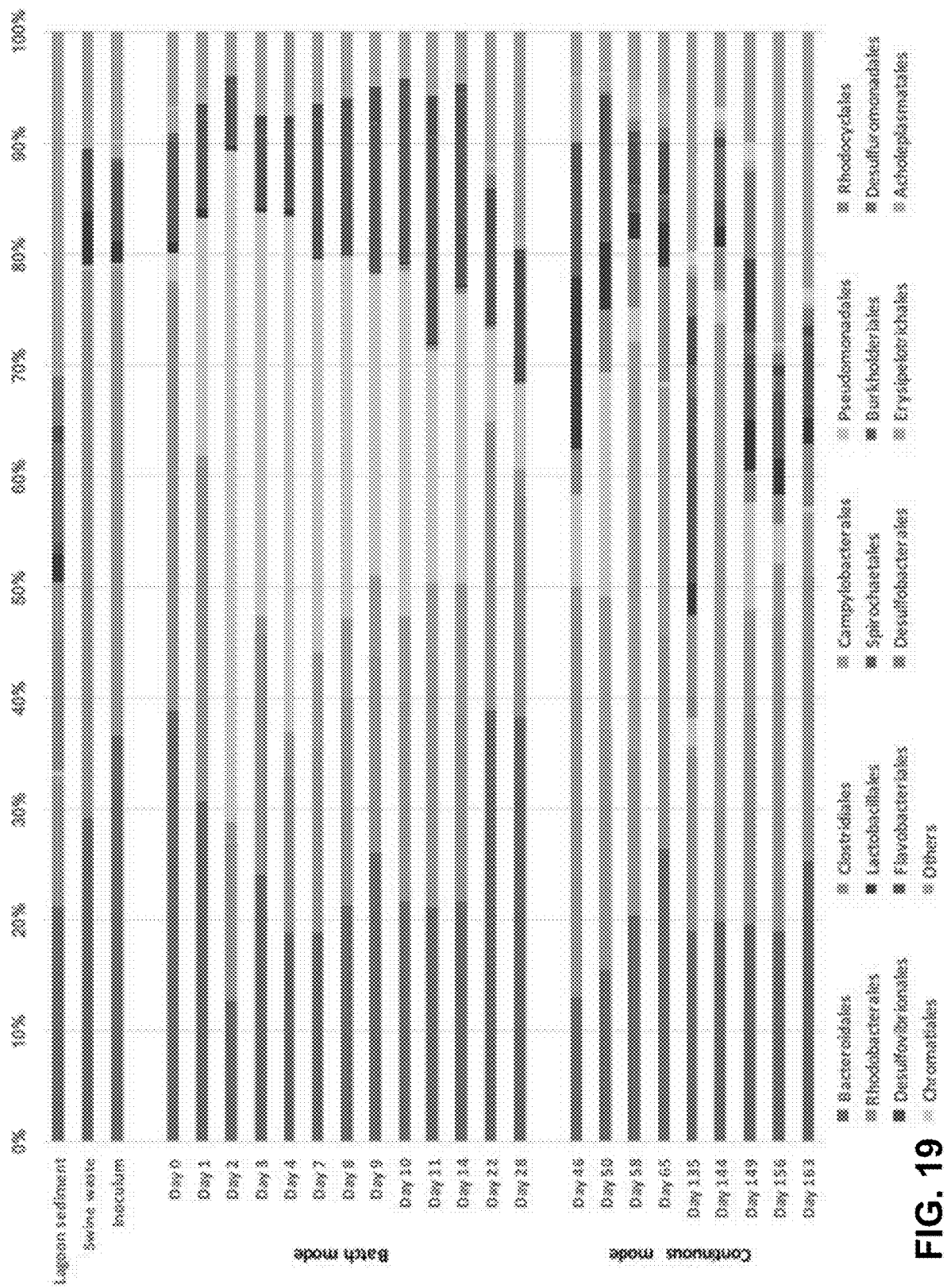
FIG. 19 shows a plot depicting a microbial community profile of the example MFC system effluent using 16S rRNA sequences.

FIG. 19 shows a plot depicting a microbial community profile of the example MFC system effluent using 16S rRNA sequences. Samples from lagoon sediment, swine waste stock solution and the mixed inoculum were collected at the time of system inoculation (FIG. 19). As seen, the microbial population in the inoculum was mainly determined by the microbial diversity and relative abundance of the stock swine waste solution. A high relative abundance of fermentative bacteria from the orders of Bacteroidales and Clostridiales were observed in the inoculum and the system solution at day 0. These two orders occupied nearly 80% of the community. However, after day 4, the relative abundance of Bacteroidales and Clostridiales decreased to roughly 20% and 15% of the total community population, respectively, which remained relatively stable in the effluents throughout 136 days of operation.

Although Desulfuromonadales were not present in detectable numbers in the inoculum, they became a relatively abundant population in the system solution starting at day 58. Most Desulfuromonadales bacteria observed in solution were from the genus of *Geobacter* and the species identified were associated to *Geobacter lovleyi*. The abundance of *G. lovleyi* correlates with the DNRA reactions observed in our system at day 58 onwards, as stated previously.

After day 1, the relative abundance of fermentative Pseudomonadales significantly increased and remained broadly present in the solution during batch and the beginning of continuous mode of operation; however, the relative abundance of Pseudomonadales notably decreased during continuous mode. This initial increase and later decrease coincide with COD content and removal rate in the system, which, for example, may reinforce the notion that efficient fermenters, such as those from order Pseudomonadales, contribute to performance of waste water treatment in MFCs. The persistence of Pseudomonadales under the batch mode may also be attributed to their ability to form persistent biofilms that are difficult to remove. In addition, species in the genus *Pseudomonas* are capable of degrading complex aromatic compounds, giving them a unique niche in the microbial consortium enriched during the time when COD content was relatively high, which likely provided complex organics as substrates.

Species in the order Flavobacteriales were apparent around day 50 and disappeared later. It is unclear whether the changed electrochemical and biochemical environment at the onset of continuous mode of operation played a deterministic role in enriching flavobacteria, which are known to be aerobic or facultative anaerobic chemoorganitrophs with both respiratory and fermentative metabolic capacities. The example data from the example implementations were insufficient to predict the causative links between their relative abundance and one or more abiotic or biotic factors.

Campylobacterales appear during batch mode and became one of the dominant orders during continuous mode especially around day 58. Campylobacterales are common inhabitants of gastrointestinal tracts in ruminant animals as well as humans. Most campylobacterales are fastidicous and are adapted pH below neutral. In the example MFC system 300, the onset of fluctuations in relative abundance of Campylobacterales is correlated with the change in pH, which drops below neutral around day 58, and again around day 150, e.g., coinciding with major shifts in the abundance of Campylobacterales. Also, campylobacterales are known to release sulfur and iron into their environment, thereby affecting pH due to the addition of sulfur, as well as promoting growth of bacteria that are dependent on sulfur compounds as substrates for growth and metabolism.

Bacteria from the orders Desulfovibrionales and Desulfobacterales, known as sulfate reducing bacteria, were seen in a higher abundance during continuous mode, especially after day 58, coinciding with the increasing abundance of Campylobacterales. The appearance of these sulfate reducing phylotypes also correlates well with removal of sulfate from the example MFC system 300 observed around the same time.

When samples were collected from the feed stock inflow, and outflow of each reactor (day 50 and/or day 58), no significant differences in microbial composition or relative abundance were observed. The microbial population in the effluent samples from all twelve reactors was identical at the order-level, consistent with the comparable electrochemical performance of the 12 reactors in the example MFC system 300. Further, no significant changes in relative abundances were apparent at the order-level when comparing the microbial composition of the inflow wastewater and the outflow composition from each reactor during continuous mode. These data suggest that the microbial population in solution are not significantly impacted, at the order-level, by a 4-hour retention time in the example MFC system 300.

It was also evidenced in the example implementations, by the performed cyclic voltammetry measurements, that the shifts in microbial composition affect the anodic performance. The onset of the oxidation reaction shifts to more negative potentials over time accompanied with an increase in the generated oxidation current.

While community differentiation in each reactor was not observed in the system effluents, it is possible that a longer hydraulic retention time or additional reactors in the treatment train would induce a unique microbial selection. It is also possible that a higher resolution analysis at the genus- or species-level may provide a deeper insight into unique microbial compositions in the twelve reactors. Microbial differentiation may also be more apparent in the electrode-associate communities.

To evaluate the microbial populations associated with the anodes, cathodes, and residual sludge, a single reactor (reactor 6) was decommissioned. Reactor 6 had similar performance to all other reactors at the time of sampling (day 105). Samples were extracted from each anode brush, at the top and bottom. Six samples were also extracted per each left and right cathode at different locations of flow (in, middle, and outflow) as well as the top and the bottom of each section (e.g., shown in FIG. 20). The microbial composition on the anode brushes were nearly identical at the order-level in terms of diversity and relative abundance indicating an adequate water flow and mixing creating a homogenous environment in our reactors.

Figure 20:
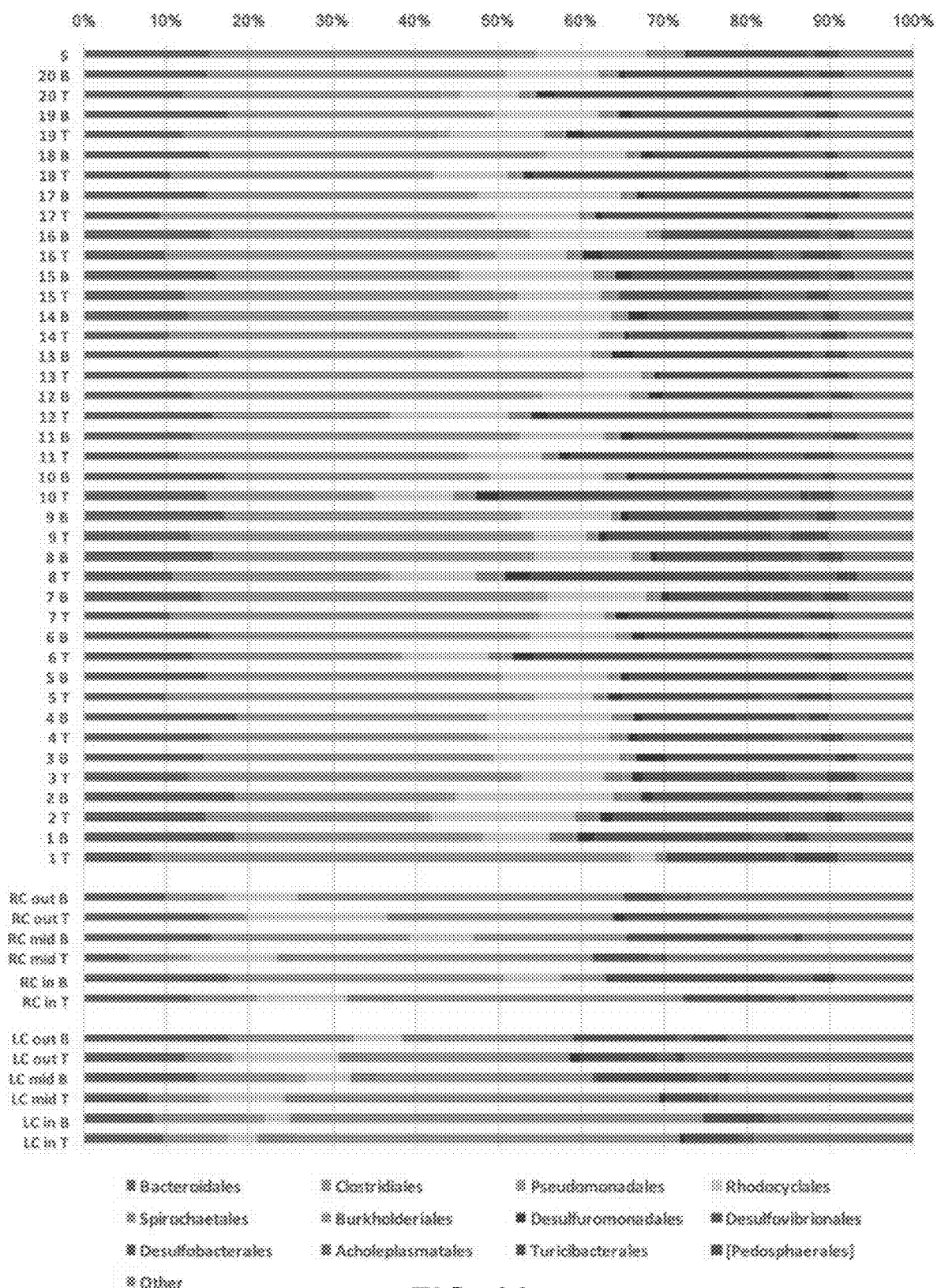
FIG. 20 shows a plot depicting a 16S rRNA-based microbial community profile of samples collected from the anode and cathodes of reactor six of the example MFC system of FIG. 3 after its decommissioning.

FIG. 20 shows a plot depicting a 16S rRNA-based microbial community profile of samples collected from the anode and cathodes of reactor 6 of the example MFC system 300 after its decommissioning. The number indicates the brush from where the sample was collected and T means the top of the brush, B is the bottom of the brush. LC and RC are left and right cathodes; in, mid and out indicate the sampling position in terms of flow direction, and T and B are the top and bottom of the cathodes.

The most relatively abundant bacteria at the anode belonged to the orders of Clostridiales, Bacteroidales, which likely contributed fermentative capacity. Desulfovibrionales, which is a sulfate reducing group, and Rhodocyclales, which catalyze versatile set of biochemical reactions including denitrification in both aerobic and anaerobic environments were also observed. For example, because the anodic communities were reproducible across reactors over time and performance, the stable co-existence of fermentative and electroactive species in these communities provide strong evidence that electroactive enrichments can be selected and maintained from a variety of waste streams for practical applications. It was also observed that the microbial communities at the anode surfaces were distinctly different in composition and relative abundance when compared to the those characterized from the effluent solution and inflow. This also confirms the stability of biofilm enrichments and associated function in fielded, pilot-scale microbial fuel cells, for example.

The cathode microbial communities were also distinctly different in microbial composition and relative abundance when compared to the anodes and inflow communities. However, the microbial composition of the left and right cathodes, at different sampling points on the surface, were very similar to each other even though the relative abundances of different orders were apparent. The dominant microbial populations included bacteria from the order Burkholderiales due to the presence of oxygen.

Figure 21A:
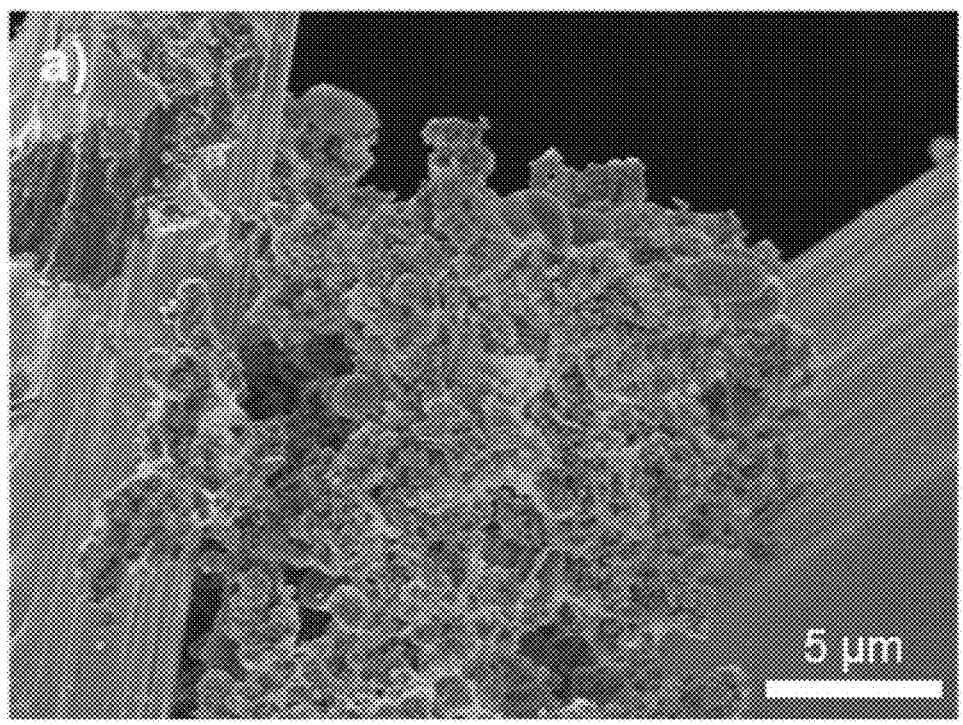
FIGS. 21A and 21B show SEM images showing biofilm on the anode (FIG. 21A) and the cathode (FIG. 21B) of reactor six of the example MFC system of FIG. 3.
Figure 21B:
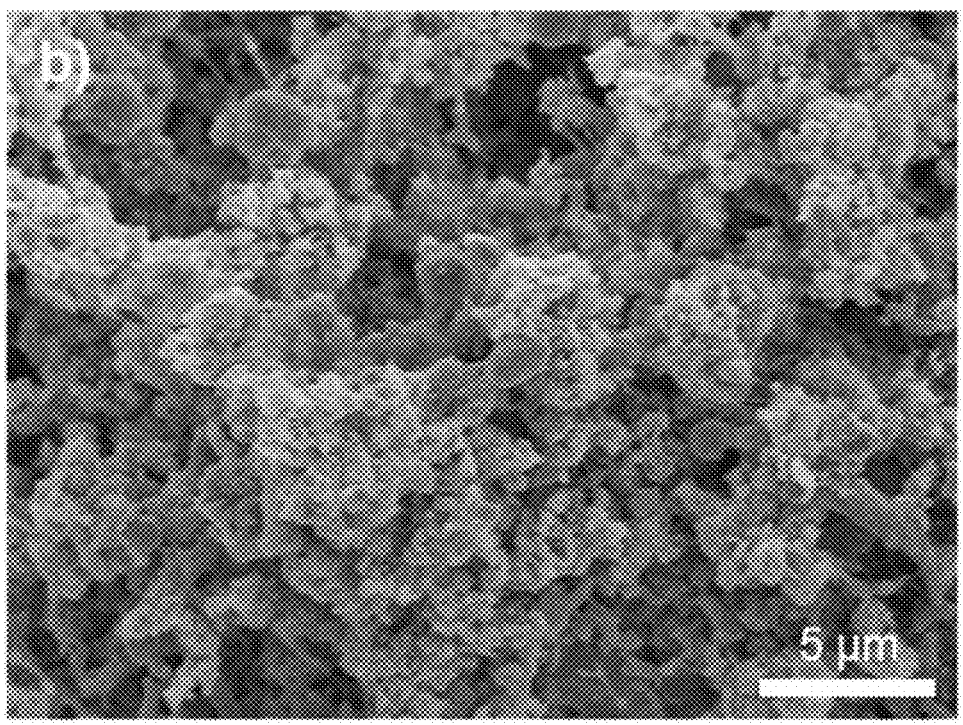

FIGS. 21A and 21B show SEM images showing biofilm on the anode (FIG. 21A) and the cathode (FIG. 21B) of reactor 6 of the example MFC system 300.

The SEM images of the anode and cathode subsamples from reactor 6 confirmed the presence of diverse microbial communities, which was more pronounced on the cathode surface, likely due to the presence of oxygen at the gas diffusion electrodes. In the example implementations, the biofilm on the anode brushes was not uniform and was mainly observed in between fibers of the brushes. It is hypothesized, for example, that the surface of graphite brushes is very smooth and hydrophobic, and prevents the formation of a strongly attached biofilms. Notably, for example, camera images taken during reactor decommissioning showed the presence of thick and uniform biofilm on the brushes, which apparently is lost during sample processing for SEM due to its loose attachment to the graphite fibers. The cathodic surface was entirely covered with a thick biofilm as evidenced by both camera and SEM images (e.g., FIG. 21B). The presence of bacteria appendages in between cells and significant extracellular material can be observed for both anode and cathode biofilms.

Example Results Including Statistical Analysis

Canonical Correspondence Analysis (CCA) was performed on the effluent data collected from the system over time. These analyses enable the characterization of possible correlations between reactor operation variables and the associated microbial diversity and abundance.

Figure 22A:
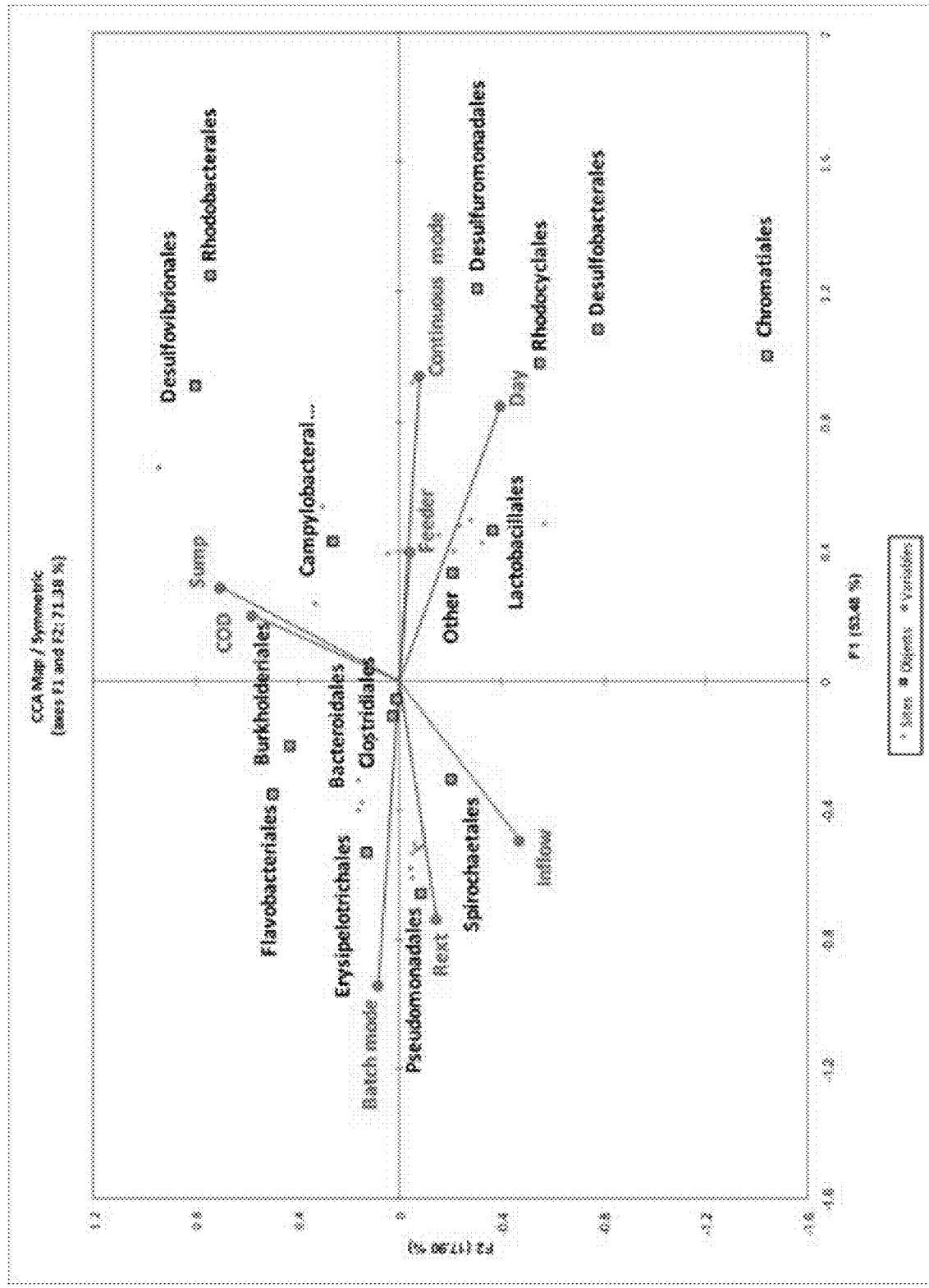
FIGS. 22A and 22B show data plots including a CCA biplot (FIG. 22A) of samples collected from the system effluent, and a PCA biplot (FIG. 22B) of samples collected during the decommissioning of reactor six of the example MFC system of FIG. 3.
Figure 22B:
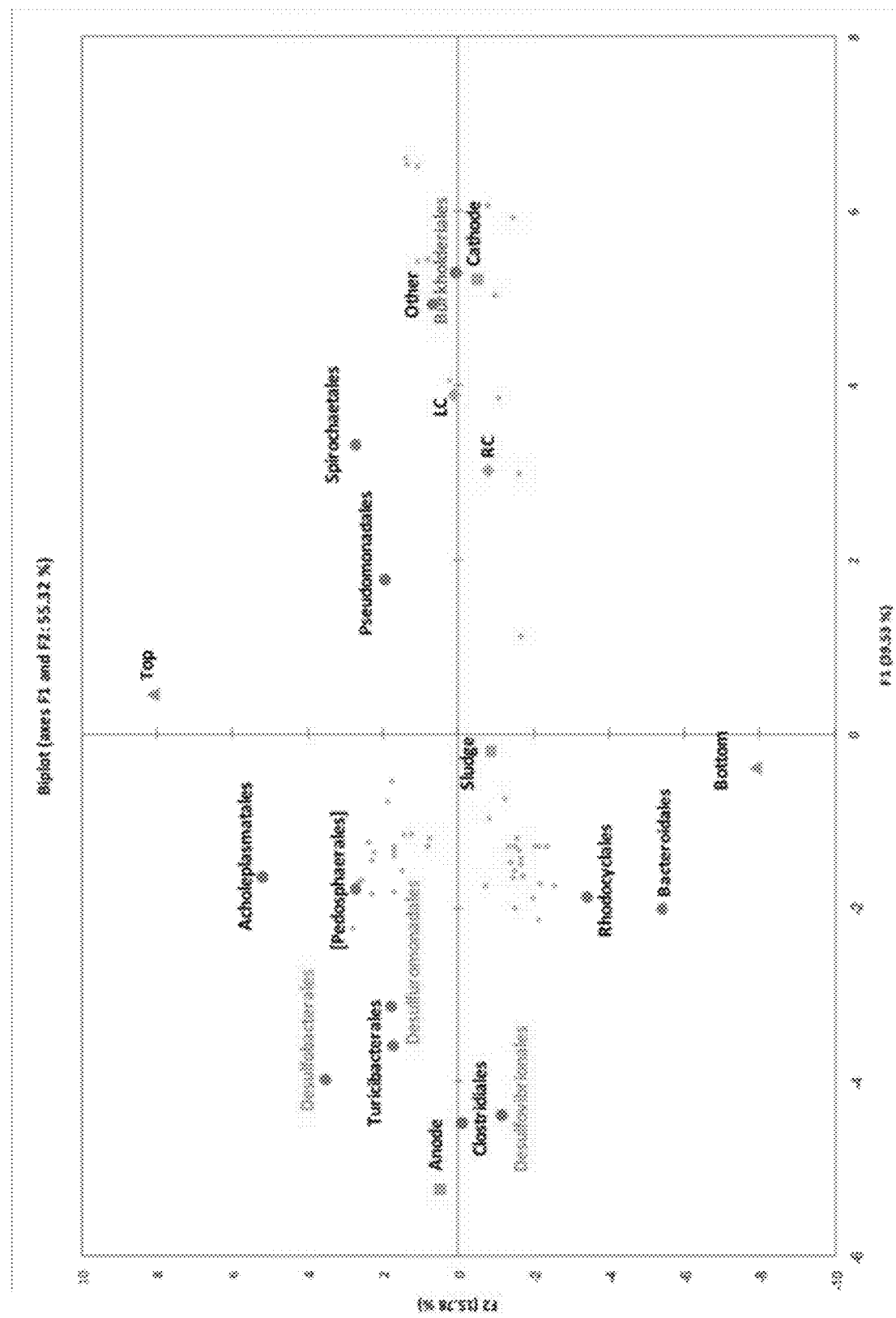

FIGS. 22A and 22B show data plots including a CCA biplot of samples collected from the system effluent (FIG. 22A), and a PCA biplot of samples collected during the decommissioning of reactor 6 (FIG. 22B).

The CCA biplot showed that inflow as well as effluent microbial community during batch mode had a higher abundance of Pseudomonadales and Spirochaetales, which disappear over time in continuous mode of operation. It was established that over time reactors were enriched with sulfate reducing (Desulfobacteriales and Desulfuromonadales) and denitrifying bacteria (Rhodocyclales). The latter were mainly found at the anode (e.g., FIG. 22B) and aerobic bacteria from the order Burkholderiales were predominant at the cathode surface due to the presence of oxygen. Burkholderiales have been identified in acetate-amended, denitrifying microbial communities, showing that denitrification might occurred at the cathodes. The Burkholderiales order are also one of the most common bacterial orders found in water systems and some species have been reported as opportunistic pathogens.

Principal Component Analysis is a statistical tool used in the last 5 years for data analysis of microbial fuel cell experiments. For example, it has advantages in visual representation of correlations and easy data interpretation, especially for large datasets multiple variables, which often requires multi-dimensional scaling techniques. The samples collected from the anode brushes and the cathodes of reactor 6 after it had been decommissioned were analyzed by PCA (e.g., FIG. 22B). The samples from the anode brushes were clustered together with a slight separation between top and bottom. The bottom of the brushes was populated with more species from the order Clostridia. Also, Clostridia at the anode appeared together with sulfate reducing bacteria and electrogenic bacteria (Desulfuromonadales).

A synergistic interaction exists between Clostridia and sulfate reducing bacteria. Fermentative bacteria also cooperate with electrogenic bacteria in MFCs. During symbiotic cooperation, the fermentative bacteria break down more complex organic compounds to volatile fatty acids, which are then used by sulfate reducing bacteria or electrogenic bacteria such as *Geobacter* spp.

The example implementations of the system 300 demonstrated the design and operation of a large scale MFC system for continuous treatment of swine wastewater at a small farm with an HRT of 4 hours. The subset of data presented herein include only 210 days of operation, and, notably, the system 300 is capable to currently operate. The example results showed maximum current density during this time frame as $103\pm7$ mA/m$^2$ ($1011\pm73$ mA/m$^3$) and corresponds to $37\pm5$ mW/m$^2$ ($362\pm52$ mW/m$^3$). The normalized energy recovery (NER) of the MFC system at $330\Omega$ was 0.11 kWh/kg COD, which is higher to the NER of anaerobic digestion treatment plant with energy recovery from methane. The maximum COD treatment rate of ~5.0 kg COD/m$^3$ per day was observed at day 95, where the COD loading was 2200 mg/L. The maximum COD removal efficiency (65%) was seen on day 102.

Example Implementations of the MFC System 400 for Domestic Wastewater Treatment

Figure 23:
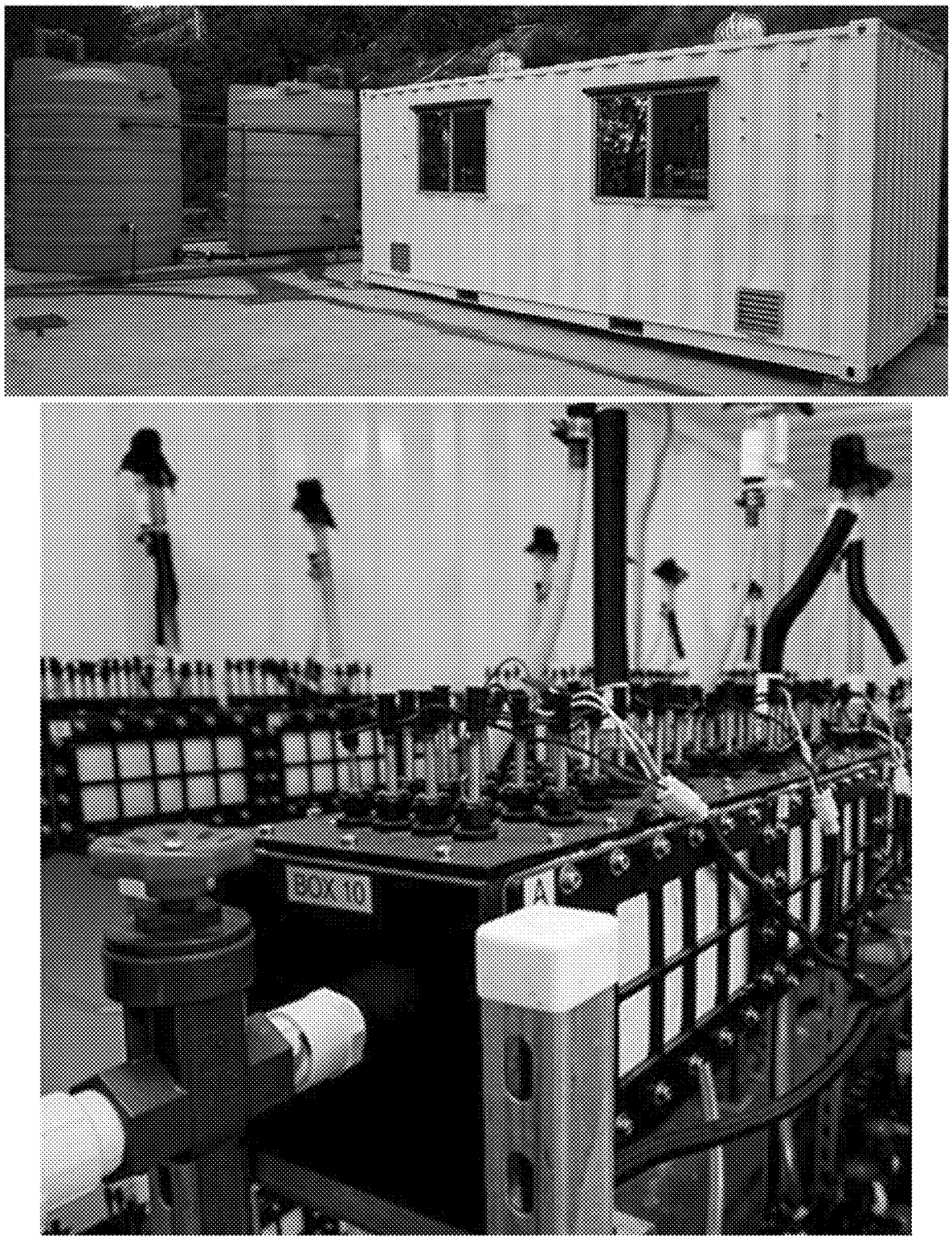
FIG. 23 shows images of an example implementation of the example modular MFC system of FIG. 4 for continuous treatment of domestic wastewater at high treatment rates.

FIG. 23 shows images of an example implementation of the modular MFC system 400. The example MFC system 400, which is illustrated in FIG. 4, was used in experimental implementations for continuous treatment of domestic wastewater at high treatment rates.

For example, the modular MFC system 400 was installed inside a 20-foot shipping container and placed in proximate to a small residential neighborhood to receive domestic wastewater. The MFC devices 410 of the system 400 were arranged in two vertical plains, top and bottom treatment trains. Each vertical plane of MFC devices 410 was forming a single treatment train. In the experimental implementations, the two treatment trains were inoculated by mixing domestic wastewater (e.g., 550 mg/L chemical oxygen demand (COD)); 31 L lagoon sediment and 30 mM carbonate buffer, pH 7.5.

For the experimental implementation, the modular MFC devices 410 of the top treatment train were labeled from 1 to 11 and included double and triple reactors 111. Each reactor in the double and/or triple reactor MFC device were names as A, B and C following the flow direction. For example, Reactor Unit 1 includes three reactors 111 directly coupled to each other and contained within in a single housing for hosting the triple reactor design. The first reactor 111 is designated as A, the second reactor as B and the third reactor as C. Reactor Unit 3 includes two reactors 111 directly coupled to each other and contained within in a single housing for hosting the double reactor design. The first reactor was designated as A and the second reactor 111 was designated as B.

For the experimental implementation, the MFC devices 410 of the bottom treatment train were labeled from 12 to 22 and included double and triple reactors 111. Each reactor in the double and/or triple MFC device were names as A, B and C following the flow direction.

Table 2 shows the chemical composition of the domestic wastewater. In Table 2, COD(T) and COD(S) represent the total and soluble chemical oxygen demand, respectively.

TABLE 2

Chemical composition of domestic wastewater at system inoculation.

| Parameter | Concentration |
|---|---|
| pH | 7.3 |
| COD (T), mg/L | 550 |
| COD (S), mg/L | 392 |
| $NO_3^-$—N, mg/L | 25.4 |
| $NH_4^+$—N, mg/L | 21.1 |
| $SO_4^{2-}$, mg/L | 300 |
| Conductivity, mS/cm | 62.7 |
| Sulfide, mg/L | 7.9 |

For the experimental implementation, a separate feeder boxes were used for the planar sets of modular MFC devices 410. The feeder box for each planar level help prevent pressure differences and assist in gravity flow of the fluid as it passes through the array of modular MFC devices 410.

For the first 30 days, the system was operated in a batch mode with recirculation of the solution through the feeder box and the reactors at a flow rate of 1.9 L/min. The COD level was maintained at 500 mg/L by weekly media exchanges of system 400, when new domestic wastewater was introduced.

Each reactor 111 of the modular MFC device(s) 410 was electrically monitored separately. The anode and the cathode of each reactor 111 of an MFC device 410 were connected through a resistor which magnitude was progressively decreased from 47,000Ω to 1,000Ω over 30 days of operation period.

Electrochemical characterization of the bioelectrochemical treatment process implemented by the reactors of the array of MFC devices 410 are discussed below.

Example Results for Electrochemical Performance and Characterization, and COD Removal Rate After inoculation, each reactor was connected by a 47,000Ω resistor. The immediate response of the reactors was a voltage of ~0.3V, which gradually increased to ~0.5 V at day 2 and 0.67 V at day 4. The start-up time of system 400 was short (e.g., less than 24 hours) as previously observed with system 300.

During the enrichment phase the system was operated under batch mode with weekly media exchanges to maintain a relatively constant level of COD (e.g., ~500 mg/L). For example, a media exchange was done by draining half of the treatment train solution and replacing it with new raw domestic wastewater. The latter increased the COD loading of the system.

Figure 24A:
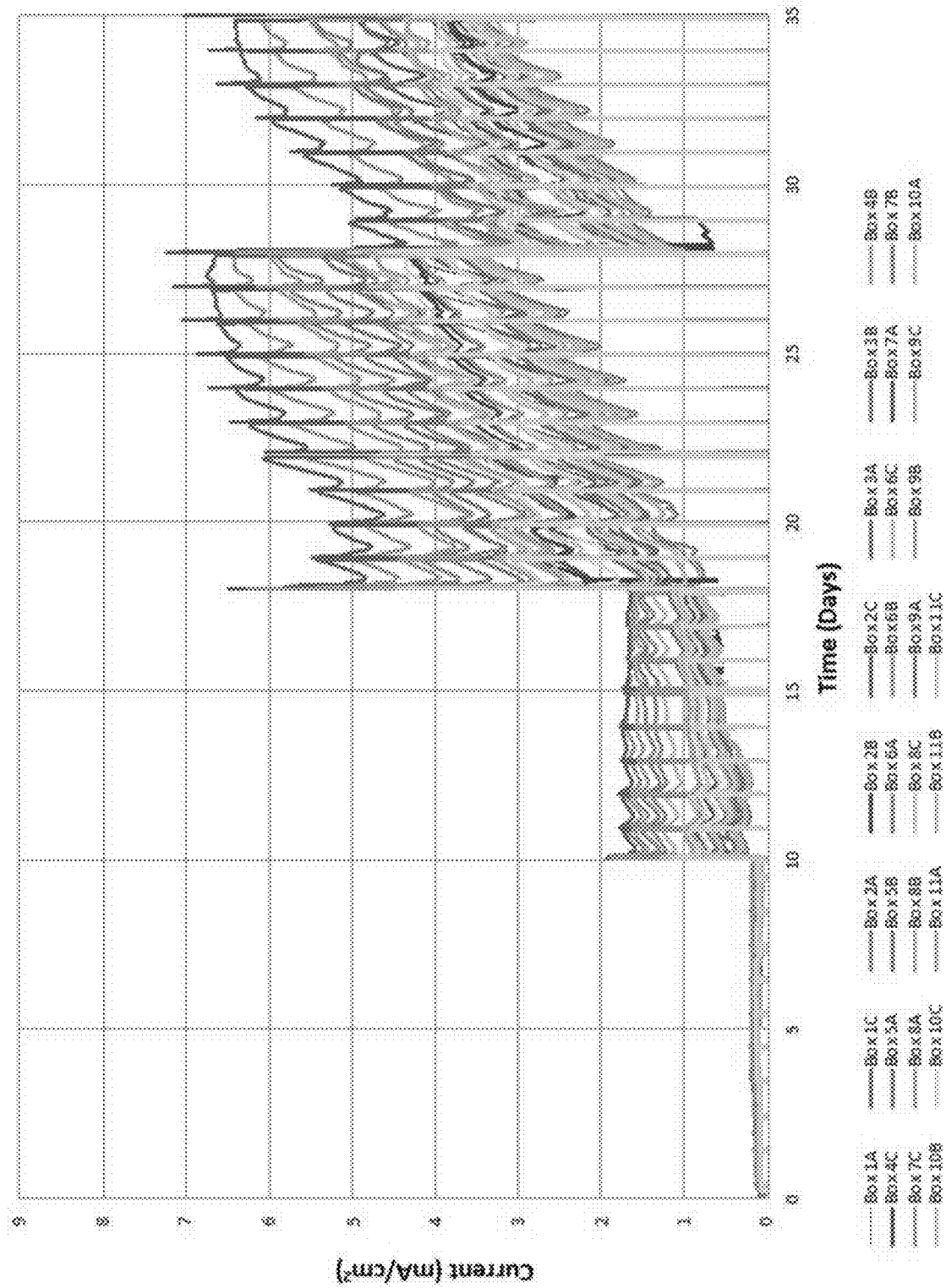
FIG. 24A shows a data plot depicting current density for each individual reactor of the top treatment train of the example MFC system of FIG. 4 when normalized to the cathodes surface area.
Figure 24B:
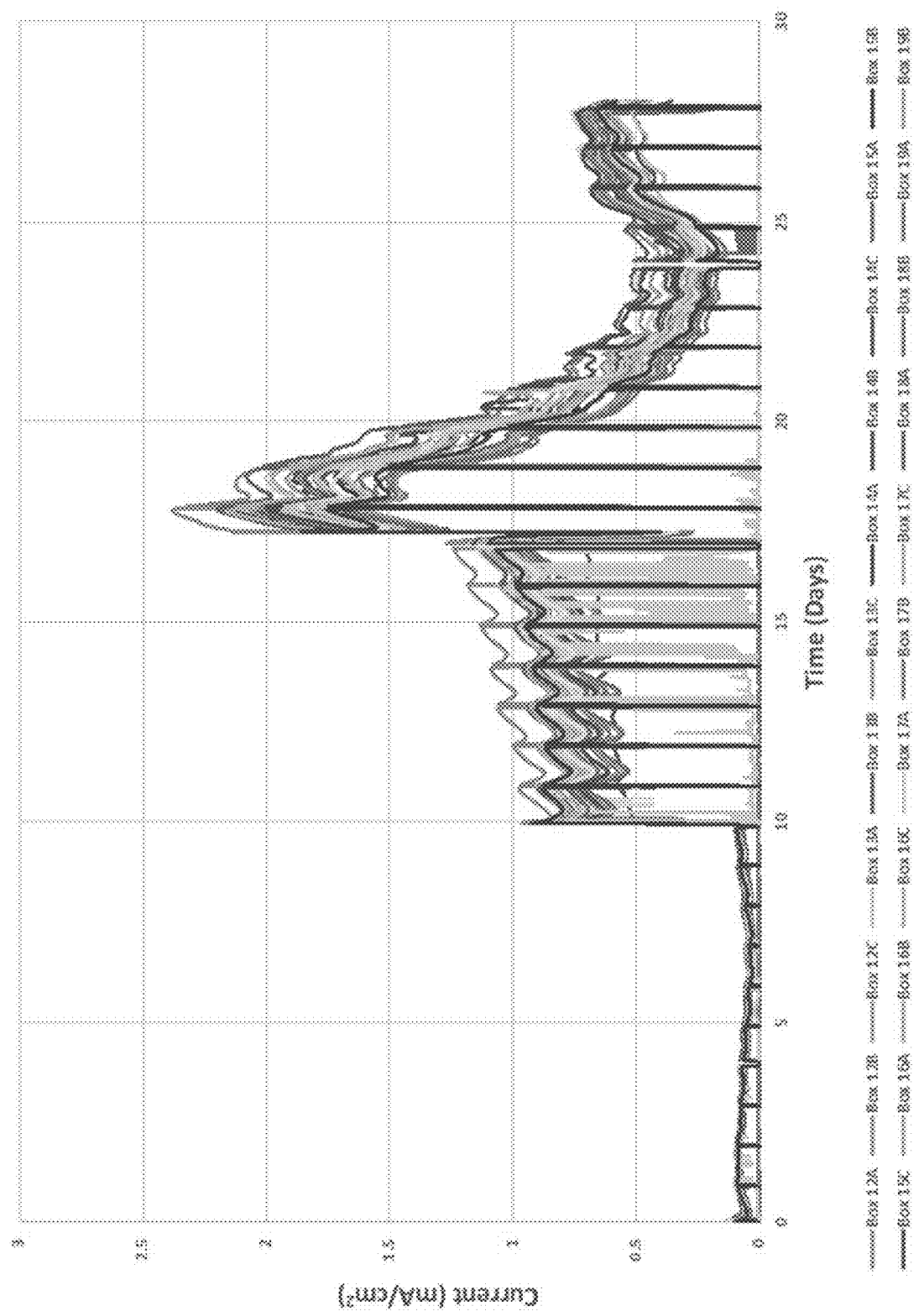
FIG. 24B shows a data plot depicting current density for each individual reactor of the bottom treatment train of the example MFC system of FIG. 4 when normalized to the cathodes surface area.

FIGS. 24A and 24B show data plots depicting current density for each individual reactor when normalized to the cathodes surface area for top treatment train (FIG. 24A) and bottom treatment train (FIG. 24B).

The generated current was used as an indicator of the performance of each reactor (FIGS. 24A and 24B). The maximum current densities generated by the reactors of the top treatment train were 4.0±1.2 mA/cm² with Relative Standard Deviation (RSD) of 30%, which is higher than the RSD of the current densities for the reactors of the bottom treatment trains. The reactors of the bottom treatment train demonstrated maximum current densities of 1.9±0.2 mA/cm² and RSD=9%. For example, the higher deviation of the current densities for the top train reactors is due to a replacement of the cathodes for some reactors, which led to higher current densities generated by them.

In general, it can be concluded that the reactors from a given treatment train performed similarly in terms of current generation. No trend was observed in ascending or descending current along the series of reactors.

Figure 25:
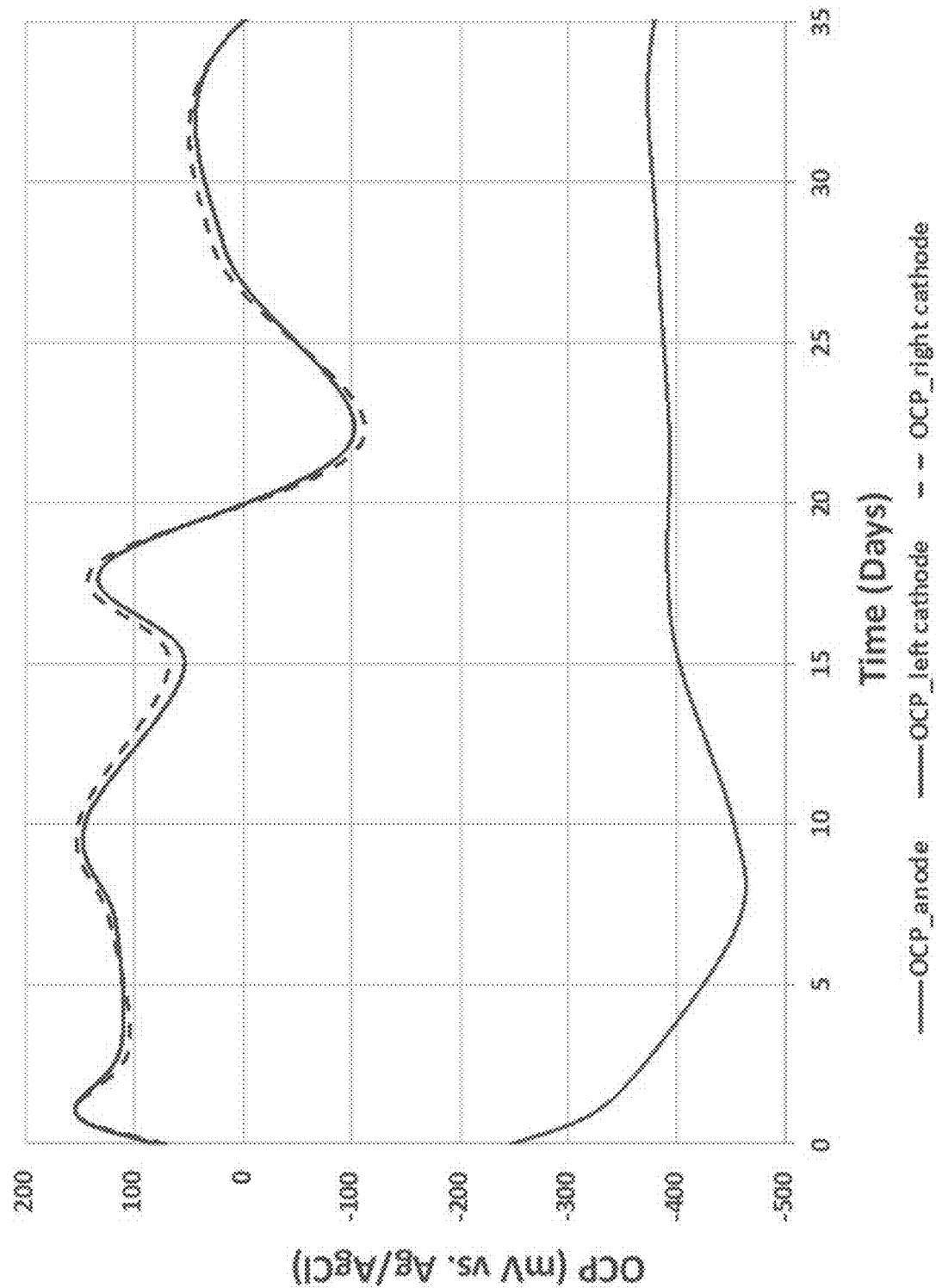
FIG. 25 shows a data plot depicting an open circuit potential data for individual reactor box 7B over time.

FIG. 25 shows a data plot depicting open circuit potential (OCP) measurements of the anode and the cathodes for reactor 7B of the example MFC system 400. The OCP of the separate electrodes was also monitored on a regular basis. FIG. 25 shows the OCP of the anode (e.g., 20 anode units operated as a single anode system), and left and right cathodes of reactor 7B as a representative reactor. As can be seen in the data plot, the anode developed a stable electrochemical potential in 15 days, which stayed constant for the remainder of the operation. At the same time the OCPs of the two cathodes decreased from 154 mV to 0 mV for both cathodes.

Example Results for Chemical Analysis of Wastewater Composition

Samples for chemical analysis of the example MFC system 400 were taken before and after the batch cycles and from the inflow and outflow during continuous mode of operation. COD removal rate as a main parameter was evaluated and the ability of the system to remove nitrogen and sulfur-containing inorganic pollutants was also determined.

Figure 26:
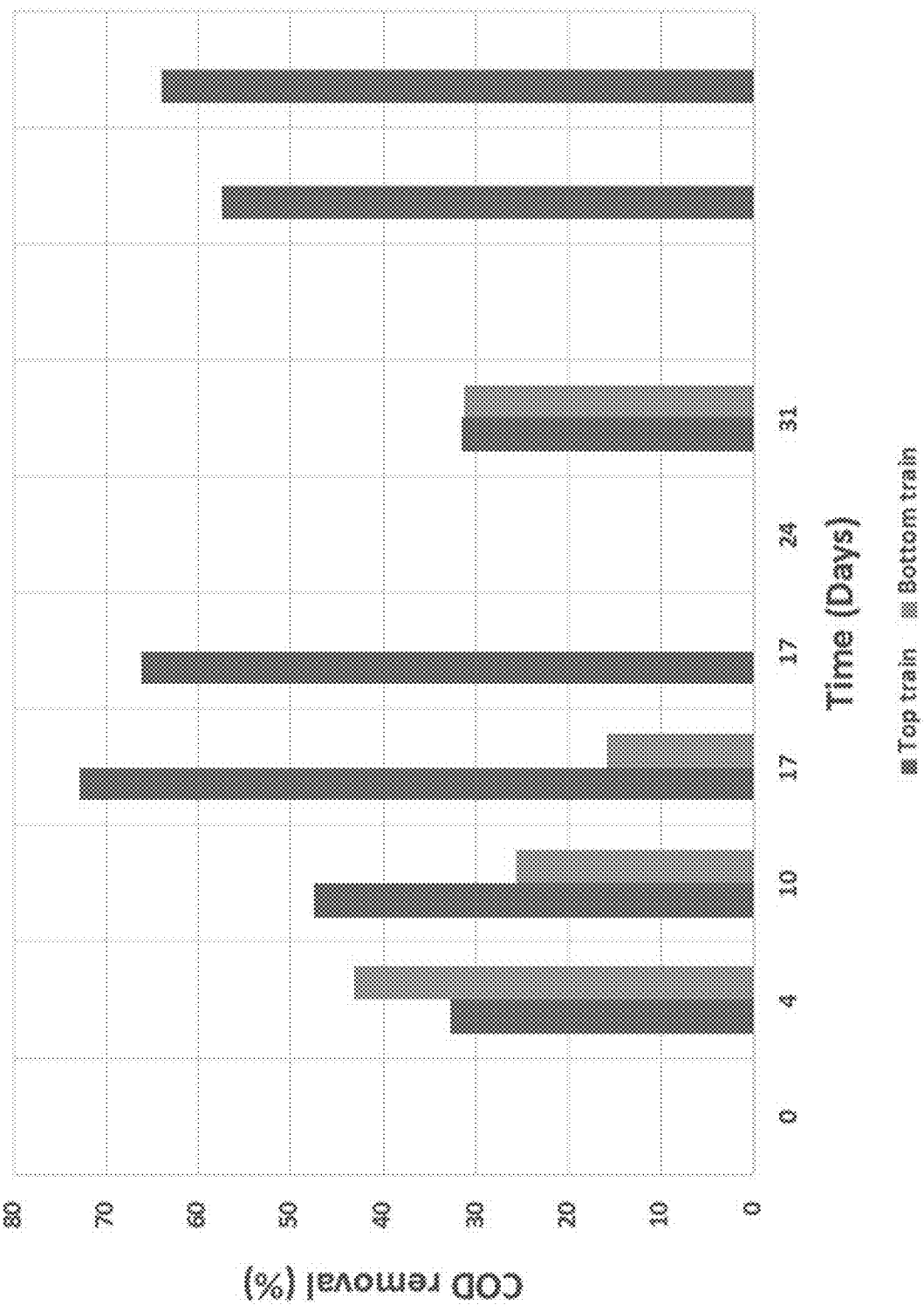
FIG. 26 shows a data plot depicting COD removal efficiency for top and bottom treatment train of the example MFC system of FIG. 4.

FIG. 26 show data plots depicting COD removal efficiency of the example MFC system 400 under batch mode. For example, the COD removal efficiency for the top treatment train was 53±16% and for the bottom treatment train, the COD removal efficiency was 29±11%. The higher removal efficiency of the top train is a result of the better electrochemical performance of the reactors from the top treatment train.

The organic removal rate of the overall system 400 during continuous mode was in the range of 21 to 47%.

It is noted from the example implementations that the example MFC system 400 used in the implementation had a higher working volume than MFC system 300, but COD removal efficiency of the MFC system 400 in the example implementations is comparable to MFC system 300 described above. The normalized energy recovery (NER) of the MFC system 400 at 1000Ω and continuous mode of operation was 0.24 kWh/kg COD, which is higher than the NER of MFC system 300 due to the higher number of reactors. Due to the lower COD removal rates during batch mode, the NER was calculated as 9.8 kWh/kg COD with Coulombic Efficiency (CE) of 31%. On average, the CE of the MFC system 400 under continuous mode was estimated as 32%.

Figure 27:
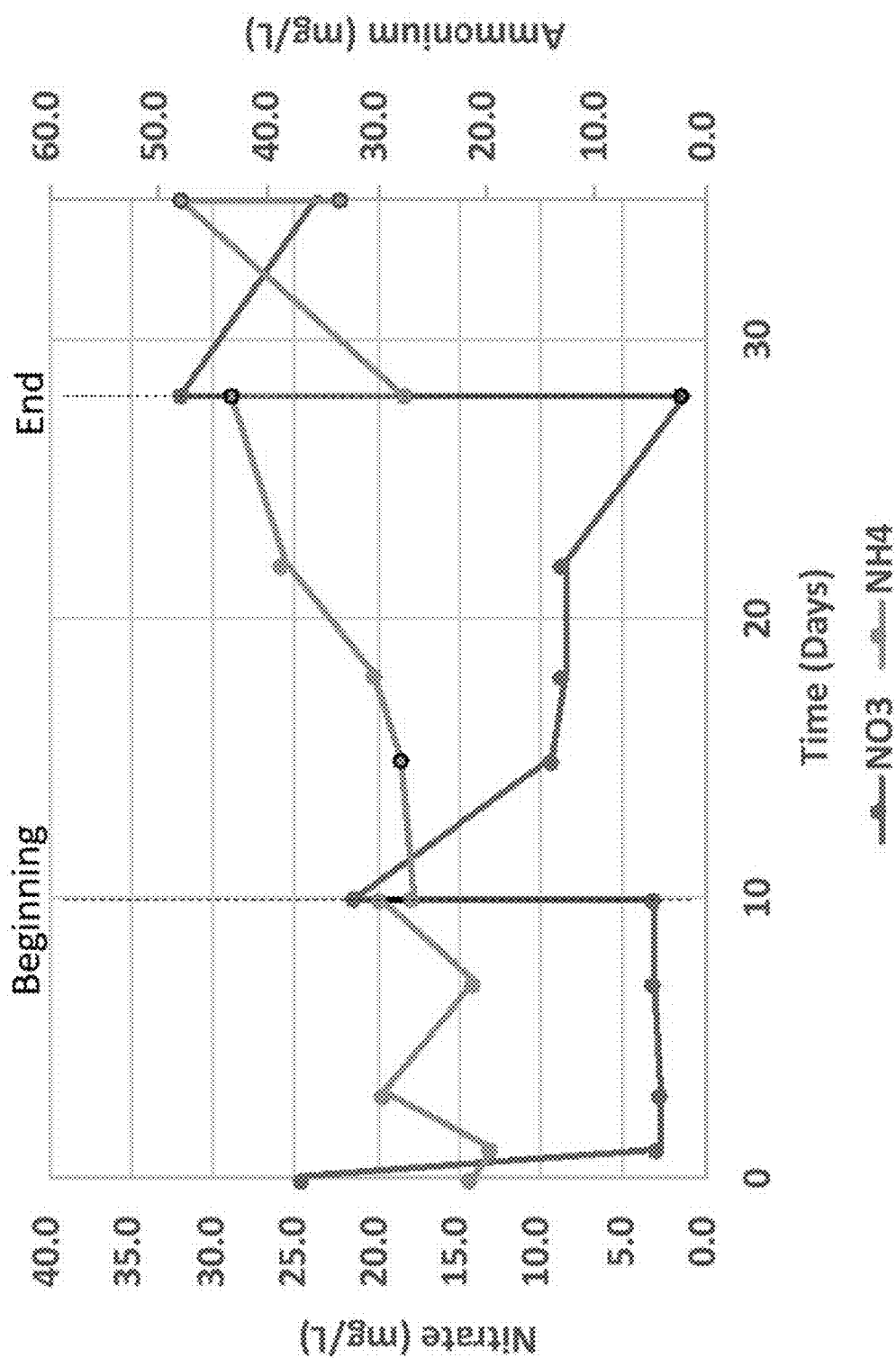
FIG. 27 shows a data plot depicting changes in nitrite and ammonium concentrations over time for top treatment train.

FIG. 27 show data plots depicting concentration of $NO_3^-$—N and $NH_4^+$—N in the system during batch mode. Similar to the example MFC system 300, the example MFC system 400 treating domestic wastewater also converts nitrate into ammonium following DNRA pathway for nitrate removal. When nitrate is present in the influent it is rapidly reduced. The nitrate and nitrite removal efficiencies under continuous mode were 70% and 20%, respectively.

In the samples, the concentration of ammonium increased when the wastewater passed through the reactors. An increase in the ammonium content was observed to be 6, which also indicates that along DNRA, the nitrate and nitrite are reduced to nitrogen gas. The latter is highly desirable reaction in wastewater treatment and nitrite/nitrate removal.

It should be noted that there is not an EPA regulation for ammonium concentrations; however, taste and smell limitations are in the range of 35 mg-N/L to 0.2 mg-N/L, respectively. Nitrate and nitrite water quality limitations are 10 mg-N/L and 1 mg-N/L, respectively. The example MFC system 400 showed ammonium removal and a decrease of the nitrate and nitrite concentrations, which provides treated water that can meet and exceed these thresholds.

Figure 28:
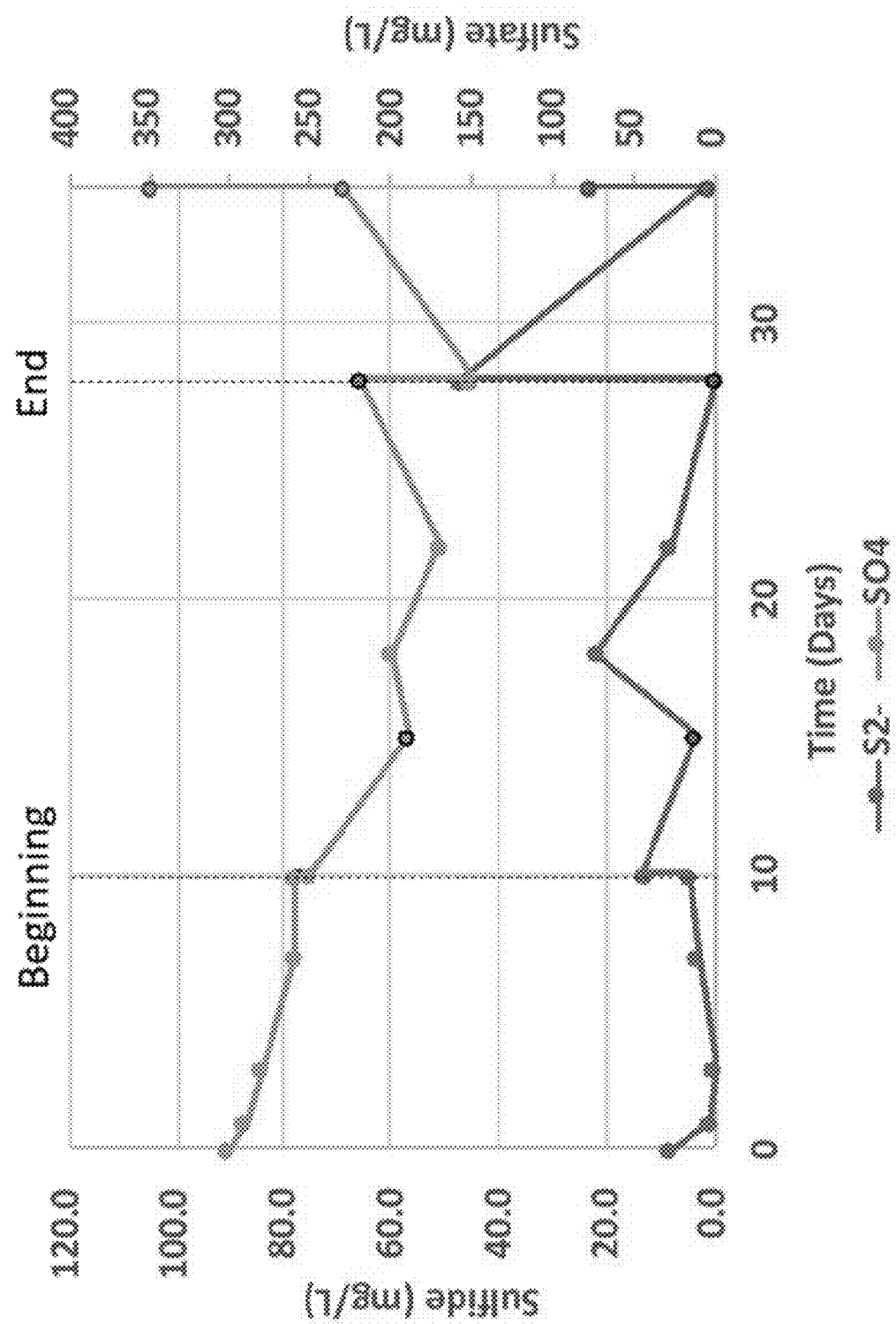
FIG. 28 shows a data plot depicting changes in sulfide and sulfate concentrations over time for top treatment train.

FIG. 28 shows a data plot depicting sulfate concentration of the system 400 during batch mode. Sulfate was reduced to sulfide during the treatment process. The accumulation of sulfide in the system can cause a decrease in the cathodic potential due to catalyst poisoning and/or competitive cathodic sulfate reduction. A pretreatment step for sulfate/sulfide removal is necessary to be implemented in the treatment process.

Figure 29:
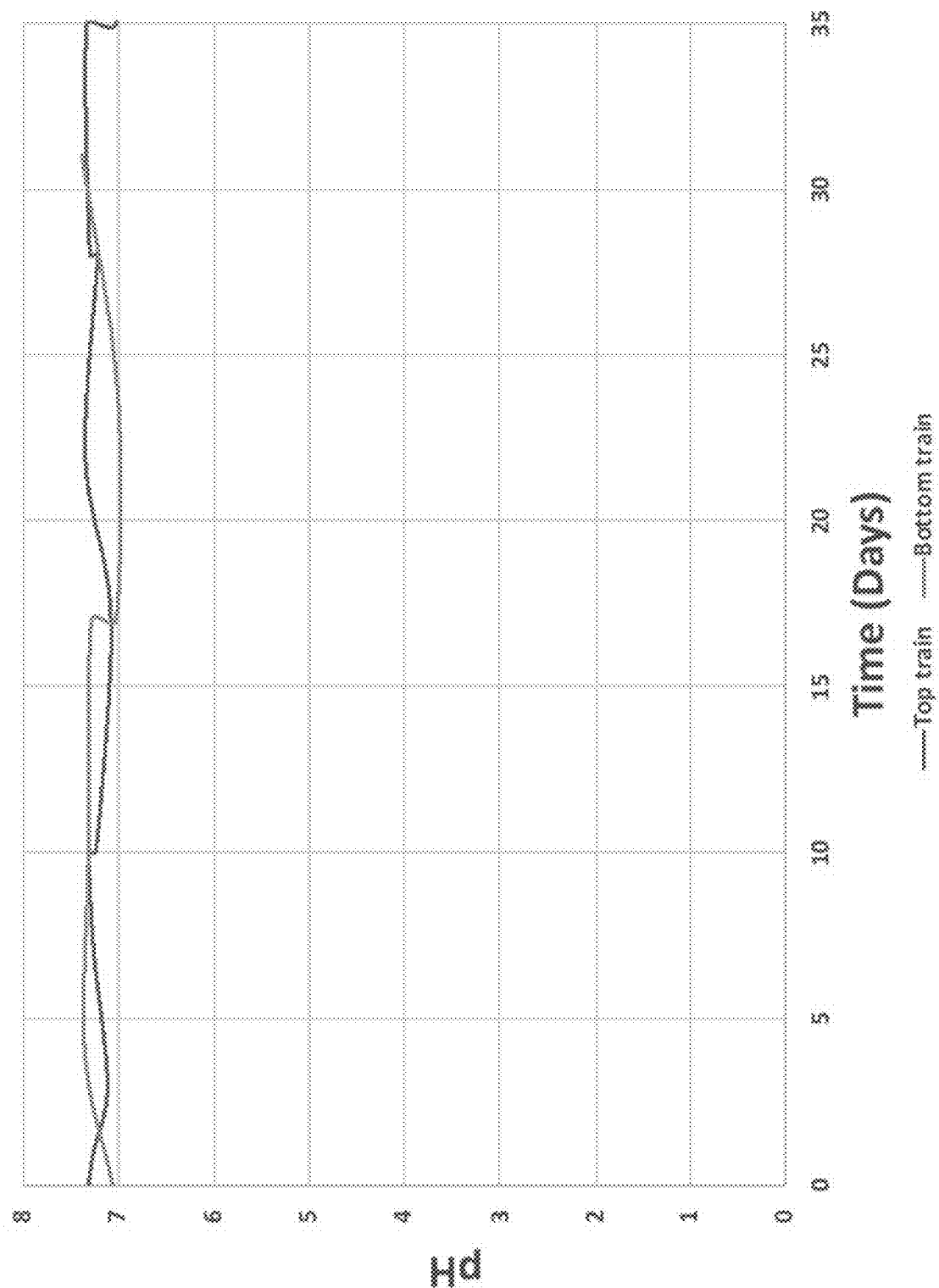
FIG. 29 shows a data plot depicting pH trend over time of the top and bottom treatment train.

FIG. 29 shows a data plot depicting pH profile over time. The pH of the system was maintained neutral throughout operation.

Figure 30:
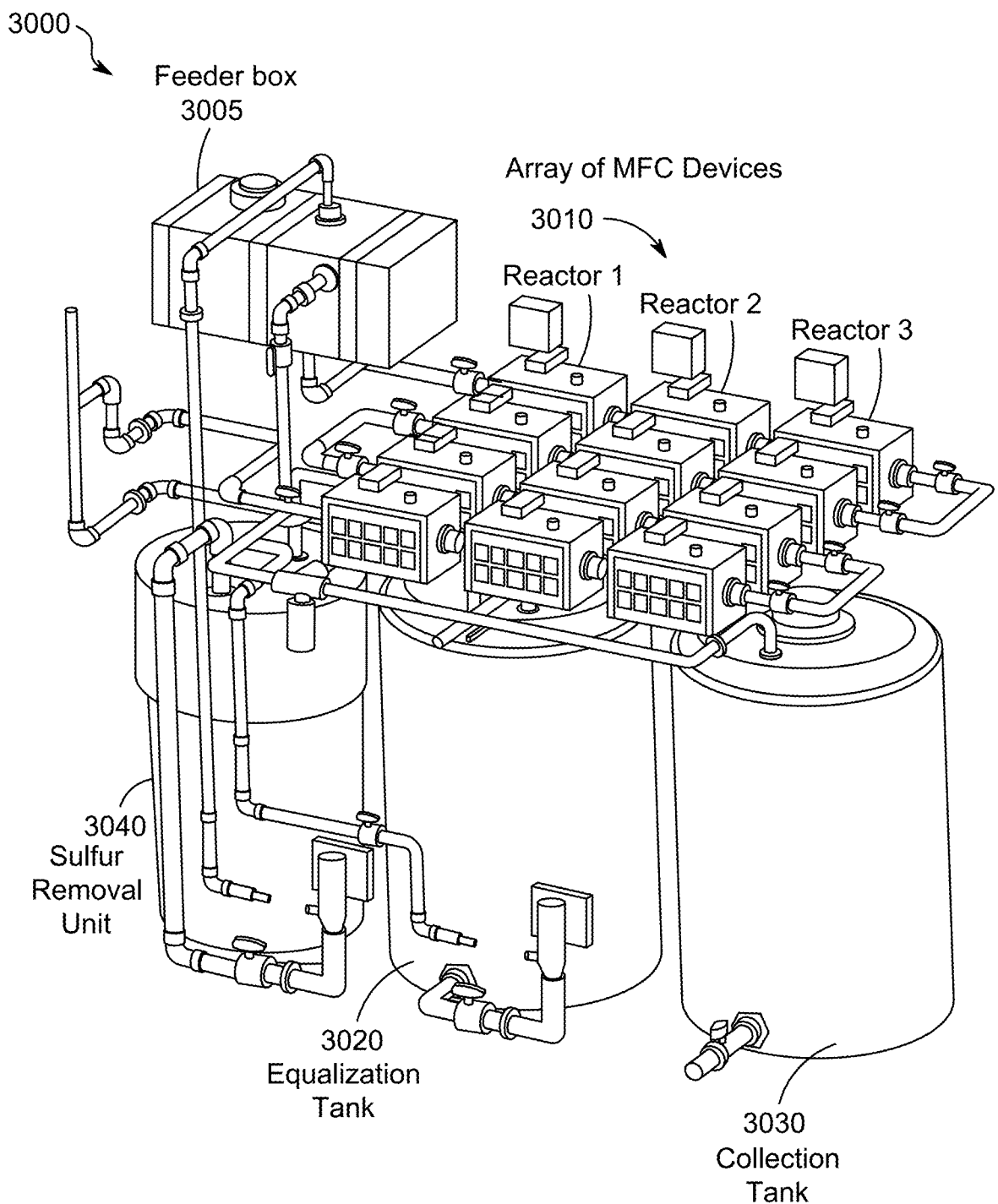
FIG. 30 shows a diagram of an example embodiment of a modular MFC system in accordance with the present technology implemented for treatment of brewery wastewater.

Example Implementations of the MFC System 3000 for Brewery Wastewater Treatment FIG. 30 shows a diagram of another example embodiment of the modular MFC system 100, labeled MFC system 3000, used in experimental implementations for continuous treatment of brewery wastewater at high treatment rates and flow rates, e.g., such as 570 L/day (e.g., 150 gpd) for long-term operation. The example modular MFC system 3000 includes an array of modular MFC devices 3010 arranged in hydraulic series on a mobile rack structure. The modular MFC devices 3010 of the array can be configured in a single reactor design, a double reactor design, and/or triple reactor designs. The example MFC system 3000, as shown in the diagram of FIG. 30, includes twelve standalone reactor assemblies of single reactor designs.

The array of modular MFC devices 3010 are spatially arranged in one vertical plane and a single treatment train. The modular MFC devices 3010 of the array are arranged to receive the pre-treated wastewater from a feeder box 3005 at a Reactor 1, e.g., via gravity-fed flow, in which the fluid undergoes a consecutive flow from Reactor 1 to Reactor 2 to Reactor 3 to . . . to Reactor 12. For example, the feeder box 3005 is positioned above the plane of the reactors to provide a gravity fed flow.

In some embodiments, for example, the fluid level in the reactors is controlled by a U-loop configuration or assembly of pipes with a shape of reverse U. In such embodiments of the system 3000, the outflow of the array of modular MFC devices 3010 flows through the U-loop before it reaches a collection tank 3030. The U-loop can be positioned above the plane of the array of modular MFC devices 3010 and below the plane of the feeder box 3005. The fluid levels between feeder box 3005 and U-loop determines the liquid flow through MFC devices 3010.

In some embodiments, for example, the raw wastewater is provided by equalization tank 3020 and the treated effluent is discharged into a collection tank 3030. In some embodiments, for example, the MFC system 3000 includes a sulfur removal unit 3040, which assists in the pre-treatment of the raw wastewater.

While double and triple reactor configurations are shown in the example modular MFC devices 3010 of the system 3000 in FIG. 30, the modular MFC devices 3010 can include other combinations of single, double and/or triple bioelectrochemical reactors. Examples of the single reactors are further detailed in connection with FIGS. 5A-5E and FIGS. 6A-6E; examples of the double reactors are further detailed in connection with FIGS. 7A-7E, and examples of the triple reactors are further detailed in connection with FIGS. 8A-8E. Various components of the single, double, and/or triple reactors, e.g., such as the reactor housings, may be made using a computer numerical control (CNC) machine or may be machined by another process by hand or using other machine tool.

In an example experimental implementation, the example modular MFC system 3000 was installed outside a small brewery to receive brewery wastewater, and included a shade structure and monitoring system to shade and study environmental variables of temperature and humidity on the reactors of the system. In the experimental implementations, the system 3000 was inoculated by mixing brewery wastewater (e.g., 26,000 mg/L chemical oxygen demand (COD)); 0.5 L lagoon sediment and 30 mM carbonate buffer, pH 7.5.

Table 3 shows the chemical composition of the brewery wastewater. In Table 3, COD(T) and COD(S) represent the total and soluble chemical oxygen demand, respectively.

TABLE 3

| Chemical composition of brewery wastewater at system inoculation. | |
|---|---|
| Parameter | Concentration |
| pH | 5.88 |
| COD (T), mg/L | 26.560 |
| COD (S), mg/L | 26.480 |
| $NO_3^-$—N, mg/L | 11 |
| $NO_2^-$—N, mg/L | Not detected |
| $NH_4^+$—N, mg/L | 21 |
| $SO_4^{2-}$, mg/L | Not detected |
| $S^{2-}$, mg/L | Not detected |
| Total Suspended Solids (TSS), mg/L | 246 |
| Conductivity, mS/cm | 1.46 |
| Volatile Fatty Acids (VFA), mg/L | 355 |
| Protein, mg/L | 232 |

For the experimental implementation, the brewery was collected from a small brewery at Joshua Tree, Calif. The brewery wastewater was used as it is. The brewery wastewater was then added to the equalization tank and fed into the feeder box. The experimental implementation of brewery wastewater treatment by the example modular MFC system 3000 was conducted over 250 days.

The system was operated mainly in a batch mode with recirculation of the solution through the feeder box and the reactors at a flow rate of 0.38 L/min. A raw brewery wastewater was introduced in the system 3000 once a week.

The system was periodically switched into continuous mode for COD removal rates evaluation. Under continuous mode, the brewery wastewater was flowing from the equalization tank to the feeder box, through the reactors and collected in a collection tank.

Each reactor was electrically monitored separately. The anode and the cathode of each reactor of the MFC device 3010 were connected through a resistor which magnitude was progressively decreased from 47,000Ω to 200Ω during operation.

Electrochemical characterization of the bioelectrochemical treatment process implemented by the reactors of the array of MFC devices 3010 are discussed below. The voltage (V) across an external resistor for each reactor was monitored in 30 min intervals. The reactors were periodically disconnected to measure open circuit potential (OCP) of the electrodes.

The current and power densities of each individual reactor were calculated as the current of the reactor normalized to the cathodes geometric surface area (0.0734 m$^2$).

Example results of the experimental implementation of the system 3000 are described below.

Example Results for Electrochemical Performance and Characterization, and COD Removal Rate After inoculation, each reactor was connected by a 47,000Ω resistor and slowly decreased to 200Ω. The voltage of each reactor gradually increased to ~0.3 V at day 2 to 0.6 V at day 6. The start-up time of the system 3000 is short (e.g., less than 24 hours). A fluctuation in the generated voltage following the day and night cycles can also be seen.

Figure 31:
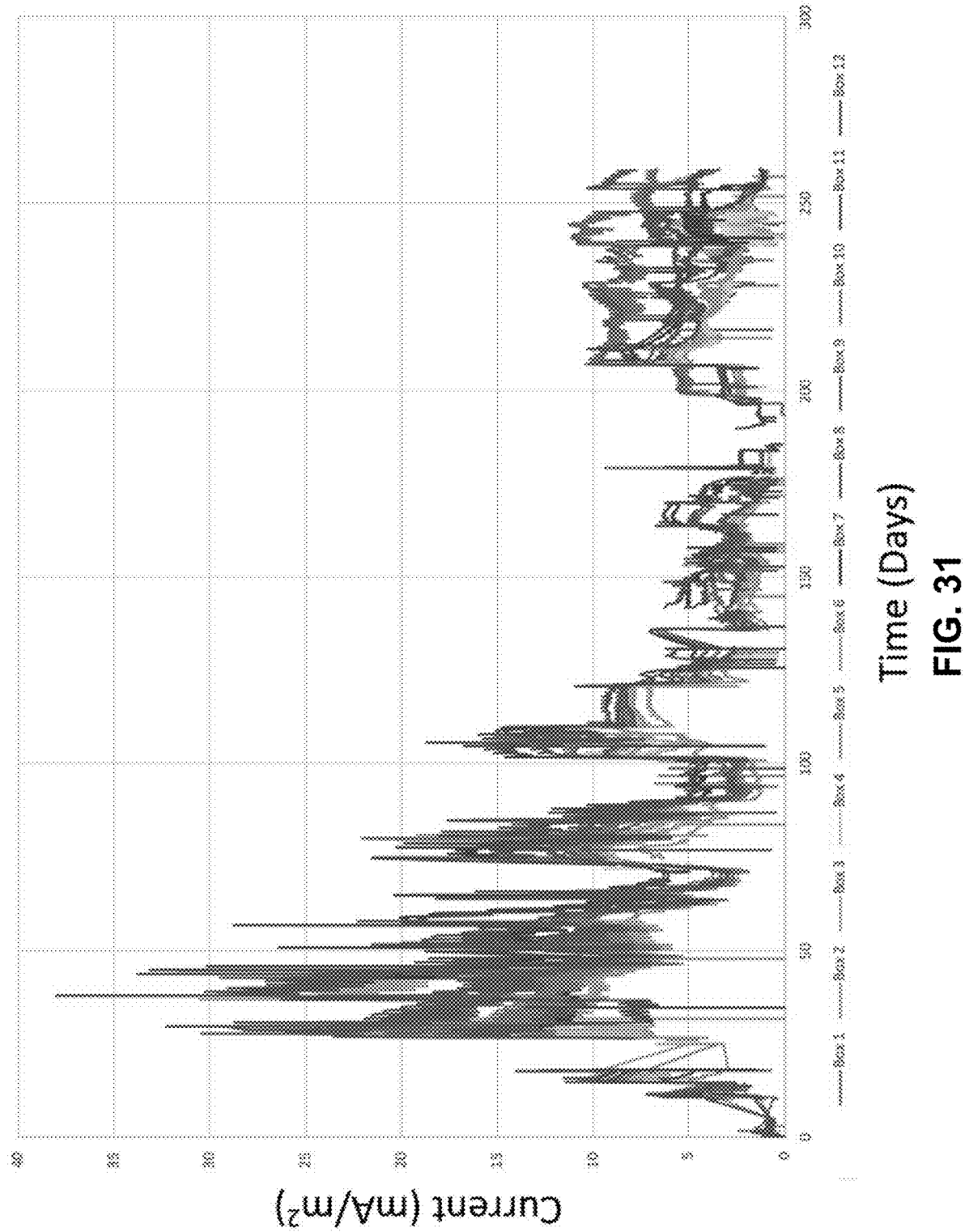
FIG. 31 shows a data plot depicting current density for each individual reactor of the example MFC system of FIG. 30 when normalized to the cathodes surface area.

FIG. 31 show data plot depicting current density for each individual reactor when normalized to the cathodes surface area. The generated current was used as an indicator of the performance of each reactor. The reactors demonstrated relatively similar electrochemical performance. The maximum average current density of 25 mA/m$^2$ was achieved under 200Ω resistor and corresponds to 9 mW/m$^2$.

Figure 32:
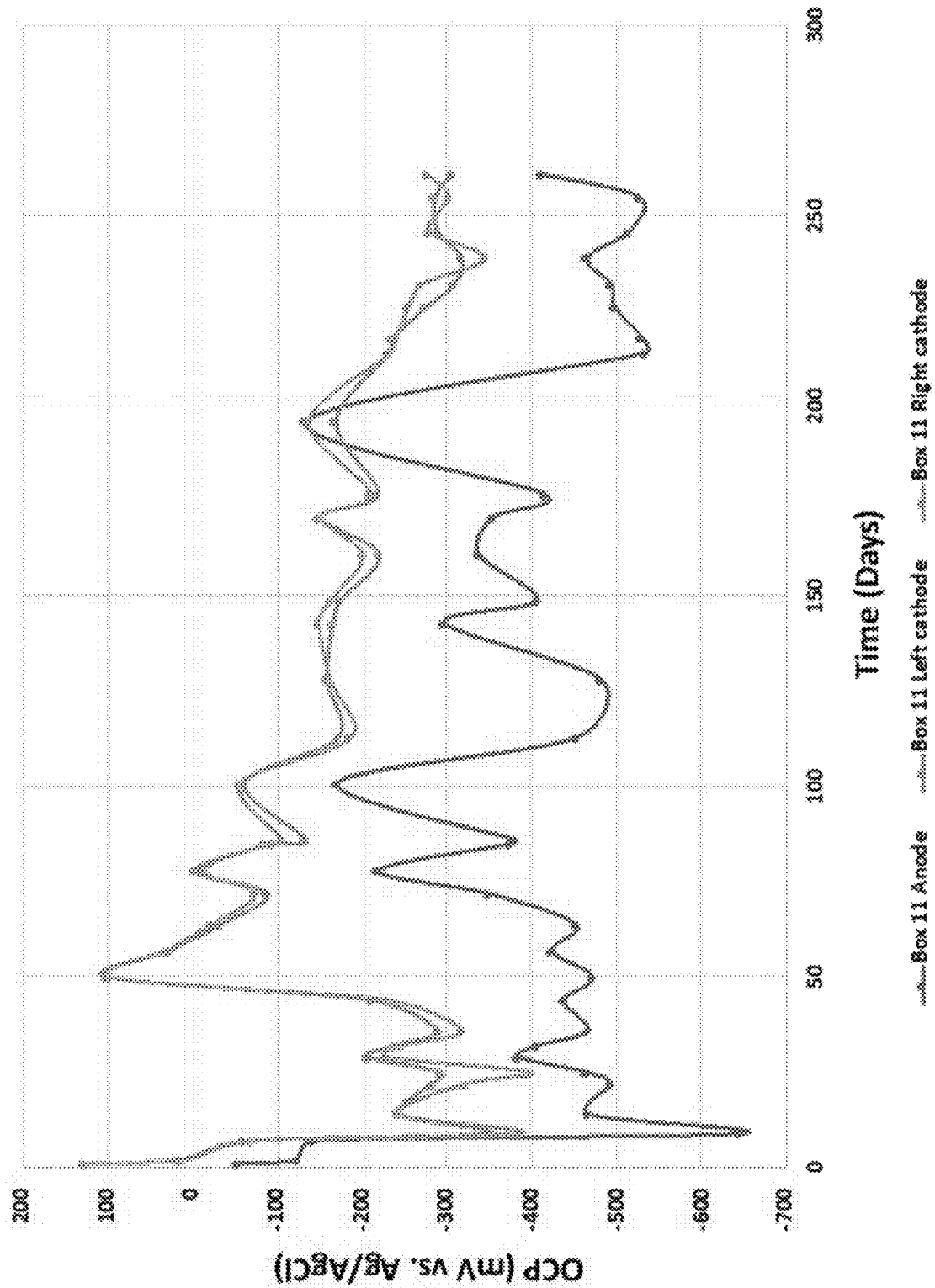
FIG. 32 shows a data plot depicting the open circuit potential data for individual reactor box 11 over time.

FIG. 32 shows a data plot depicting open circuit potential (OCP) measurements of the anode and the cathodes for reactor 11 of the example MFC system 3000. The OCP of the separate electrodes was also monitored on a regular basis. FIG. 32 shows the OCP of the anode (e.g., 20 anode units operated as a single anode system), and left and right cathodes of reactor 11 as a representative reactor. The anodic OCP is highly dependent on the COD loading where a higher COD resulted in more negative anodic potential. The cathodic potential slowly decreased over time from 100 mV to −300 mV vs. Ag/AgCl. The decreased cathodic potential is most likely a result of the specific brewery wastewater composition and the occurrence of competitive reactions.

Example Results for Chemical Analysis of Wastewater Composition

Samples for chemical analysis of the inflow and outflow of the example MFC system 3000 were taken periodically to evaluate the COD removal rate as a main parameter, as well as to determine the ability of the system to remove nitrogen and sulfur-containing inorganic pollutants.

Figure 33A:
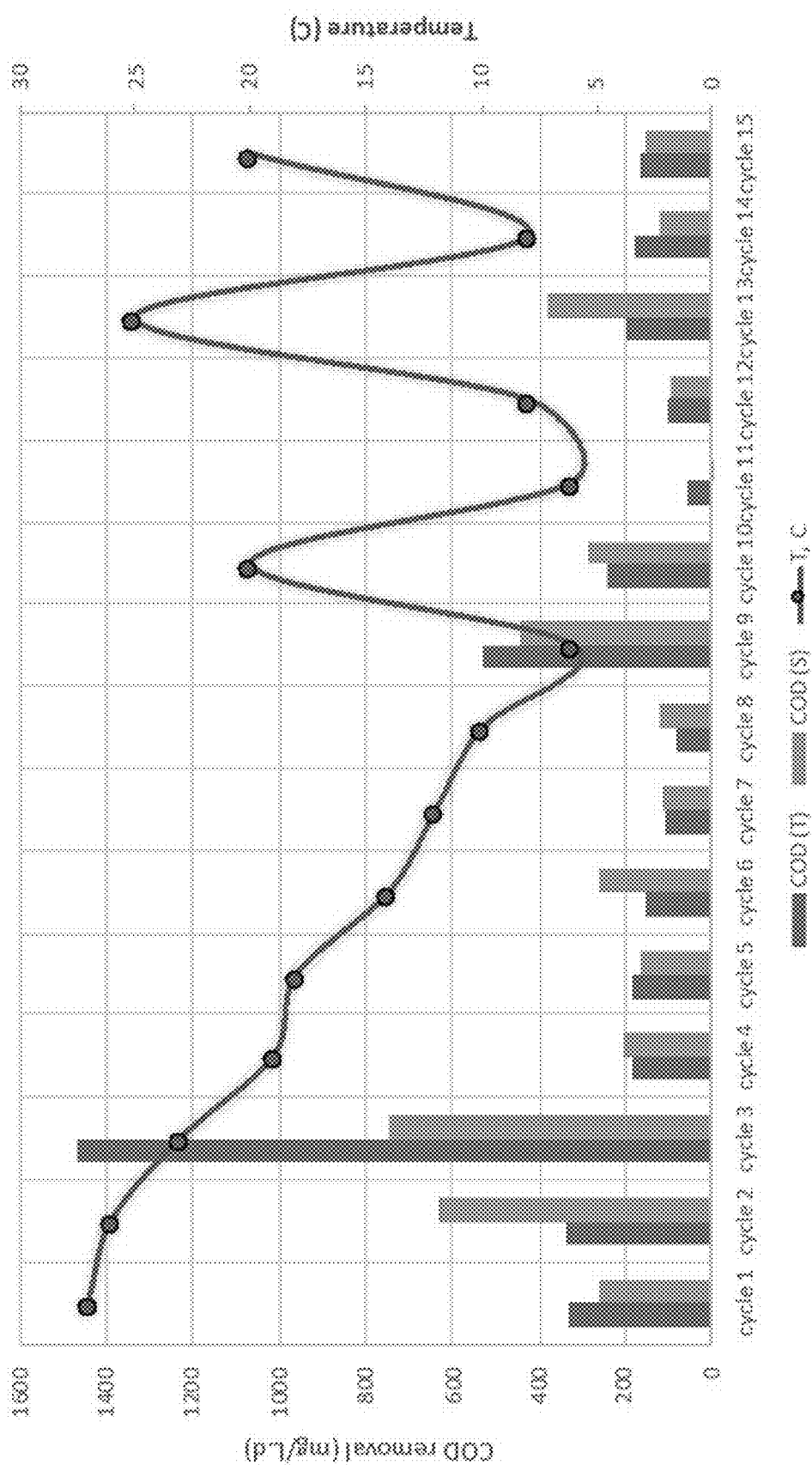
FIG. 33A shows a data plot depicting COD removal rate as mg/L COD for the example MFC system shown in FIG. 30 under batch mode.
Figure 33B:
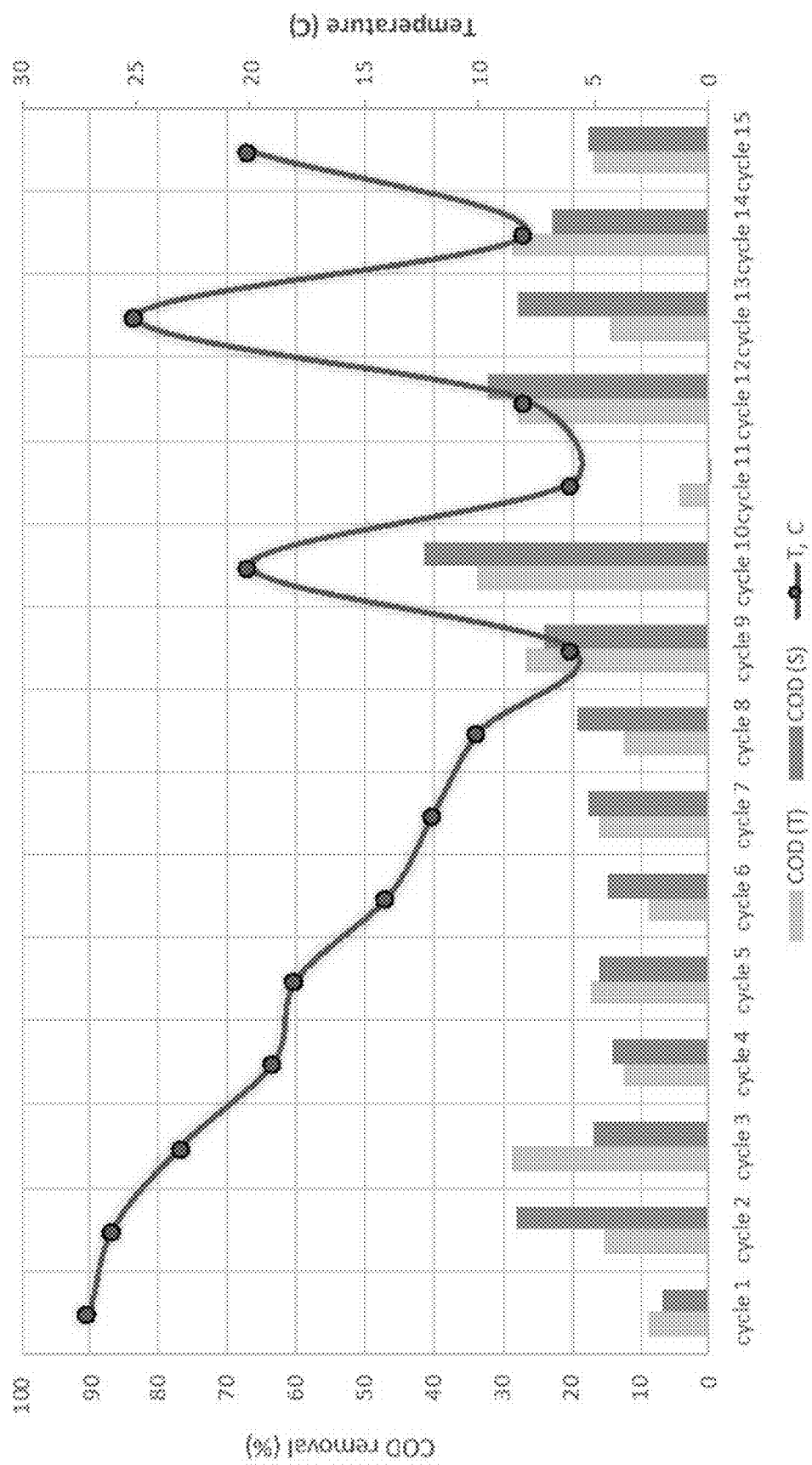
FIG. 33B shows a data plot depicting COD removal rate efficiency for the example MFC system shown in FIG. 30 under batch mode.
Figure 34A:
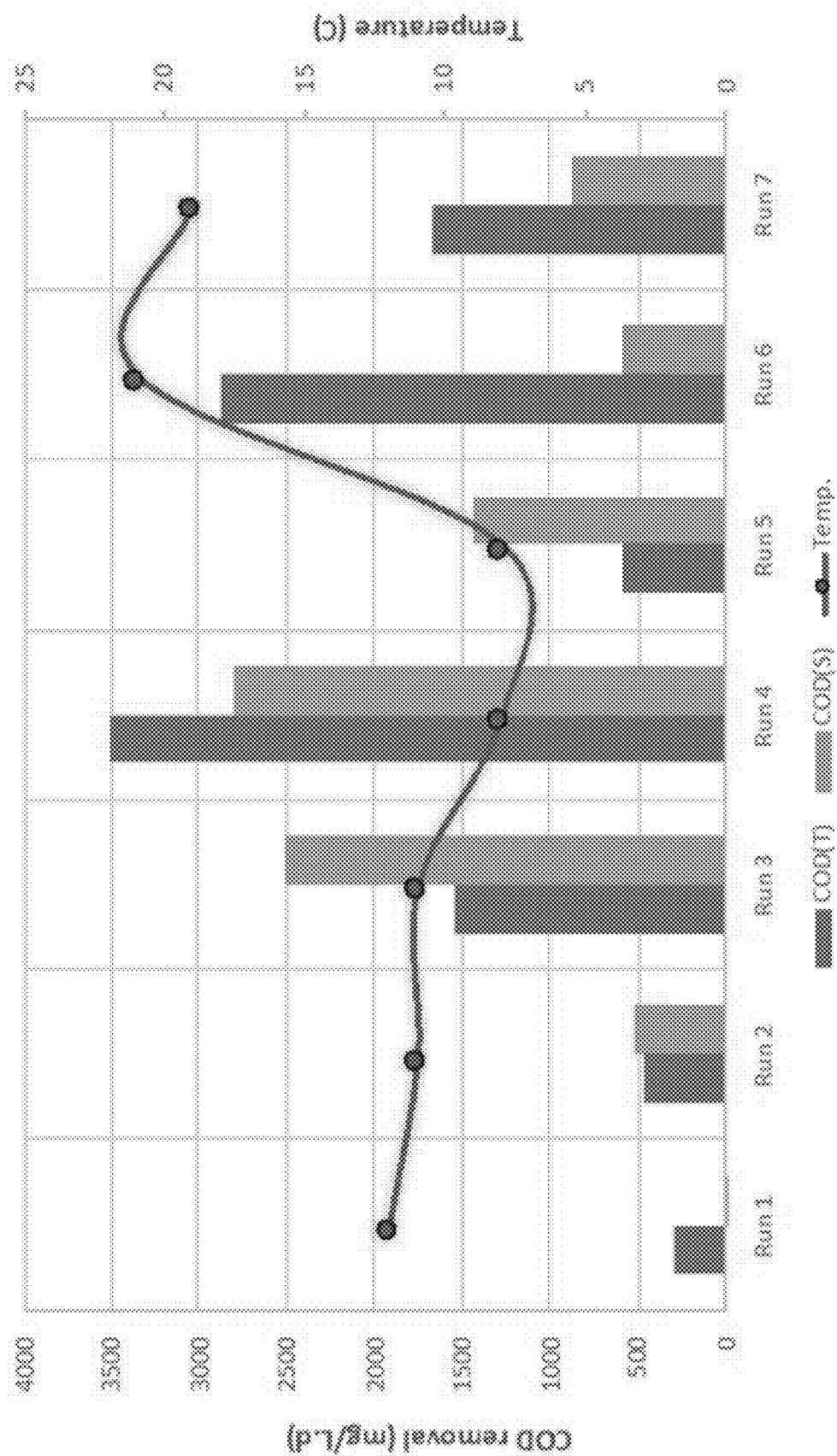
FIG. 34A shows a data plot depicting COD removal rate as mg/L COD for the example MFC system shown in FIG. 30 under continuous mode.
Figure 34B:
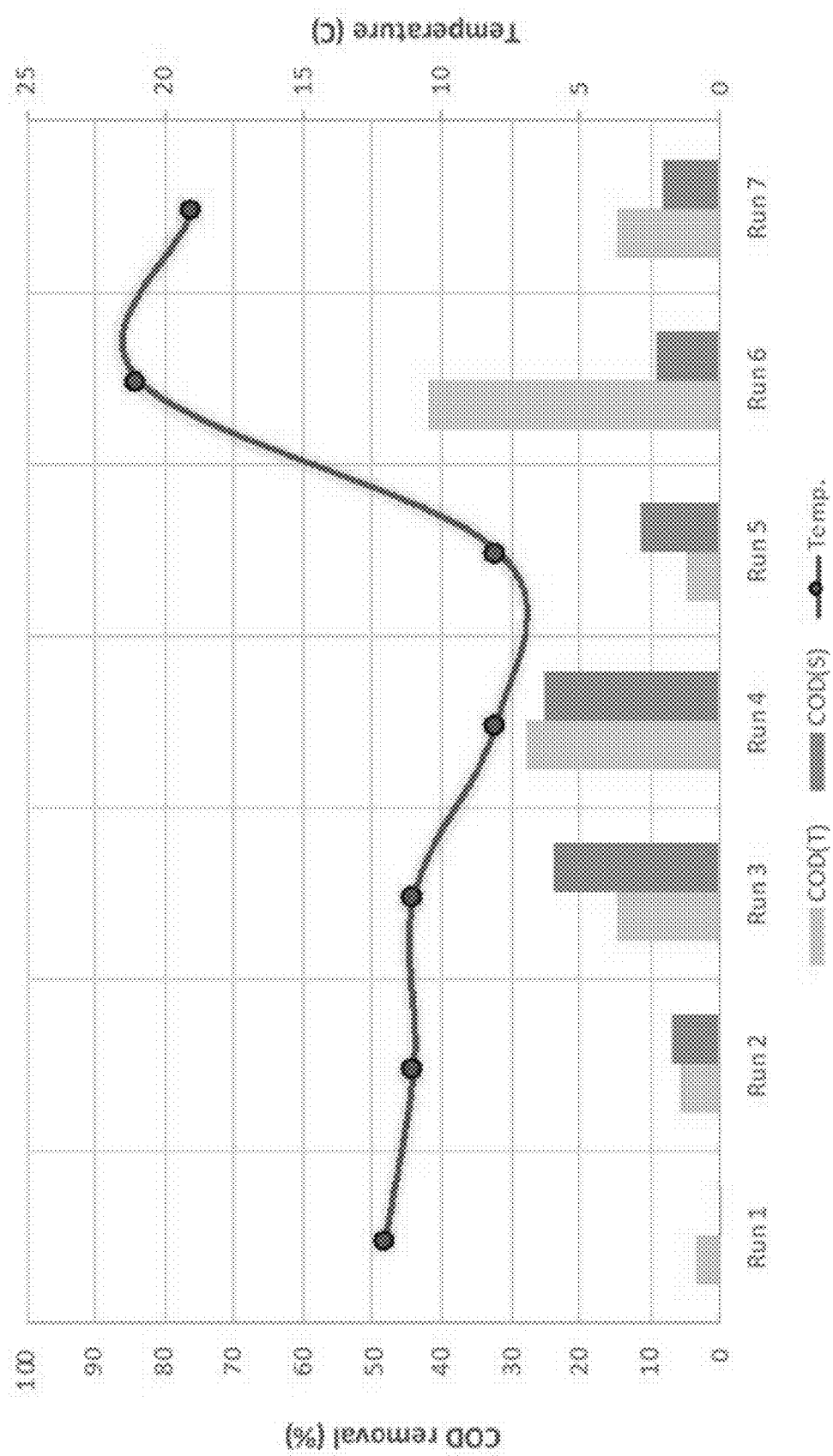
FIG. 34B shows a data plot depicting COD removal rate efficiency for the example MFC system shown in FIG. 30 under continuous mode.

FIGS. 33A and 33B show data plots depicting the COD removal rate as mg/L COD removed (FIG. 33A) and COD removal efficiency (FIG. 33B) for the experimental implementation under batch mode. FIGS. 34A and 35B show the COD removal rate as mg/L COD removed (FIG. 34A) and COD removal efficiency (FIG. 34B) for the experimental implementation under continuous mode.

On average, for the example implementations, the higher COD removal in mg/L under batch mode was observed during the initial stages when the COD loadings were higher. The average COD removal rate under batch mode was 300 mg/L and the average COD removal efficiency was 18%.

On average, for the example implementations, the higher instantaneous COD removal in mg/L under continuous mode was 2800 mg/L and COD removal efficiency of 25%. The average COD removal rate under continuous mode was 1230 mg/L and the average COD removal efficiency was 12%.

The normalized energy recovery (NER) of the MFC system 3000 at 400Ω and continuous mode of operation was 2.8 kWh/kg COD, which is higher than the NER of anaerobic digestion treatment plant with energy recovery from methane. Due to the lower COD removal rates during batch mode, the NER was calculated as 4.5 kWh/kg COD with Coulombic Efficiency (CE) of 54%. On average, the CE of the MFC system 3000 under continuous mode was estimated as 20%.

EXAMPLES

In some embodiments in accordance with the present technology (example A1), a microbial fuel cell (MFC) system for wastewater treatment includes a wastewater headworks module to receive and pre-treat raw wastewater for feeding pre-treated wastewater from the wastewater headworks module; one or more modular MFC devices to bioelectrochemically process the pre-treated wastewater that concurrently generates electrical energy and digests organic contaminants and particulates in the wastewater to yield treated water, the one or more modular MFC devices including a bioelectrochemical reactor and a housing to encase the bioelectrochemical reactor, wherein the bioelectrochemical reactor includes a plurality of anode units arranged between a cathode assembly; and a water collection module to receive the treated water from the one or more modular MFC devices and store the treated water and/or route the treated water from the system.

Example A2 includes the system of any of the preceding or subsequent examples, wherein the wastewater headworks module includes a degritting module to filter solid matter having one or both of a large size and mass.

Example A3 includes the system of example A2, wherein the degritting module includes at least one of a spinning apparatus or a mesh apparatus to separate and collect the matter for disposal as solid waste from the system.

Example A4 includes the system of example A2, wherein the wastewater headworks includes one or more equalization tanks to receive and collect the degritted wastewater and modulate a steady organic load and flow of the pre-treated wastewater.

Example A5 includes the system of example A2, wherein the wastewater headworks includes one or more pre-treatment modules to remove unwanted chemical species including one or more of sulfur species, grease or oil.

Example A6 includes the system of any of the preceding or subsequent examples, wherein the housing of the one or more modular MFC devices includes a rigid casing having a solid bottom and an opening at a top of the housing to allow modular components of the bioelectrochemical reactor to be positioned within and removed from an interior of the housing.

Example A7 includes the system of example A6, wherein the housing has a first dimension in a flow direction of fluid through the modular MFC device.

Example A8 includes the system of example A7, wherein the housing includes an input hole and output hole arranged on opposing sides of the housing along the flow direction.

Example A9 includes the system of example A7, wherein the housing includes a first opening and a second opening on opposing sides of the housing perpendicular to the flow direction that allow for air flow through the cathode assembly of the bioelectrochemical reactor.

Example A10 includes the system of any of the preceding or subsequent examples, wherein the anode units each include carbon fibers that protrude from an interior cylinder.

Example A11 includes the system of any of the preceding or subsequent examples, wherein the cathode assembly includes two gas-diffusion cathodes.

Example A12 includes the system of any of the preceding or subsequent examples, wherein the one or more modular MFC devise include an array of a plurality of the modular MFC devices arranged in a hydraulic series, wherein a first modular MFC device receives the pre-treated wastewater from the wastewater headworks module and bioelectrochemically processes the pre-treated to output a first treated water received at a second modular MFC device of the array, which bioelectrochemically processes the first treated water to output a second treated water received at a next modular MFC device of the array.

Example A13 includes the system of example A12, wherein the array of the plurality of the modular MFC devices are arranged in the hydraulic series in multiple vertical planes between one or more groups of modular MFC devices of the array.

Example A14 includes the system of any of the preceding or subsequent examples, wherein the one or more modular MFC devices include a double reactor configuration including two of the bioelectrochemical reactors encased in the housing, and/or wherein the one or more modular MFC devices include a double reactor configuration including three of the bioelectrochemical reactors encased in the housing.

Example A15 includes the system of any of the preceding or subsequent examples, wherein the pre-treated wastewater is gravity-fed through a feeder box to at least one of the one or more modular MFC devices.

Example A16 includes the system of example A15, further comprising a peristaltic pump coupled at the end of the one or more modular MFC devices or at the end of a series of an array of the modular MFC devices to control a flow rate of the fluid through the modular MFC devices.

Example A17 includes the system of any of the preceding or subsequent examples, wherein the wastewater includes sewage received from a domestic infrastructure system, agricultural system, or industrial system.

Each of the above examples can include a modular microbial fuel cell (MFC) device, system and/or method for treating wastewater and generating electrical energy through a bioelectrochemical waste-to-energy conversion process.

In some embodiments in accordance with the present technology (example B1), a microbial fuel cell (MFC) device for bioelectrochemically processing wastewater includes a fluidic input port for receiving the wastewater; an MFC housing; a plurality of anode units suspended in a housing to contact the wastewater; one or more cathode electrodes, wherein the one or more cathode electrodes are gas permeable and electrically conductive; and a fluidic output port for outputting treated wastewater.

Example B2 includes the MFC device of the preceding or subsequent examples, wherein the MFC device generates electrical energy and processes organic contaminants and particulates in the wastewater to yield treated water.

Example B3 includes the MFC device of the preceding or subsequent examples, wherein the fluidic input port and the fluidic output port are arranged on opposing sides of the housing along a direction of flow.

Example B4 includes the MFC device of example B3, wherein the direction of flow is perpendicular to an air flow through the cathode assembly of the bioelectrochemical reactor, and wherein the air flow enables processing of the wastewater in the reactor.

Example B5 includes the MFC device of the preceding or subsequent examples, wherein the MFC housing includes a rigid casing having a solid bottom and openings at a top and sides of the MFC housing to allow modular components of the bioelectrochemical reactor to be positioned within and removed from an interior of the MFC housing.

Example B6 includes the MFC device of the preceding or subsequent examples, wherein the MFC housing has a first dimension in a flow direction of fluid through the MFC device, a second dimension orthogonal to the first dimension and the one or more cathode electrodes, and a third dimension orthogonal to the first dimension and the second dimension, and wherein the first dimension lies in a range of 13.26 inches±0.5 inches, the second dimension lies in a range of 8.59 inches±0.5 inches, and the third dimension lies in a range of 7.5 inches±0.5 inches.

Example B7 includes the MFC device of the preceding or subsequent examples, wherein the one or more cathode electrodes are gas-diffusion electrodes.

Example B8 includes the MFC device of the preceding or subsequent examples, wherein the one or more cathode electrodes are electrically connected together.

Example B9 includes the MFC device of the preceding or subsequent examples, wherein each of the plurality of anode units comprise conductive branches positioned radially around a central anode core, wherein the central anode core is parallel to the one or more cathode electrodes.

Example B10 includes the MFC device of the preceding or subsequent examples, wherein the anode unit branches comprise carbon.

Example B11 includes the MFC device of the preceding or subsequent examples, wherein the anode units of the plurality of anode units are electrically connected together external to the housing.

Example B12 includes the MFC device of the preceding or subsequent examples, wherein the MFC housing is produced by computer numerical controlled machining.

Example B13 includes the MFC device of the preceding or subsequent examples, wherein the housing is produced by injection molding.

Example B14 includes the MFC device of the preceding or subsequent examples, wherein the plurality of anode units are electrically connected inside the housing.

In some embodiments in accordance with the present technology (example B15), a microbial fuel cell (MFC) system for wastewater treatment includes a wastewater headworks module to receive wastewater; and one or more MFC devices to bioelectrochemically process the wastewater, wherein each MFC device includes an MFC housing, a plurality of anode units suspended in the housing to contact the wastewater, and one or more cathode electrodes, wherein the one or more cathode electrodes are gas permeable, and a water collection module to receive the treated water from the one or more MFC devices.

Example B16 includes the MFC system of the preceding or subsequent examples, wherein the MFC system is a double reactor comprising two MFC devices fluidically connected in series, wherein a first MFC device receives the wastewater form the wastewater headworks module, wherein a last MFC device provides the treated water to the water collection module, and wherein first treated water from the first MFC device is provided as input water to the last MFC device.

Example B17 includes the MFC system of example B16, wherein the MFC housing for the double reactor has a first dimension in a flow direction of fluid through the MFC device, a second dimension orthogonal to the first dimension and the one or more cathode electrodes, and a third dimension orthogonal to the first dimension and the second dimension, and wherein the first dimension lies in a range of 25.62 inches±0.5 inches, the second dimension lies in a range of 8.59 inches±0.5 inches, and the third dimension lies in a range of 7.5 inches±0.5 inches.

Example B18 includes the MFC system of the preceding or subsequent examples, wherein the MFC system is a triple reactor comprising three MFC devices fluidically connected in series, wherein a first MFC device receives the wastewater form the wastewater headworks module, wherein first treated water from the first MFC device is provided as second input water to the second MFC device and a second treated water from the second MFC device is provided as third input water to a third MFC device, and wherein the third MFC device provides the treated water to the water collection module.

Example B19 includes the MFC system of the preceding or subsequent examples, wherein the MFC housing for the triple reactor has a first dimension in a flow direction of fluid through the MFC device, a second dimension orthogonal to the first dimension and the one or more cathode electrodes, and a third dimension orthogonal to the first dimension and the second dimension, and wherein the first dimension lies in a range of 37.98 inches±0.5 inches, the second dimension lies in a range of 8.59 inches±0.5 inches, and the third dimension lies in a range of 7.5 inches±0.5 inches.

Example B20 includes the MFC system of the preceding or subsequent examples, wherein the wastewater includes sewage received from a domestic infrastructure system, agricultural system, or industrial system.

Each of the above examples can include a modular microbial fuel cell (MFC) device, system and/or method for treating wastewater and generating electrical energy through a bioelectrochemical waste-to-energy conversion process.

In some embodiments in accordance with the present technology (example C1), a system for energy generation and wastewater treatment includes a wastewater headworks system to pre-treat raw wastewater by removing solid particles and produce a pre-treated wastewater that that is outputted from the wastewater headworks system; one or more modular microbial fuel cell (MFC) devices to bioelectrochemically process the pre-treated wastewater by concurrently generating electrical energy and digesting organic contaminants and particulates in the pre-treated wastewater to yield a treated water, the one or more modular MFC devices comprising a housing and a bioelectrochemical reactor that is encased within the housing, wherein the bioelectrochemical reactor includes a plurality of anodes arranged between a cathode assembly; and a water collection system to receive the treated water from the one or more modular MFC devices and store the treated water and/or route the treated water from the system.

Example C2 includes the system of example C or any of the subsequent examples among C3-C20, wherein the wastewater headworks system includes a degritting device to filter and/or remove solid matter having one or both of a large size and mass.

Example C3 includes the system of example C2, wherein the degritting device includes at least one of a spinning apparatus or a mesh apparatus to separate and collect the filtered solid matter for disposal as solid waste from the system.

Example C4 includes the system of any of the preceding or subsequent examples among C1-C20, wherein the wastewater headworks system includes one or more equalization tanks to receive and collect the degritted wastewater and modulate a steady organic load and flow of the pre-treated wastewater.

Example C5 includes the system of any of the preceding or subsequent examples among C1-C20, wherein the wastewater headworks system includes one or more chemical, physical or biological pre-treatment devices to remove unwanted chemical species including one or more of sulfur species, grease or oil.

Example C6 includes the system of any of the preceding or subsequent examples among C1-C20, wherein the housing of the one or more modular MFC devices includes a rigid casing having a solid frame that allows modular components of the bioelectrochemical reactor to be positioned within and removed from an interior of the housing.

Example C7 includes the system of any of the preceding or subsequent examples among C1-C20, wherein the modular MFC device has a first dimension in a flow direction of fluid through the modular MFC device that is larger than a second dimension perpendicular to the first dimension.

Example C8 includes the system of examples C7 and/or C9, wherein the housing includes an input hole and output hole arranged on opposing sides of the housing along the flow direction.

Example C9 includes the system of examples C7 and/or C8, wherein the housing includes a first opening and a second opening on opposing sides of the housing perpendicular to the flow direction that allow for air flow into the bioelectrochemical reactor to provide oxygen to the cathode assembly.

Example C10 includes the system of any of the preceding or subsequent examples among C1-C20, wherein an anode of the plurality of anodes includes carbon fibers that protrude from an interior cylinder.

Example C11 includes the system of any of the preceding or subsequent examples among C1-C20, wherein the cathode assembly includes two gas-diffusion cathodes separated on two sides of the plurality of anodes and arranged longitudinally along a flow direction of fluid through the bioelectrochemical reactor, the gas-diffusion cathodes able to allow oxygen to permeate into the fluid within the bioelectrochemical reactor.

Example C12 includes the system of any of the preceding or subsequent examples among C1-C20, wherein the one or more modular MFC devices include an array of a plurality of the modular MFC devices arranged in a hydraulic series, wherein a first modular MFC device receives the pre-treated wastewater from the wastewater headworks system and bioelectrochemically processes the pre-treated wastewater to output a first treated water that is received at a second modular MFC device of the array, which bioelectrochemically processes the first treated water to output a second treated water received at a next modular MFC device of the array.

Example C13 includes the system of example C12, wherein the array of the plurality of the modular MFC devices are arranged in the hydraulic series in multiple vertical planes between one or more groups of modular MFC devices of the array.

Example C14 includes the system of any of the preceding or subsequent examples among C1-C20, wherein the one or more modular MFC devices include a double reactor configuration, the double reactor configuration including two of the bioelectrochemical reactors encased in the housing of the one or more modular MFC devices.

Example C15 includes the system of any of the preceding or subsequent examples among C1-C20, wherein the one or more modular MFC devices include a triple reactor configuration, the triple reactor configuration including three of the bioelectrochemical reactors encased in the housing of the one or more modular MFC devices.

Example C16 includes the system of any of the preceding or subsequent examples among C1-C20, wherein the pre-treated wastewater is gravity-fed through a feeder box to at least one of the one or more modular MFC devices.

Example C17 includes the system of any of the preceding or subsequent examples among C1-C20, further comprising a peristaltic pump coupled at the end of the one or more modular MFC devices or at the end of a series of an array of the modular MFC devices to control a flow rate of the fluid through the one or more modular MFC devices or the array of the modular MFC devices.

Example C18 includes the system of any of the preceding or subsequent examples among C1-C20, wherein the modular MFC devices are operable to clean the pre-treated wastewater and yield the treated water under a flow rate of at least 100 mL/min and/or at least 120 L/day, and/or which can be operated for at least 10 consecutive hours of operation.

Example C19 includes the system of any of the preceding or subsequent examples among C1-C20, wherein the one or more modular MFC device is operable to generate the electrical energy and produce the treated water with net-zero energy consumption.

Example C20 includes the system of any of the preceding examples among C1-C19, wherein the raw wastewater includes sewage received from a domestic infrastructure system, agricultural system, or industrial system.

In some embodiments in accordance with the present technology (example C21), a method for energy generation and wastewater treatment includes pretreating a raw wastewater by removing at least some solid particles from a wastewater fluid that produces a pre-treated wastewater; processing the pre-treated wastewater by a bioelectrochemical conversion process that generates electrical energy and concurrently cleans the pre-treated wastewater to produce treated water by digesting matter in the wastewater fluid; extracting the generated electrical energy for storage or transfer to an external electrical device; and outputting the treated water.

Example C22 includes the method of example C21 or any of the subsequent examples among C23-C35, wherein the bioelectrochemical conversion process includes: oxidizing organic matter in the wastewater fluid by biologically-catalyzed oxidation using biological species within a bioelectrochemical reactor comprising a plurality of anodes spatially arranged between at least two cathodes, which causes excretion of protons in solution that diffuse to a cathode in the bioelectrochemical reactor and an extracellular transfer of electrons released during the oxidation to a conductive surface of an anode in the bioelectrochemical reactor, and electrically transferring the electrons to the cathode through an electrical circuit, which facilitates electrochemical reduction at the cathode by interaction of the protons, the electrons and oxygen to produce hydrogen peroxide and/or new water.

Example C23 includes the method of example C22, wherein the biological species include at least one of a bacteria or a yeast.

Example C24 includes the method of any of the preceding or subsequent examples among C21-C35, in which the method includes collecting the pre-treated wastewater in one or more equalization tanks and modulating a steady organic load and flow of the pre-treated wastewater to the bioelectrochemical reactor.

Example C25 includes the method of any of the preceding or subsequent examples among C21-C35, wherein the outputting the treated water includes one or both of storing the treated water in a tank and routing the treated water to an external fluidic device.

Example C26 includes the method of any of the preceding or subsequent examples among C21-C35, wherein the pretreating the raw wastewater includes removing the at least some of the solid particles having one or both of a large size and mass.

Example C27 includes the method of any of the preceding or subsequent examples among C21-C35, wherein the pretreating the raw wastewater includes removing unwanted chemical species including one or more of sulfur species, grease or oil from the wastewater fluid.

Example C28 includes the method of any of the preceding or subsequent examples among C21-C35, wherein the processing the pre-treated wastewater by the bioelectrochemical conversion process is implemented in a microbial fuel cell (MFC) device comprising a bioelectrochemical reactor encased within a housing, the bioelectrochemical reactor comprising a plurality of anodes spatially arranged between at least two cathodes.

Example C29 includes the method of example C28 and/or any of the preceding or subsequent examples among C21-C35, wherein an anode of the plurality of anodes includes carbon fibers that protrude from an interior cylinder.

Example C30 includes the method of example C28 and/or any of the preceding or subsequent examples among C21-C35, wherein the cathode assembly includes two gas-diffusion cathodes separated on two sides of the plurality of anodes and arranged longitudinally along a flow direction of fluid through the bioelectrochemical reactor, the gas-diffusion cathodes able to allow oxygen to permeate into the fluid within the bioelectrochemical reactor.

Example C31 includes the method of example C28 and/or any of the preceding or subsequent examples among C21-C35, wherein the modular MFC device is included in an array of a plurality of the modular MFC devices arranged in a hydraulic series, wherein a first modular MFC device receives the pre-treated wastewater and bioelectrochemically processes the pre-treated wastewater to output a first treated water that is received at a second modular MFC device of the array, which bioelectrochemically processes the first treated water to output a second treated water outputted from the array or received at a next modular MFC device of the array.

Example C32 includes the method of example C28 and/or any of the preceding or subsequent examples among C21-C35, wherein the pre-treated wastewater is gravity-fed to the modular MFC device.

Example C33 includes the method of any of the preceding or subsequent examples among C21-C35, wherein the processing the pre-treated wastewater to generates the electrical energy and concurrently produces the treated water occurs under a flow rate of at least 100 mL/min and/or at least 120 L/day, and/or which can be operated for at least 10 consecutive hours of operation.

Example C34 includes the method of any of the preceding or subsequent examples among C21-C35, wherein the processing the pre-treated wastewater by the bioelectrochemical conversion process generates the electrical energy and produces the treated water with net-zero energy consumption.

Example C35 includes the method of any of the preceding examples among C21-C34, wherein the raw wastewater includes sewage received from a domestic infrastructure system, agricultural system, or industrial system.

In some embodiments in accordance with the present technology (example C36), a device for energy generation and wastewater treatment includes a modular microbial fuel cell (MFC) device operable to bioelectrochemically process wastewater that includes organic matter in a fluid that concurrently generates electrical energy and digests the organic matter to yield a treated water, the modular MFC device comprises: a housing, and a bioelectrochemical reactor encased within the housing, the bioelectrochemical reactor including a plurality of anodes arranged between a cathode assembly, wherein the cathode assembly includes two gas-diffusion cathodes separated on two sides of the plurality of anodes and arranged longitudinally along a flow direction of the fluid through the bioelectrochemical reactor, the gas-diffusion cathodes able to allow oxygen to permeate into the fluid within the bioelectrochemical reactor.

Example C37 includes the device of any of the preceding or subsequent examples among C36-C47, wherein the housing includes a rigid casing having a solid frame that allows modular components of the bioelectrochemical reactor to be positioned within and removed from an interior of the housing.

Example C38 includes the device of any of the preceding or subsequent examples among C36-C47, wherein the modular MFC device has a first dimension in the flow direction that is larger than a second dimension perpendicular to the first dimension.

Example C39 includes the device of any of the preceding or subsequent examples among C36-C47, wherein the housing includes an input hole and output hole arranged on opposing sides of the housing along the flow direction.

Example C40 includes the device of any of the preceding or subsequent examples among C36-C47, wherein the housing includes a first opening and a second opening on opposing sides of the housing perpendicular to the flow direction that allow for air flow into the bioelectrochemical reactor to provide oxygen to the cathode assembly.

Example C41 includes the device of any of the preceding or subsequent examples among C36-C47, wherein an anode of the plurality of anodes includes carbon fibers that protrude from an interior cylinder.

Example C42 includes the device of any of the preceding or subsequent examples among C36-C47, wherein the modular MFC device includes a double reactor configuration, the double reactor configuration including two bioelectrochemical reactors arranged in series along the flow direction and encased in the housing.

Example C43 includes the device of any of the preceding or subsequent examples among C36-C47, wherein the modular MFC device includes a triple reactor configuration, the triple reactor configuration including three bioelectrochemical reactors arranged in series along the flow direction and encased in the housing.

Example C44 includes the device of any of the preceding or subsequent examples among C36-C47, wherein the modular MFC device bioelectrochemically processes the wastewater: oxidizing the organic matter in the wastewater fluid by biologically-catalyzed oxidation using biological species within the bioelectrochemical reactor, which causes excretion of protons in solution that diffuse to a cathode of the cathode assembly and an extracellular transfer of electrons released during the oxidation to a conductive surface of an anode of the plurality of anodes, and electrically transferring the electrons to the cathode through an electrical circuit, which facilitates electrochemical reduction at the cathode by interaction of the protons, the electrons and oxygen to produce hydrogen peroxide and/or new water.

Example C45 includes the device of any of the preceding or subsequent examples among C36-C47, wherein the modular MFC device is operable to bioelectrochemically process the wastewater under a flow rate of at least 100 mL/min and/or at least 120 L/day, and/or which can be operated for at least 10 consecutive hours of operation.

Example C46 includes the device of any of the preceding or subsequent examples among C36-C47, wherein the modular MFC device is operable to generate the electrical energy and produce the treated water with net-zero energy consumption.

Example C47 includes the device of any of the preceding examples among C36-C46, wherein the wastewater includes sewage received from a domestic infrastructure system, agricultural system, or industrial system.

In some embodiments in accordance with the present technology (example C48), a device for energy generation and wastewater treatment includes a first modular microbial fuel cell (MFC) device and a second modular MFC device. The first modular MFC device is operable to bioelectrochemically process wastewater that includes organic matter in a fluid that concurrently generates electrical energy and digests the organic matter to produce a treated water, and the first modular MFC device comprises: a first housing, and a first bioelectrochemical reactor encased within the first housing, the first bioelectrochemical reactor including a plurality of anodes arranged between a cathode assembly, wherein the cathode assembly includes two gas-diffusion cathodes separated on two sides of the plurality of anodes and arranged longitudinally along a flow direction of the fluid through the first bioelectrochemical reactor, the gas-diffusion cathodes able to allow oxygen to permeate into the fluid within the first bioelectrochemical reactor. The second modular MFC device is fluidically coupled to the first modular MFC device and operable to bioelectrochemically process the treated water produced by the first modular MFC device to concurrently generate electrical energy and digest organic matter in fluid of the treated water to produce a further treated water, and the second modular MFC device comprises: a second housing, and a second bioelectrochemical reactor encased within the second housing, the second bioelectrochemical reactor including a plurality of anodes arranged between a cathode assembly, wherein the cathode assembly includes two gas-diffusion cathodes separated on two sides of the plurality of anodes and arranged longitudinally along a flow direction of the fluid through the second bioelectrochemical reactor, the gas-diffusion cathodes able to allow oxygen to permeate into the fluid within the second bioelectrochemical reactor.

Example C49 includes the device of any of the preceding or subsequent examples among C48-C59, wherein one or both of the first housing and the second housing includes a rigid casing having a solid frame that allows modular components of one or both of the first bioelectrochemical reactor and the second bioelectrochemical reactor, respectively, to be positioned within and removed from an interior of the respective housing.

Example C50 includes the device of any of the preceding or subsequent examples among C48-C59, wherein one or both of the first modular MFC device and the second modular MFC device has a first dimension in the flow direction that is larger than a second dimension perpendicular to the first dimension.

Example C51 includes the device of any of the preceding or subsequent examples among C48-C59, wherein one or both of the first housing and the second housing includes an input hole and output hole arranged on opposing sides of the respective housing along the flow direction.

Example C52 includes the device of any of the preceding or subsequent examples among C48-C59, wherein one or both of the first housing and the second housing includes a first opening and a second opening on opposing sides of the respective housing perpendicular to the flow direction that allow for air flow into one or both of the first bioelectrochemical reactor and the second bioelectrochemical reactor, respectively, to provide oxygen to the cathode assembly.

Example C53 includes the device of any of the preceding or subsequent examples among C48-C59, wherein an anode of the plurality of anodes of one or both of the first bioelectrochemical reactor and the second bioelectrochemical reactor includes carbon fibers that protrude from an interior cylinder.

Example C54 includes the device of any of the preceding or subsequent examples among C48-C59, wherein one or both of the first modular MFC device and the second modular MFC device includes a double reactor configuration, the double reactor configuration including two bioelectrochemical reactors arranged in series along the flow direction and encased in the respective housing.

Example C55 includes the device of any of the preceding or subsequent examples among C48-C59, wherein one or both of the first modular MFC device and the second modular MFC device includes a triple reactor configuration, the triple reactor configuration including three bioelectrochemical reactors arranged in series along the flow direction and encased in the housing.

Example C56 includes the device of any of the preceding or subsequent examples among C48-C59, wherein each of the first modular MFC device and the second modular MFC device bioelectrochemically processes the wastewater: oxidizing the organic matter in the wastewater fluid by biologically-catalyzed oxidation using biological species within the bioelectrochemical reactor, which causes excretion of protons in solution that diffuse to a cathode of the cathode assembly and an extracellular transfer of electrons released during the oxidation to a conductive surface of an anode of the plurality of anodes, and electrically transferring the electrons to the cathode through an electrical circuit, which facilitates electrochemical reduction at the cathode by interaction of the protons, the electrons and oxygen to produce hydrogen peroxide and/or new water.

Example C57 includes the device of any of the preceding or subsequent examples among C48-C59, wherein each of the first modular MFC device and the second modular MFC device is operable to bioelectrochemically process the wastewater under a flow rate of at least 100 mL/min and/or at least 120 L/day, and/or which can be operated for at least 10 consecutive hours of operation.

Example C58 includes the device of any of the preceding or subsequent examples among C48-C59, wherein each of the first modular MFC device and the second modular MFC device is operable to generate the electrical energy and produce the treated water with net-zero energy consumption.

Example C59 includes the device of any of the preceding examples among C48-C58, wherein the wastewater includes sewage received from a domestic infrastructure system, agricultural system, or industrial system.

Example C60 includes the system of any of examples C1-C20 configured to implement the method of any of examples C21-C35.

Example C61 includes the device of any of examples C36-C48 configured to implement the processing the pre-treated wastewater by the bioelectrochemical conversion process in accordance with any of the examples C21-C35.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for energy generation and wastewater treatment, comprising:
pretreating a raw wastewater by removing at least some of solid particles from a wastewater fluid that produces a pre-treated wastewater;
processing the pre-treated wastewater by a bioelectrochemical conversion process that generates electrical energy and concurrently cleans the pre-treated wastewater to produce treated water by digesting matter in the wastewater fluid;
extracting the generated electrical energy for storage or transfer to an external electrical device; and
outputting the treated water,
wherein the processing the pre-treated wastewater by the bioelectrochemical conversion process is implemented in a microbial fuel cell (MFC) device comprising a bioelectrochemical reactor encased within a housing, the bioelectrochemical reactor comprising a plurality of anodes spatially arranged between at least two cathodes, wherein an anode of the plurality of anodes includes carbon fibers that protrude from an interior cylinder, and wherein the at least two cathodes are separated on two sides of the plurality of anodes and arranged along a flow direction of fluid through the bioelectrochemical reactor for the fluid to flow between the at least two cathodes, the at least two cathodes able to allow oxygen to permeate into the fluid within the bioelectrochemical reactor.

2. The method of claim 1, wherein the bioelectrochemical conversion process includes:
oxidizing organic matter in the wastewater fluid by biologically-catalyzed oxidation using biological species within the bioelectrochemical reactor, which causes excretion of protons in solution that diffuse to a cathode of the at least two cathodes in the bioelectrochemical reactor and an extracellular transfer of electrons released during the oxidation to a conductive surface of an anode of the plurality of anodes in the bioelectrochemical reactor, and
electrically transferring the electrons to the cathode through an electrical circuit, which facilitates electrochemical reduction at the cathode by interaction of the protons, the electrons and oxygen to produce hydrogen peroxide and/or new water.

3. The method of claim 2, comprising:
collecting the pre-treated wastewater in one or more equalization tanks and modulating a steady organic load and flow of the pre-treated wastewater to the bioelectrochemical reactor.

4. The method of claim 1, wherein the pretreating the raw wastewater includes at least one of:
removing the at least some of the solid particles having one or both of a large size of 1 cm or greater and a large mass of 50 g or greater; or
removing chemical species including one or more of sulfur species, grease or oil from the wastewater fluid.

5. The method of claim 1,
wherein the MFC device is included in an array of a plurality of modular MFC devices arranged in a hydraulic series, wherein a first modular MFC device receives the pre-treated wastewater and bioelectrochemically processes the pre-treated wastewater to output a first treated water that is received at a second modular MFC device of the array, which bioelectrochemically processes the first treated water to output a second treated water outputted from the array or received at a next modular MFC device of the array.

6. The method of claim 2, wherein the biological species include at least one of a bacteria, a yeast, or a consortium of bacteria and yeast.

7. The method of claim 1, wherein the outputting the treated water includes one or both of storing the treated water in a tank and routing the treated water to an external fluidic device.

8. The method of claim 5, wherein pre-treated wastewater is gravity-fed to the modular MFC device.

9. The method of claim 1, the processing the pre-treated wastewater to generate the electrical energy and concurrently produce the treated water occurs under a flow rate of at least 100 mL/min and/or at least 120 L/day.

10. The method of claim 9, wherein the processing the pre-treated wastewater to generate the electrical energy and concurrently produce the treated water occurs under the flow rate of at least 100 mL/min and/or at least 120 L/day for at least 4 consecutive hours of operation of the method.

11. The method of claim 1, wherein the processing the pre-treated wastewater by the bioelectrochemical conversion process generates the electrical energy and produces the treated water with net-zero energy consumption for at least a portion of an implementation of the method.

12. The method of claim 1, wherein the raw wastewater includes sewage received from a domestic infrastructure system, agricultural system, or industrial system.

13. The method of claim 1, wherein the at least two cathodes include two gas-diffusion cathodes operable to allow oxygen to permeate into the fluid within the bioelectrochemical reactor.

14. A method for energy generation and wastewater treatment, comprising:
pretreating a raw wastewater by removing at least some of solid particles from a wastewater fluid that produces a pre-treated wastewater;
processing the pre-treated wastewater by a bioelectrochemical conversion process that generates electrical energy and concurrently cleans the pre-treated wastewater to produce treated water by digesting matter in the wastewater fluid;
extracting the generated electrical energy for storage or transfer to an external electrical device; and
outputting the treated water,
wherein the processing the pre-treated wastewater by the bioelectrochemical conversion process is implemented in a microbial fuel cell (MFC) device comprising a bioelectrochemical reactor encased within a housing, the bioelectrochemical reactor comprising a plurality of anodes spatially arranged between at least two cathodes, wherein an anode of the plurality of anodes includes carbon fibers that protrude from an interior cylinder, and wherein the at least two cathodes include two gas-diffusion cathodes separated on two sides of the plurality of anodes and arranged longitudinally along a flow direction of fluid through the bioelectrochemical reactor, the gas-diffusion cathodes able to allow oxygen to permeate into the fluid within the bioelectrochemical reactor, and
wherein the MFC device is included in an array of a plurality of modular MFC devices arranged in a hydraulic series, wherein a first modular MFC device receives the pre-treated wastewater and bioelectrochemically processes the pre-treated wastewater to output a first treated water that is received at a second modular MFC device of the array, which bioelectrochemically processes the first treated water to output a second treated water outputted from the array or received at a next modular MFC device of the array.

15. The method of claim 14, wherein the processing the pre-treated wastewater by the bioelectrochemical conversion process generates the electrical energy and produces the treated water with net-zero energy consumption for at least a portion of an implementation of the method.

16. The method of claim 14, wherein the raw wastewater includes sewage received from a domestic infrastructure system, agricultural system, or industrial system.

17. The method of claim 14, comprising:
collecting the pre-treated wastewater in one or more equalization tanks and modulating a steady organic load and flow of the pre-treated wastewater to the bioelectrochemical reactor.

18. The method of claim 14, wherein the pretreating the raw wastewater includes at least one of:
removing the at least some of the solid particles having one or both of a large size of 1 cm or greater and a large mass of 50 g or greater; or removing chemical species including one or more of sulfur species, grease or oil from the wastewater fluid.

19. The method of claim 14, wherein the outputting the treated water includes one or both of storing the treated water in a tank and routing the treated water to an external fluidic device.

20. The method of claim 14, wherein pre-treated wastewater is gravity-fed to at least some of the modular MFC devices.

* * * * *

UNITED STATES PATENT AND TRADEMARK OFFICE
CERTIFICATE OF CORRECTION

PATENT NO. : 11,117,819 B2
APPLICATION NO. : 16/725021
DATED : September 14, 2021
INVENTOR(S) : Bretschger et al.

It is certified that error appears in the above-identified patent and that said Letters Patent is hereby corrected as shown below:

In the Specification

In Column 1, Line 10, delete "2019," and insert -- 2019, now Pat. No. 10,570,039, --, therefor.

In Column 1, Line 48, delete "that that" and insert -- that --, therefor.

In Column 3, Line 12, delete "embodiment a" and insert -- embodiment of a --, therefor.

In Column 3, Line 29, delete "embodiment a" and insert -- embodiment of a --, therefor.

In Column 3, Line 32, delete "embodiment a" and insert -- embodiment of a --, therefor.

In Column 9, Line 63, delete "describe," and insert -- described, --, therefor.

In Column 12, Line 15, delete "embodiment a" and insert -- embodiment of a --, therefor.

In Column 14, Line 43, delete "fastener." and insert -- fasteners. --, therefor.

In Column 15, Line 27, delete "to for" and insert -- for --, therefor.

In Column 17, Line 8, delete "that a" and insert -- than a --, therefor.

In Column 17, Line 50, delete "FIGS. 8A-8E" and insert -- FIGS. 8A-8E. --, therefor.

In Column 18, Line 28, delete "that a" and insert -- than a --, therefor.

In Column 20, Line 44, delete "bases:" and insert -- basis: --, therefor.

In Column 24, Line 35, delete "of z" and insert -- of ≈ --, therefor.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,117,819 B2

In Column 27, Lines 58-59, delete "chemoorganitrophs" and insert -- chemoorganotrophs --, therefor.

In Column 28, Line 1, delete "fastidicous" and insert -- fastidious --, therefor.

In Column 29, Line 19, delete "the those" and insert -- those --, therefor.

In Column 31, Line 5, delete "names as" and insert -- named as --, therefor.

In Column 31, Line 18, delete "names as" and insert -- named as --, therefor.

In Column 37, Line 12, delete "devise" and insert -- device --, therefor.

In Column 38, Line 66, delete "form" and insert -- from --, therefor.

In Column 39, Line 18, delete "form" and insert -- from --, therefor.

In Column 39, Line 47, delete "that that" and insert -- that --, therefor.

In Column 39, Line 61, delete "C" and insert -- C1 --, therefor.

In Column 40, Line 41, delete "C 11" and insert -- C11 --, therefor.

In Column 40, Line 49, delete "C 12" and insert -- C12 --, therefor.

In the Claims

In Column 47, Line 57, in Claim 9, delete "the processing" and insert -- wherein the processing --, therefor.